(12) United States Patent
Yamada et al.

(10) Patent No.: US 8,307,190 B2
(45) Date of Patent: Nov. 6, 2012

(54) MEMORY CONTROL DEVICE, MEMORY DEVICE, AND MEMORY CONTROL METHOD

(75) Inventors: Takashi Yamada, Osaka (JP); Daisuke Imoto, Osaka (JP); Koji Asai, Osaka (JP); Nobuyuki Ichiguchi, Osaka (JP); Tetsuji Mochida, Osaka (JP)

(73) Assignee: Panasonic Corporation, Osaka (JP)

( * ) Notice: Subject to any disclaimer, the term of this patent is extended or adjusted under 35 U.S.C. 154(b) by 592 days.

(21) Appl. No.: 12/443,598

(22) PCT Filed: Dec. 25, 2007

(86) PCT No.: PCT/JP2007/074878
§ 371 (c)(1),
(2), (4) Date: Mar. 30, 2009

(87) PCT Pub. No.: WO2008/084681
PCT Pub. Date: Jul. 17, 2008

(65) Prior Publication Data
US 2010/0030980 A1    Feb. 4, 2010

(30) Foreign Application Priority Data

Dec. 25, 2006  (JP) ................................ 2006-347132
May 8, 2007    (JP) ................................ 2007-123987

(51) Int. Cl.
*G06F 12/00* (2006.01)
(52) U.S. Cl. ........ 711/202; 711/103; 711/167; 711/203; 710/316
(58) Field of Classification Search .................. 711/167, 711/202, 103, 203; 710/316
See application file for complete search history.

(56) References Cited

U.S. PATENT DOCUMENTS

| 4,866,603 A | 9/1989 | Chiba |
| 5,748,551 A | 5/1998 | Ryan et al. |
| 5,903,509 A | 5/1999 | Ryan et al. |
| 6,005,592 A | 12/1999 | Koizumi et al. |

(Continued)

FOREIGN PATENT DOCUMENTS

EP          1026595          8/2000

(Continued)

OTHER PUBLICATIONS

Rau et al., "The Cydra-5 stride insensitive memory system", Oct. 30, 2002, pp. 1-25, XP002599648, Citeseer, Retrieved from the Internet at URL: http://citeseerx. ist. psu/viewdoc/download; jsessionid=F86F43ED5792AEE2FEF50A2481D7C79F?doi=10.1. 1.13.1535&rep=repl&type=pdf>.

(Continued)

*Primary Examiner* — Jae Yu
(74) *Attorney, Agent, or Firm* — Greenblum & Bernstein, P.L.C.

(57) ABSTRACT

The memory control device according to the present invention includes a command generating unit which divides the memory access request issued by the master into access commands each of which is for one of the memory devices, a command issuing units which issue each of the access commands to the memory devices, a data control unit which switches data between a master and memories, and the command generating unit switch between control for outputting an identical physical address to the memory units and control for outputting different physical addresses to the memory devices, depending on when the physical addresses of the memory devices are identical and when the physical addresses of the memory devices are different, each of the memory devices corresponds to one of the divided access commands.

21 Claims, 43 Drawing Sheets

U.S. PATENT DOCUMENTS

| | | |
|---|---|---|
| 6,182,192 B1 | 1/2001 | Rovati |
| 6,295,596 B1 | 9/2001 | Hirabayashi et al. |
| 6,636,908 B1* | 10/2003 | Winokur et al. ............... 710/29 |
| 6,681,319 B1* | 1/2004 | Djafarian et al. ............ 712/208 |
| 6,828,977 B2 | 12/2004 | Champion |
| 6,880,042 B2* | 4/2005 | Hashimoto ................... 711/112 |
| 7,290,109 B2 | 10/2007 | Horii et al. |
| 2001/0019331 A1* | 9/2001 | Nielsen et al. ................ 345/542 |
| 2005/0015539 A1* | 1/2005 | Horii et al. .................... 711/103 |
| 2005/0144369 A1 | 6/2005 | Jaspers |
| 2006/0282752 A1* | 12/2006 | Kuroda ......................... 714/785 |
| 2007/0041716 A1* | 2/2007 | Van Gestel ................... 386/112 |
| 2007/0088855 A1 | 4/2007 | Nanki et al. |
| 2007/0198770 A1 | 8/2007 | Horii et al. |
| 2007/0208919 A1 | 9/2007 | Tanaka et al. |
| 2008/0049504 A1 | 2/2008 | Kasahara et al. |

FOREIGN PATENT DOCUMENTS

| | | |
|---|---|---|
| EP | 1026595 A1 | 8/2000 |
| JP | 4-167160 A | 6/1992 |
| JP | 9-190376 A | 7/1997 |
| JP | 10-105367 | 4/1998 |
| JP | 10-105367 A | 4/1998 |
| JP | 11-098462 | 4/1999 |
| JP | 11-098462 A | 4/1999 |
| JP | 11-203197 | 7/1999 |
| JP | 11-203197 A | 7/1999 |
| JP | 2001-092771 | 4/2001 |
| JP | 2001-092771 A | 4/2001 |
| JP | 2005-148218 | 6/2005 |
| JP | 2005-148218 A | 6/2005 |
| WO | 97/24727 A1 | 7/1997 |
| WO | 9724727 | 7/1997 |
| WO | 03/060722 | 7/2003 |
| WO | 03/060722 A1 | 7/2003 |

OTHER PUBLICATIONS

English language Abstract of JP 2005-148218 A (Jun. 9, 2005).
English language Abstract of JP 11-098462 A (Apr. 9, 1999).
English language Abstract of JP 10-105367 A (Apr. 24, 1998).
English language Abstract of JP 11-203197 A (Jul. 30, 1999).
English language Abstract of JP 2001-092771 A (Apr. 6, 2001).
English language Abstract of JP 4-167160 A (Jun. 15, 1992).
English language Abstract of JP 9-190376 A (Jul. 22, 1997).
Japan Office action, mail date is Oct. 25, 2011.

* cited by examiner

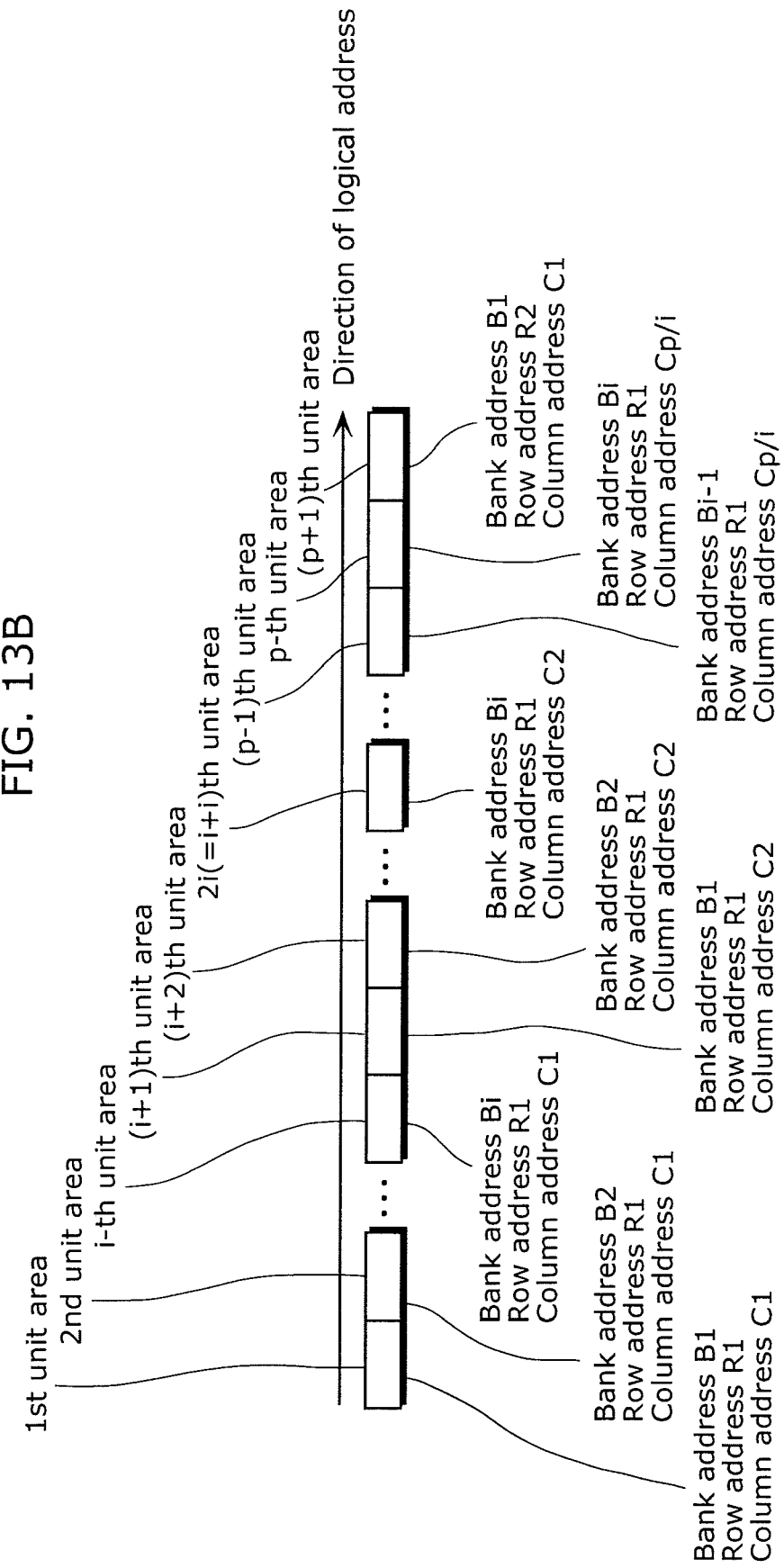

FIG. 21

| Bank 0 | | Unit area | | Bank 1 | |
|---|---|---|---|---|---|
| Memory 0 Column 0 | Memory 1 Column 0 | Memory 0 Column 0 | Memory 1 Column 0 | | |
| Memory 0 Column 1 | Memory 1 Column 1 | Memory 0 Column 1 | Memory 1 Column 1 | | |
| Memory 0 Column 2 | Memory 1 Column 2 | Memory 0 Column 2 | Memory 1 Column 2 | | |
| Memory 0 Column 3 | Memory 1 Column 3 | Memory 0 Column 3 | Memory 1 Column 3 | | |
| Memory 0 Column 4 | Memory 1 Column 4 | Memory 0 Column 4 | Memory 1 Column 4 | | |
| Memory 0 Column 5 | Memory 1 Column 5 | Memory 0 Column 5 | Memory 1 Column 5 | | |
| Memory 0 Column 6 | Memory 1 Column 6 | Memory 0 Column 6 | Memory 1 Column 6 | | |
| Memory 0 Column 7 | Memory 1 Column 7 | Memory 0 Column 7 | Memory 1 Column 7 | | |
| Memory 0 Column 8 | Memory 1 Column 8 | Memory 0 Column 8 | Memory 1 Column 8 | | |
| Memory 0 Column 9 | Memory 1 Column 9 | Memory 0 Column 9 | Memory 1 Column 9 | | |
| Memory 0 Column 10 | Memory 1 Column 10 | Memory 0 Column 10 | Memory 1 Column 10 | | |
| Memory 0 Column 11 | Memory 1 Column 11 | Memory 0 Column 11 | Memory 1 Column 11 | | |

FIG. 26

| Bank 0 | | | | | | | | | | | | | Bank 1 | | | | | | | | | | | |
|---|---|---|---|---|---|---|---|---|---|---|---|---|---|---|---|---|---|---|---|---|---|---|---|---|
| Memory 0 Column 0 | Memory 1 Column 0 | Memory 0 Column 1 | Memory 1 Column 1 | Memory 0 Column 2 | Memory 1 Column 2 | Memory 0 Column 3 | Memory 1 Column 3 | Memory 0 Column 4 | Memory 1 Column 4 | Memory 0 Column 5 | Memory 1 Column 5 | Memory 0 Column 6 | Memory 1 Column 6 | Memory 0 Column 7 | Memory 1 Column 7 | Memory 0 Column 8 | Memory 1 Column 8 | Memory 0 Column 9 | Memory 1 Column 9 | Memory 0 Column 10 | Memory 1 Column 10 | Memory 0 Column 11 | Memory 1 Column 11 | |

(Unit area indicated at Memory 1 Column 0 / Memory 0 Column 1)

Bank 1 row:
Memory 0 Column 12, Memory 1 Column 12, Memory 0 Column 13, Memory 1 Column 13, Memory 0 Column 14, Memory 1 Column 14, Memory 0 Column 15, Memory 1 Column 15, Memory 0 Column 16, Memory 1 Column 16, Memory 0 Column 17, Memory 1 Column 17, Memory 0 Column 18, Memory 1 Column 18, Memory 0 Column 19, Memory 1 Column 19, Memory 0 Column 20, Memory 1 Column 20, Memory 0 Column 21, Memory 1 Column 21, Memory 0 Column 22, Memory 1 Column 22, Memory 0 Column 23, Memory 1 Column 23

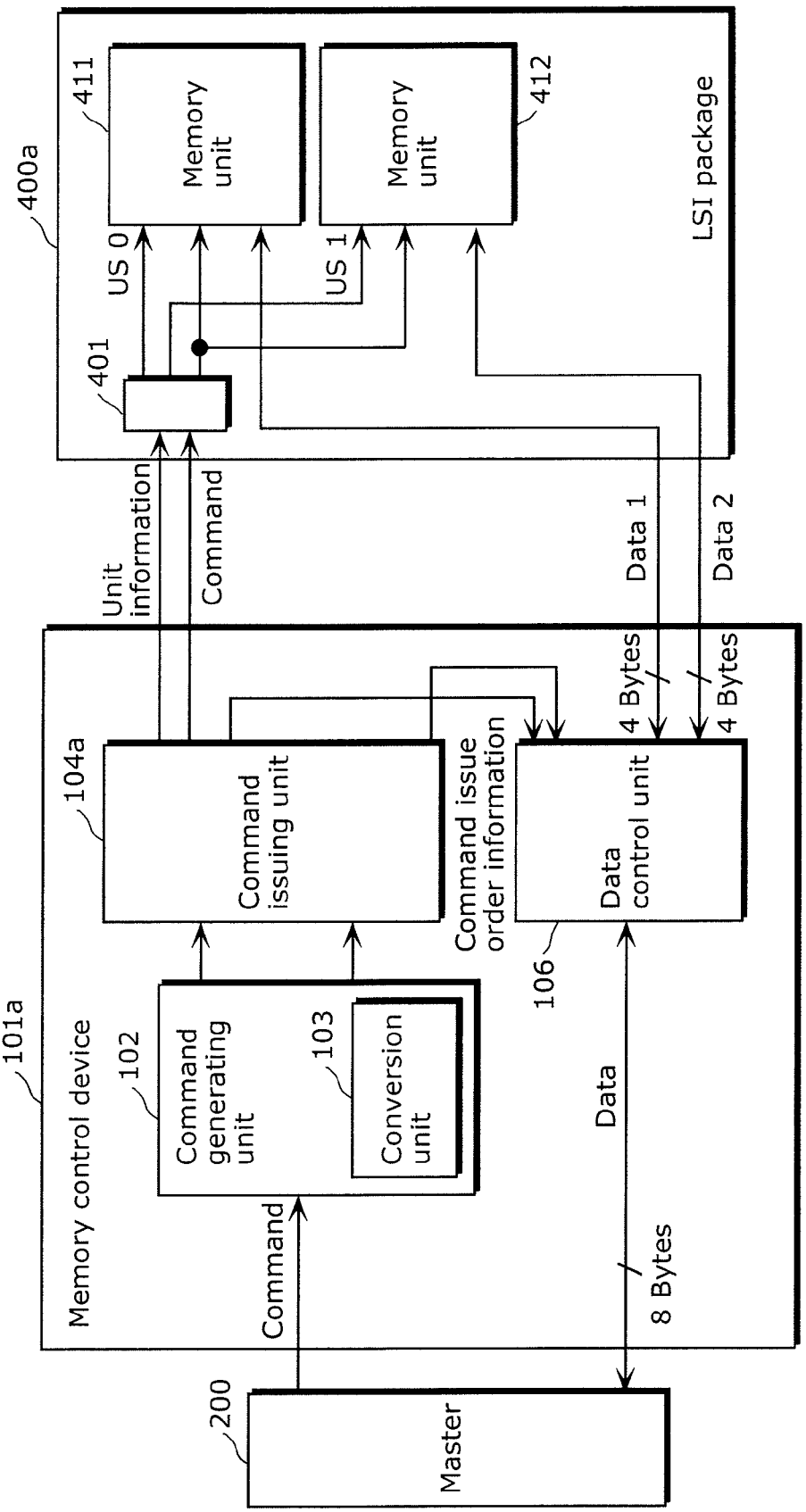

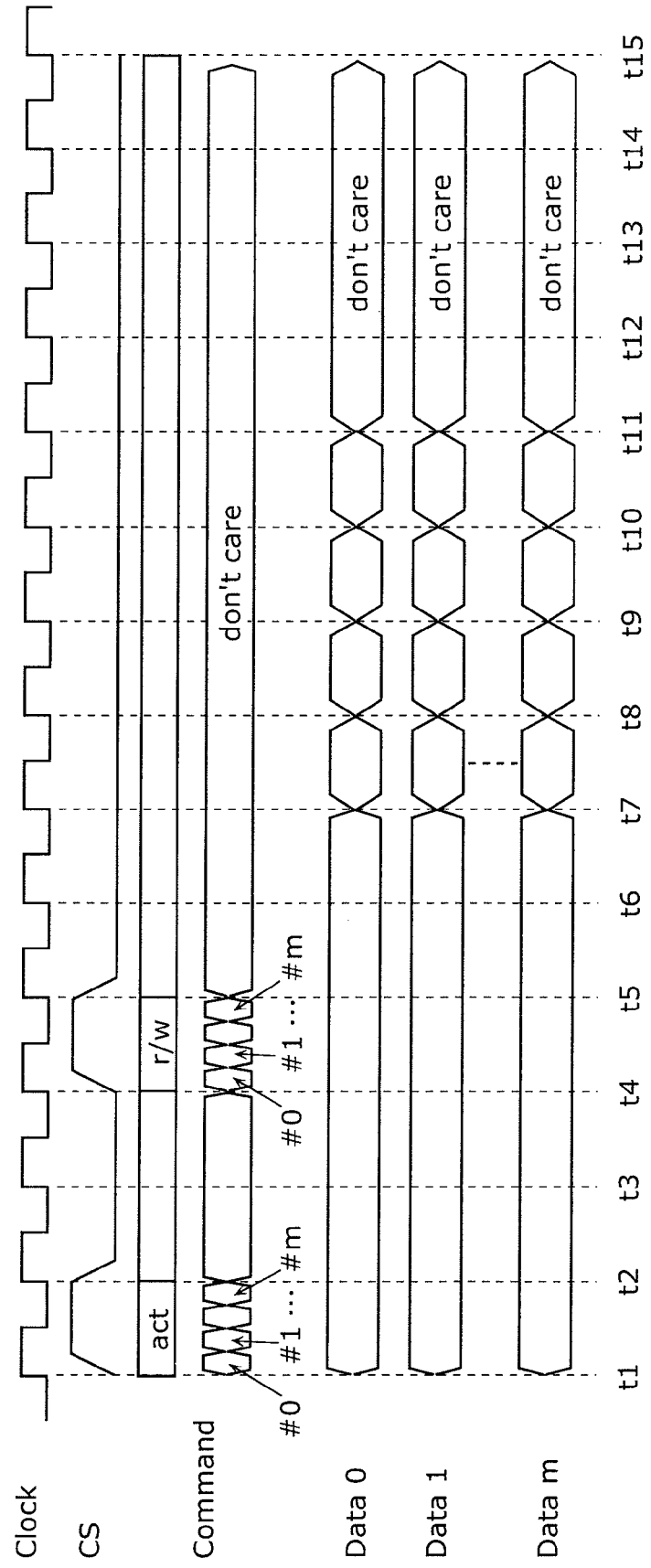

MEMORY CONTROL DEVICE, MEMORY DEVICE, AND MEMORY CONTROL METHOD

TECHNICAL FIELD

The present invention relates to a memory control device, a memory device, and a memory control method in a system where the memory data bus width is extended to increase available memory bandwidth, for enhancing effective transfer efficiency of accesses from a master to any address.

BACKGROUND ART

Information processing devices including image processors generally use large-volume and low-cost DRAMs to store a large amount of data. More particularly, recent image processors require DRAMs with not just memory capacity but with high data transferring capability (hereinafter referred to as a memory bandwidth) for High Definition (HD) image processing in MPEG 2 and H.264, simultaneous multiple channel processing, and high-quality 3D graphics processing.

For achieving the high memory bandwidth, some conventional methods have been generally known, including: (1) improving the operational frequency of bus; (2) allowing a wide bus width in a memory; and a method with the combination of (1) and (2).

On the other hand, when accessing a DRAM, it is generally necessary to designate a bank and a row to be accessed and activate the bank and the row in advance. In addition, when changing the row to be accessed in the same bank, it is necessary to precharge the accessed row first, and activate the row to be newly accessed. During the activation process and the precharge process, the bank cannot be accessed, which generates an inaccessible period when switching the row in the same bank and generates latency in data bus. In order to make up for the disadvantage, in the regular DRAM access control, a control called bank interleaving is performed which masks the inaccessible period by activating and precharging another bank while transferring the data to a certain bank. The bank interleave control allows constant data transfer on the data bus in appearance during the data transfer to the bank. It is necessary that the data transfer time to the other bank exceeds the inaccessible period so that the bank interleaving is effective.

However, in the cases of both (1) and (2) for achieving high memory bandwidth, data transfer amount per unit time increases. Meanwhile, the absolute time of the inaccessible period does not change, and thus the data transfer amount necessary for masking the inaccessible period increases. As a result, even with the bank interleaving, the inaccessible period is not fully masked unless the data transfer amount to the other bank is increased, more specifically, unless the transfer size per access is increased. Consequently, latency in the data bus is generated, and the access efficiency is reduced. This indicates significant reduction in the access efficiency in a system where frequent access with small transfer size is performed.

Patent Reference 1 discloses a conventional method to solve the problem. FIG. 31 shows a circuit configuration of the conventional method. With this, method, access efficiency of bus is improved by masking the inaccessible period generated in one device with the data transfer time of the other device by alternate time-division access of the memory devices 0 and 1 at a predetermined timing in the command generating unit based on the signals from the counters 0 and 1. With this control, in the cases of both (1) and (2) for achieving high memory bandwidth, the inaccessible period which could not be masked by the bank interleaving in the same device can be masked by the access to the other device, and thus it is possible to prevent the access efficiency from being decreased without increasing the transfer size per access. This indicates that it is possible to limit the reduction in the access efficiency in a system where frequent access with small transfer size is performed.

[Patent Reference 1] Japanese Unexamined Patent Application Publication No. 9-190376

DISCLOSURE OF INVENTION

Problems that Invention is to Solve

However, with the conventional technology, although multiple devices are used, only one device is accessible at one time, and thus the maximum memory bandwidth that can be used in a system is limited to the memory bandwidth of one device. Thus, in the conventional technology, in order to extend the available memory bandwidth, it is necessary to extend the bus width per device or increase the operational frequency. More specifically, it is necessary to use a higher-speed DRAM (DDR, DDR2, DDR3 and others).

FIG. 33 shows a possible configuration for extending the bus width and increasing the data transfer bandwidth. In this memory control device, the maximum memory bandwidth is extended compared to FIG. 31, and 8-byte access and 4-byte access are available. However, there is a problem that unnecessary transfer is often performed to the access with small transfer amount and random and non-continuous access that are frequently used for image processing The minimum access unit of DRAM is determined by "bus width×number of minimum burst". The high-speed DRAM described above has a problem that minimum access unit increases with the use of high-speed DRAM in the same manner as the case of extending the bus width; since the minimum burst number is specified as 2 in DDR, 4 in DDR2, and 8 in DDR3 compared to 1 in SDRAM. The minimum access unit indicates the minimum data transfer amount always sent per access, and all access requests are sent by an integral multiple of the minimum access unit. Thus, increase in the minimum access unit results in a number of unnecessary transfers to the access with small transfer size and the random and non-continuous access often used for image processing, which leads to reduction in effective transfer efficiency.

FIG. 32 shows a specific example. FIG. 32 shows an example where a bus width in a system using 4-byte bus SDRAMs operating at 100 MHz is switched to 8 bytes to double the memory bandwidth. Here, the memory bandwidth to be used is naturally doubled; however, as shown in FIG. 32, small access such as an 4 byte-transfer and a transfer from a location with an irregular access boundary such as an 8-byte transfer from the 8n+4 byte address reduce the access efficiency by half since valid data and invalid data will be the same size. As a result, even if the available memory bandwidth is doubled, the access efficiency is reduced by half. Consequently, the memory bandwidth actually used is 400 MB/s, which is the same as before the bus width extension, and there is a case where there is no effect of the bus extension at all.

In view of the above-mentioned problems, it is an object of the present invention to provide a memory control device which suppresses the increase in the amount of invalid data transfer when extending the memory bus width, and extending the available memory bandwidth by using a higher-speed DRAM, and which achieves a higher access efficiency, a memory device and a memory control method thereof.

Means to Solve the Problems

In order to solve the problem above, the memory control device according to the present invention is a memory control device connected to a master that issues a memory access request and to memory units, and which controls access to the memory units, the memory control device including: a command control unit which divides the memory access request issued by the master into access commands each of which is for one of the memory units, and issues each of the access commands to a corresponding one of the memory units; and a data control unit which (i) divides data written by the master into pieces of data each of which is for one of the memory units and outputs each piece of the divided data to the corresponding one of the memory units, when the memory access request is a write request, and (ii) combines pieces of data read from the memory units and output the combined read data to the master, when the memory access request is a read request, in which the command control unit switches between control for outputting an identical physical address to the memory units and control for outputting different physical addresses to the memory units, depending on when the physical addresses of the memory units are identical and when the physical addresses of the memory units are different, each of the memory units corresponds to one of the divided access commands.

With this configuration, it is possible to extend the memory bandwidth, and suppress increase in invalid data transfer without increasing the minimum access unit. More specifically, the memory bandwidth is extended to (bus width of one memory unit)×(the number of memory units), and the minimum access unit accessible from the master can be the minimum access unit of one memory unit.

Here, the command control unit may be connected to the memory units via an address bus common to the memory units and chip select signal lines each individually connected to one of the memory units, the command control unit may (i) simultaneously assert the respective chip select signals and output the identical physical address to the memory units when the divided access commands indicate the identical physical address, and (ii) assert the respective chip select signals at different timings and output the different physical addresses to the memory units when the divided access commands indicate the different physical addresses, and the data control unit may (i) divide the data written by the master into the pieces of data each of which is for one of the memory units and output each piece of the divided data to the corresponding one of the memory units according to timings of the access commands, when the memory access request is a write request, and (ii) combine the pieces of data read from the memory units and output the combined read data to the master according to the timings of the access commands, when the memory access request is a read request.

With this configuration, it is not necessary to wire individual address buses to the memory units, and thus it is possible to reduce the wired area of the address bus, and miniaturize the area of circuit.

Here, the command control unit may include: a command generating unit; and command issuing units each provided for one of the memory units, the command generating unit converts a logical address included in the memory access request into a physical address for each of the memory units and to divide the memory access request into access commands each of which is for one of the memory units, each of the command issuing units issues each of the access commands generated by the command generating unit to the corresponding one of the memory units, and the command generating unit outputs the access commands to the command issuing units simultaneously.

Here, the command control unit may include: a command generating unit; and command issuing units each of which is provided for one of the memory units, the command generating unit converts a logical address included in the memory access request into a physical address for each of the memory units and to divide the memory access request into access commands each of which is for one of the memory units, each of the command issuing units issues each of the access commands generated by the command generating unit to the corresponding one of the memory units, and the command generating unit outputs the access commands to the command issuing units at a same timing when the physical addresses of the memory units each corresponds to one of the divided access commands are identical, and outputs the access commands to the command issuing units at different timings when the physical addresses of the memory units each corresponds to one of the divided access commands are different.

Here, the memory units may be two memory units consisting of a first memory unit and a second memory unit, the command control unit may convert the access request into a first access command and a second access command, the first memory unit and the second memory unit may store data such that: (i) the physical address corresponding to the first access command and the physical address corresponding to the second access command are identical when the access request starts with data in the first memory unit, and a start of the data matches an alignment of a data bus corresponding to the first memory unit and the second memory unit; and (ii) the physical address corresponding to the first access command and the physical address corresponding to the second access command are different when the access request starts with data in the second memory unit, and the start of the data does not match the alignment of the data bus corresponding to the first memory unit and the second memory unit.

Here, the command control unit may switch the identical address and the different addresses by delaying the timing for outputting an address and a chip select signal for each of the memory units when the physical addresses of the memory units are different, each of the memory units corresponding to one of the access commands.

Here, the memory units are first to m-th memory units, each of the memory units may have a minimum access unit of N bytes, a logical address space may have logical addresses which are consecutive along unit areas that are repeatedly arranged, and in each of the unit areas, m (N×integer)-byte areas each corresponding to one of the first to m-th memory units may be sequentially arranged.

Here, physical addresses of the first to m-th memory units may be common in each unit area, and the command control unit may issue access commands simultaneously to a memory unit corresponding to the access request among the first to m-th memory units when the access request is for data having a size which does not exceed the unit area.

Here, each of the first to m-th memory units may include i banks, p of the first to p-th unit areas may be repeatedly arranged in the logical address space, the first to p-th unit areas may have a common row address and different column addresses, the m (N×integer)-byte areas in each of the first to p-th unit areas may have a common bank address, and the first to p-th unit areas may respectively have different bank addresses.

This configuration allows accessing m memory units having a common address at the same cycle, and minimizing time for switching between the accesses to the memory units having a common row address and common address, which are arranged in a logically consecutive address space, due to limitation in memory access timing.

Here, the memory units may be used as a frame buffer which stores an image, each of the memory units may have a minimum access unit of N bytes, a logical address space may have logical addresses which are consecutive along unit areas that may be repeatedly arranged, (N×integer)-byte areas each corresponding to one of the memory units may be sequentially arranged in each of the unit areas, the unit areas of which the number is A may be adjacently arranged corresponding to a horizontal address of the image, and the unit areas of which the number is B may be adjacently arranged corresponding to a vertical address of the image.

With this configuration, when accessing the frame buffer, the access can be made in access alignment per memory unit in the horizontal direction of the frame buffer, and the access can be made in access alignment per line in the vertical direction of the frame buffer.

Here, the (N×integer)-byte areas in each of the unit areas may have a common bank address, a common row address, and a common column address.

With this configuration, it is possible to simultaneously access corresponding areas for different memory units in the unit area with the identical address.

Here, the unit areas adjacent in one of a horizontal direction and a vertical direction of the frame buffer may have different bank addresses, and the command control unit may issue the access command to access adjacent unit areas by bank interleaving.

Here, m may be equal to 2.

Here, two of the memory units may be used as a frame buffer which stores an image, each of the two memory units may have a minimum access unit of N bytes, in each of the unit areas, two of the (N×integer)-byte areas each corresponding to one of the two memory units may be alternately arranged, the unit areas of which the number is A may be adjacently arranged corresponding to a horizontal address of the image, the unit areas of which the number is B may be arranged corresponding to a vertical address of the image, and the access request from the master may include a horizontal address and a vertical address per row.

With this configuration, when accessing the frame buffer, an access can be made in an access alignment per memory unit in the horizontal direction of the frame buffer, and an access can be made in an access alignment per line in the vertical direction of the frame buffer.

Here, the command control unit may be connected to the memory units via a first address bus common to the memory units, second address buses individually connected to the memory units, and chip select signal lines individually connected to the memory units, and the first address bus and the second address bus may respectively be a part of address signal line and the other part of address signal line configuring an address bus.

Here, the command control unit may (i) simultaneously assert the respective chip select signals, the first address bus, and the second address bus and output the identical physical address to the memory units when the divided access commands indicate the identical physical address, (ii) assert the respective chip select signals, the first address bus, and the second address bus at different output timings and output the different physical addresses to the memory units when the divided access commands indicate different physical addresses and when the first address bus indicates a different physical address, and (iii) simultaneously assert the respective chip select signals, the first address bus, and the second address bus and output different physical addresses to the memory units when the divided access commands indicate different physical addresses and when the second address bus indicates a different physical address.

Here, the memory units may be used as a frame buffer which stores an image, each of the memory units may have a minimum access unit of N bytes, a logical address space may have logical addresses which are consecutive along unit areas that are repeatedly arranged, (N×integer)-byte areas each corresponding to one of the memory units may be arranged in each of the unit areas, the frame buffer may include rectangular areas, the unit areas of which the number is E may be adjacently arranged corresponding to a horizontal address, and the unit areas of which the number is F may be adjacently arranged corresponding to a vertical address of each of the rectangular areas.

Here, the unit areas in each of the rectangular areas may have a common bank address and a common row address, two of the rectangular areas that are horizontally adjacent may have different bank addresses, and two of the rectangular areas that are vertically adjacent may have an arbitrary bank address and different row addresses.

With this configuration, when accessing the frame buffer, consecutive to the vertical direction of the column access in a rectangular area, an access can be made in access alignment per memory unit in the horizontal direction of the frame buffer, and an access can be made in access alignment per line in the vertical direction of the frame buffer.

Here, the (N×integer)-byte areas each corresponding to one of the memory units may be sequentially arranged in each of the unit areas in an order corresponding to an order of the memory units.

Here, each of the unit areas in each of the rectangular areas may be composed of arbitrary one of the memory units and has a common bank address, two of the rectangular areas that are horizontally adjacent may have different bank addresses, and two of the rectangular areas that are vertically adjacent may be composed of the unit areas of different memory units, and have an arbitrary bank address and different column addresses.

Here, the (N×integer)-byte areas each corresponding to one of the memory units may be sequentially arranged in each of the unit areas in an order corresponding to an order of the memory units.

Here, the (N×integer)-byte areas are sequentially arranged in each of the unit areas in a first small rectangular area having G rows which may be consecutive to one or more rows in an order corresponding to an order of the memory units, and the (N×integer)-byte areas may be sequentially arranged in each of the unit areas in a second small rectangular area having H rows which is consecutive to one or more rows in an order different from the order in the first small rectangular area, and the relationship of the first small rectangular area and the second small rectangular area may be repeated in the rectangular area.

In addition, the memory device according to an aspect of the present invention is a memory device packaged into one package, including: memory units; a command interface which receives access commands from an outside source, and supplies the access commands to the memory units; a data bus which is divided into partial buses that are equal in number to the memory units; and a data interface which independently inputs and outputs data between the outside source and each of the memory units via the data bus according to a synchronization signal supplied from the outside source.

With this configuration, even when the memory units are packaged into one, it is possible to achieve high access efficiency together with the memory control device.

Here, the command interface may receive time-division multiplexed access commands in one cycle period of the synchronization signal, and the memory device may further include a demultiplexing unit which demultiplexes the time-division multiplexed access commands received by the command interface, and allocates each of the access commands to a corresponding one of the memory units.

This configuration accelerates supply of access commands to a packaged memory device by packaging, and as a result, it is possible to reduce the number of pins in the package and the number of wires to the package.

Here, the command interface may receive select signals each of which individually enables or disables one of the memory units, and supply each of the received select signals to the corresponding one of the memory units.

With this configuration, it is possible to individually supply the select signals to the memory units in the package, which facilitates individual access.

Here, the command interface may receive unit information which indicates whether each of the memory units is valid or invalid, and the memory device may further include a conversion unit which converts the unit information into select signals each of which is individual to one of the memory units, and supplies each of the converted select signals to a corresponding one of the memory units.

With this configuration, unit information is supplied instead of the individual supply of the select signals to the memory unit in the package. Thus, it is possible to reduce the number of pins in the package and the number of wires to the package.

In addition, the memory control device according to an aspect of the present invention may be a memory control device connected to a master that issues a memory access request and to memory units, and which controls access to the memory units, the memory control device including: a command control unit which divides the memory access request issued by the master into access commands each of which is for one of the memory units; a multiplexing unit which multiplexes access commands in one cycle period of a synchronization signal supplied to the memory units by time-division multiplexing, and issues the time-division multiplexed access commands; a data bus divided into partial buses, the number of the partial buses being equal to the number of the memory units; and a data control unit which (i) divides the data written by the master into pieces of data each of which is for one of the memory units to output each piece of the divided data to the a corresponding one of the memory units, when the memory access request is a write request, and (ii) combines pieces of data read from the memory units to output the combined read data to the master, when the memory access request is a read request.

With this configuration, it is possible to reduce the number of wiring from the memory control device to the memory units.

Furthermore, the memory control method, the semiconductor device according to an aspect of the present invention has the same configuration as described above.

With the configuration, it is possible to extend the memory bus width, to suppress the increase in the amount of invalid data transfer when extending the available memory bus width using a higher-speed DRAM, and to achieve higher access efficiency.

Effects of the Invention

According to the memory control device of an aspect of the present invention, it is possible to suppress increase in the minimum access unit of a memory when the bus width is extended and when a high-speed DRAM such as DDR, DDR2, and DDR3 is used to extend the memory bandwidth to be used. Thus, it is possible to suppress increase in invalid data transfer in a system with small transfer amount and with random non-continuous access which frequently occurs upon image processing and achieve high access efficiency. Furthermore, it is possible to improve effective transfer efficiency by reducing unnecessary transfer, and to improve access overhead unique to the memory units (especially in DRAM), and reduces the total bandwidth of the memory system. At the same time, it is also possible to reduce the number of terminals in the system LSI and the number of wiring between the LSI and the memory units. This also achieves significant reduction in cost.

Within the aspects of the present invention, replacing the memory units having multiple chips into one memory package achieves reduction in the unnecessary transfer, improvement in the effective transfer efficiency, improvement on the access overhead specific to a memory device (especially DRAMs), reduction in the total bandwidth in the memory system, and significant reduction in the implementation area in the system by reducing the number of implemented chips in the system.

BRIEF DESCRIPTION OF DRAWINGS

FIG. 13B shows a relationship between the memory devices (DRAM) and the unit areas.

FIG. 21 shows an example of arrangement where (N×integer)-byte areas are vertically arranged.

FIG. 26 shows an arrangement of logical addresses in a checkerboard pattern.

FIG. 35A shows another variation of the memory device according to the second embodiment.

FIG. 37 is a timing chart showing an example of the operation timing of the memory control device and the memory device.

Figure 1A:
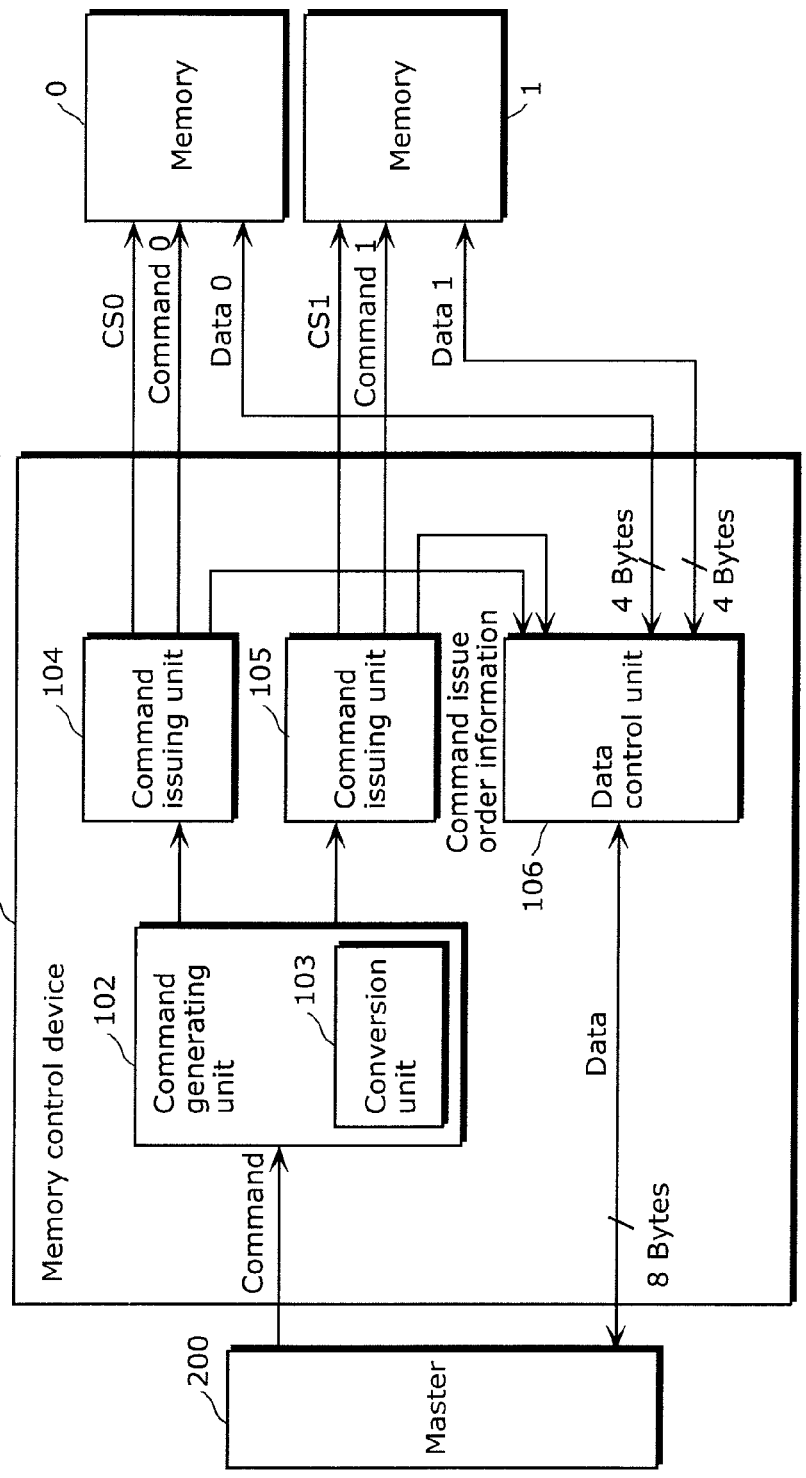
FIG. 1A is a block diagram showing a system configuration including a memory control device according to a first embodiment of the present invention.

NUMERICAL REFERENCES 0, 1 Memory
101 Memory control device
102 Command generating unit
103 Conversion unit
104 Command issuing unit
105 Command issuing unit
106 Data control unit
108 Command conversion unit (Multiplexing unit)
200 Master
400, 400a, 400b, 400c Memory device
411, 411b, 412, 412b Memory unit
421 Command interface
422 Data interface
441 Command conversion unit (Demultiplexing unit)

BEST MODE FOR CARRYING OUT THE INVENTION

Embodiments of the present invention will be described as follows with reference to the drawing.

First Embodiment

The memory control device according to the present invention includes a command control unit which divides the memory access request issued by the master into access commands each of which is for one of the memory devices, and issues each of the access commands to a corresponding one of the memory devices; and a data control unit which (i) divides data written by the master into pieces of data each of which is for one of the memory devices and outputs each piece of the divided data to the corresponding one of the memory devices, when the memory access request is a write request, and (ii) combines pieces of data read from the memory devices and outputs the combined read data to the master, when the memory access request is a read request. Here, the command control unit switches between control for outputting an identical physical address to the memory devices and control for outputting different physical addresses to the memory devices, depending on when the physical addresses of the memory devices are identical and when the physical addresses of the memory devices are different, each of the memory devices corresponds to one of the divided access commands.

With this, it is possible to extend the memory bandwidth, and suppress increase in invalid data transfer without increasing the minimum access unit. More specifically, the memory bandwidth is extended to (bus width of a memory device)× (the number of memory devices), and the minimum access unit that can be accessed from the master may be the minimum access unit of one memory device. Here, the minimum access unit denotes a value calculated by (a bus width of one memory device)×(a minimum burst length). In FIG. 1A, the bus width of a memory device is 4 bytes, and the minimum burst length is 1.

Note that each of the memory devices may be incorporated into a single semiconductor device as one chip. Alternatively, the memory devices may be included in one package.

FIG. 1A is a block diagram showing an embodiment of the memory control device according to the present invention. FIG. 1A shows a system configuration where a master 200 is connected to two memory devices (SDRAMs) that have 4-byte buses via the memory control device. Although only one master 200 is shown in FIG. 1A, plural masters may also be connected.

As shown in FIG. 1A, a memory control device 101 includes a command generating unit 102, a data control unit 106 and command generating units 104 and 105 that are individually connected to memory devices 0 and 1. The command generating unit 102 includes a conversion unit 103 which converts a logical address included in a memory access command (memory access request) from the master 200 to a physical address of each of the memory devices 0 and 1. The command generating unit 102, the command generating units 104 and 105 function as the command control unit described above.

The memory access command from the master 200 is input to the command generating unit 102 via the command bus. Here, the memory access command includes data indicating the direction of data transfer, data transfer size, and access starting address (logical address) of the memory.

The command generating unit 102 which received the memory access command from the master 200 first converts the received memory access command from a logical address into physical address of each of the memory devices 0 and 1 at the conversion unit 103. Furthermore, the command generating unit 102 divides the memory access command into commands in the minimum access unit of the connected memory device (4 bytes in the first embodiment). Subsequently, device-specific access commands each corresponding to respective one of the devices are generated based on the address mapping of the memory device which will be described later, and the command generating unit 102 issues the device-specific access commands to each of the command generating units.

Each of the command issuing units and each of the memory devices are respectively connected to a chip select signal line (CS) which controls the memory and command signal lines on one-to-one basis, and the command issuing units which received the device-specific access command output a command that can be issued to the memory device according to the timing specification of the memory device being connected. In addition, the command issuing units notify the data control unit 106 of the command issue order information indicating the issue order of the commands issued to the memory devices based on the timing specification.

On the other hand, the data transfer between the master 200 and the memory devices are transferred via an 8-byte data bus between the master 200 and the data control unit 106. Here, the data bus may be a bidirectional bus, or may also be two buses, respectively dedicated to written data and read data.

Four-byte dedicated data buses are connected to the data control unit 106 and each of the memory devices. When writing data from the master 200 on the memory device, the data control unit 106 divides the 8-byte data from the master 200 for the 4-byte data bus connected to each memory device based on the command issue order information received from the command issuing unit and transfers the divided data. When reading the data from the memory device, the 4-byte output data from each of the memory devices are combined into 8-byte data based on the command issue order information received from the command issuing unit, and the data is transferred to the 8-byte data bus connected to the master 200. This control keeps consistency of the command issued to the memory device and the transferred data.

Figure 2:
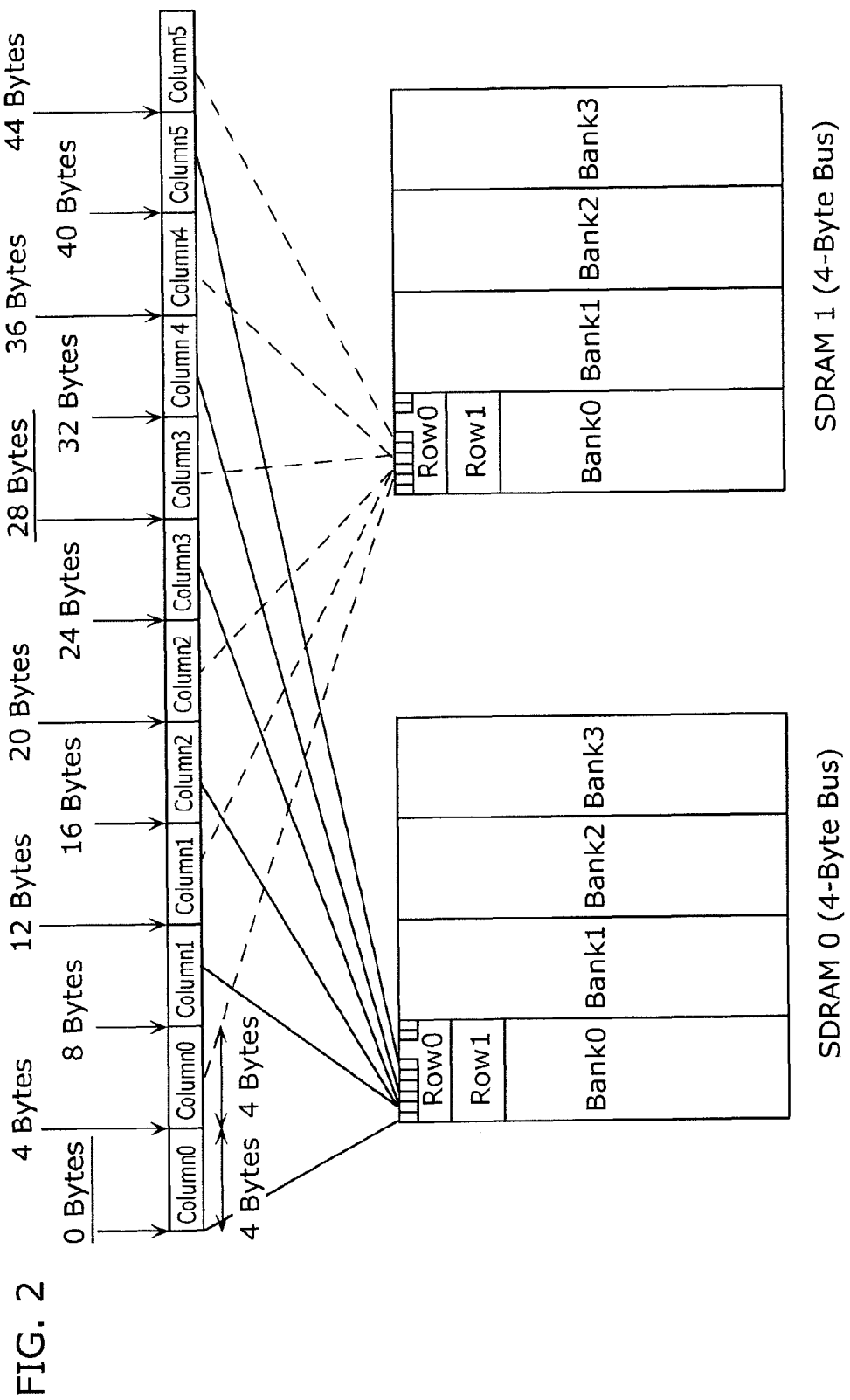
FIG. 2 shows an example of memory map.

FIG. 2 shows address mapping in the memory device according to the first embodiment. As shown in FIG. 2, in the mapping, for the consecutive addresses designated by the master 200, devices are switched for each minimum access unit (4 bytes in the first embodiment) of the connected memory device. Here, it is not necessary to determine how the consecutive addresses designated by the master 200 are mapped into the physical address (Bank, Row, and Column) of each device. However, in order to prevent frequent switching of rows in the same bank within the same device, which reduces access efficiency, it is preferable that the address in the same bank and the same row is sequentially allocated in the same device as shown in FIG. 2, and the mapping is switched to a row in a different bank when all areas in one row are accessed for the consecutive addresses designated by the master 200.

The master 200 connected to the memory control device 101 according to the present invention is accessible to the memory devices in logical address or image address, and the command generating unit 102 divides the received command including the logical address or the image address into the minimum access unit of the memory device (4 bytes in the first embodiment), and generates a device-specific access commands each of which corresponds to each of the devices.

In addition, when the command generating unit 102 divides and converts the command received from the master 200, the command generating unit 102 can issue for the command issuing unit in each memory device so that different addresses are simultaneously issued to access the memory devices when the memory devices and addresses are different. In addition, the command generating unit 102 can issue for the command issuing unit in each memory device so that different addresses are simultaneously issued to access the memory devices when the memory devices are different but the addresses are the identical.

Figure 3:
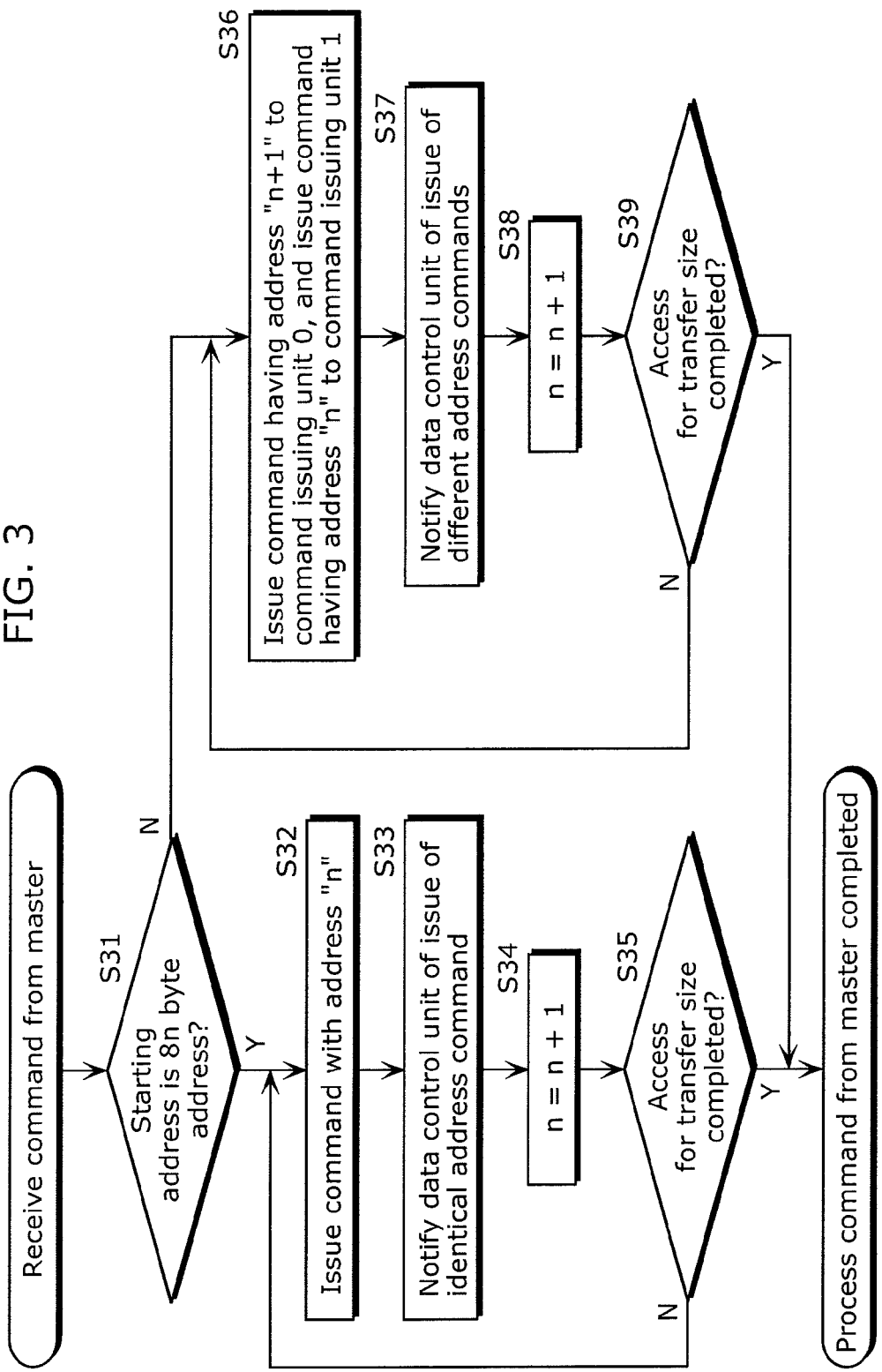
FIG. 3 is a flowchart of a command generating unit.

Next, the operation in the command generating unit 102 is described. FIG. 3 shows a flowchart of the command generating unit 102. As shown in FIG. 3, the command generating unit 102 performs different processing whether the starting address of the command received from the master 200 points an 8-byte boundary or not. When the starting address points an 8-byte boundary (when the staring address is 8n byte (where n is an integer)), access commands to the address n are respectively issued to the command generating units 104 and 105. Subsequently, n is incremented by one, and the process is repeated until the requested transfer size from the master 200 is satisfied.

Meanwhile, when the starting address does not point an 8-byte boundary (the staring address is 8n+4 byte (where n is an integer)), the command generating unit 102 generates an access command for an address n+1 to the command generating unit 104, and an access command for an address n to the command generating unit 105. Subsequently, n is incremented by one, and the process is repeated until the requested transfer size from the master 200 is satisfied.

Here, when specifying the memory devices as the memory device 0 and the memory device 1 for each 4 byte boundary, the command issued by the master 200 that can access, via the memory control device 101 according to the present invention, the memory access command using logical address or image address is divided and converted in the command generating unit 102 according to the address map shown in FIG. 2, and the addresses are 1) identical when the command ranges from the memory device 0 to the memory device 1, and 2) different when the command ranges from the memory device 1 to the memory device 0. In the invention in the first embodiment, storing the data into the memory device as described above, and making readable arrangement allow simultaneous issue of different addresses to the different memory devices 0 and 1 in the case of 2), and simultaneous issue of the identical address to the different memory devices 0 and 1 in the case of 1).

Figure 4:
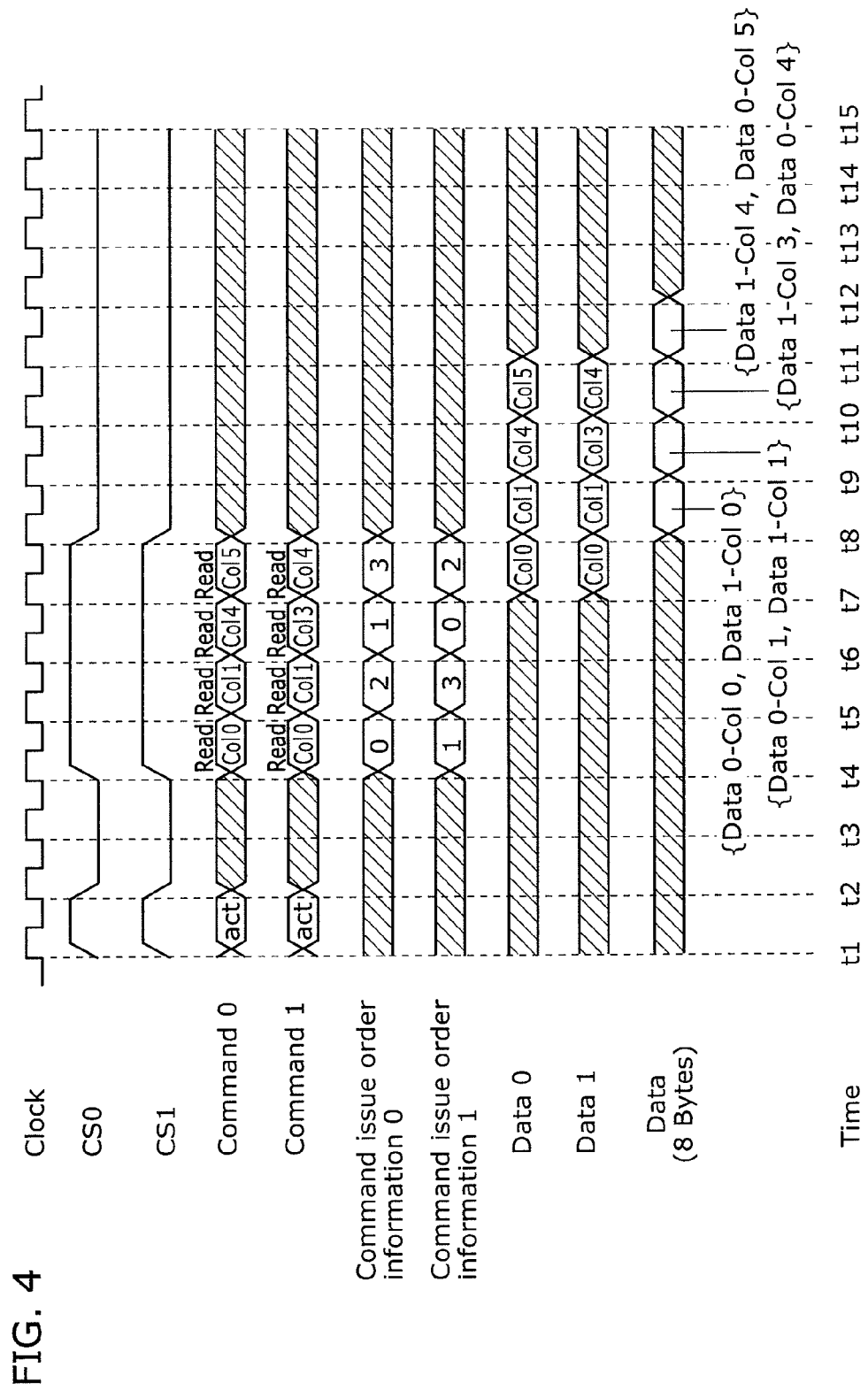
FIG. 4 is a timing diagram showing an operation of the memory control device.

FIG. 4 is a timing chart showing an operation timing of the memory control device 101 according to the first embodiment. In FIG. 4, an SDRAM having tRCD=3 cycles and CL=3 cycles is used, and the control signals to the memory devices and the operational timing of the read data bus to the master 200 when [1] a 16-byte data read command from a 0 byte address and [2] a 16-byte data read command from a 28 byte address are successively issued.

Regarding the read command for the 16-byte data from the first 0 byte address, the command generating unit 102 issues access commands to the address "0" to both of the commend issuing units since the starting address points an 8-byte boundary (8n byte address and n=0). Subsequently, since the data does not fulfill the requested transfer size, the command generating unit 102 issues an access command for the address "1" to both of the command issuing units, and ends the first command process. The command issuing unit 104 and the command issuing unit 105 that received the command issue activation commands for bank 0/Row 0 at t1 as shown in FIG. 4 to access the designated address. Subsequently, in order to satisfy tRCD, the command issuing units 104 and 105 respectively issue read commands for column 0 at t4 and read commands for column 1 at t5, and output command issue order information 0 and 1 each of which indicates the correspondence of the issued command to what number of data in an order of the access command of the master 200 to the data control unit 106. The memory devices output the desired read data starting from t7 after the read commands are issued and after CL=3. In response to the data, the data control unit 106 transfers 8-byte data to which the 4-byte output data from the memory device 0 is allocated higher and the 4-byte output data from the memory device 1 is allocated lower to the master 200 at the cycle from t8, based on the command issue order information received at the cycle from t4. Reading the first 16 bytes is completed by performing the same process at t9 as well.

On the other hand, the subsequent 16-byte data read command from the 28 byte address, the command generating unit 102 issues an access command for the address "4" to the command issuing unit 104, and an access command for the address "3" to the command issuing unit 105 since the starting address does not point an 8-byte boundary (8n+4 byte address and n=3) Subsequently, since the requested transfer size is not satisfied, the command generating unit 102 issues an access command for the address "5" to the command issuing unit 104, and an access command for the address "4" to the command issuing unit 105, and ends the processing for the subsequent command. Since the activation command for bank0/ row0 has been issued at t1 from both the command issuing unit 104 and the command issuing unit 105 which received the commands, the command issuing unit 104 issues a read command for column 4 and the command issuing unit 105 issues a read command for column 3 at t6 which is a next cycle after the cycle where the issue of the first commands are completed, and at t7, the command issuing unit 104 issues a read command for column 5, and the command issuing unit 105 issues a read command for column 4. At the same time, the command issuing unit 104 and the command issuing unit 105 respectively issue the command issue order information 0 and 1 each of which indicates the correspondence of the issued command to what number of data in an order of the access command of the master 200 to the data control unit 106. The memory devices respectively outputs the desired read data starting from t9 after the read command is issued (t6), and after CL=3. In response to the data, the data control unit 106 transfers the 8-byte data to which the 4-byte output data from the memory device 0 is allocated higher and the 4-byte output data from the memory device 1 is allocated lower to the master 200 at the cycle from t10, based on the command issue order information received at the cycle from t6. Reading the subsequent 16 bytes is completed by performing the same process in the cycle from t11 as well based on the command information received at the cycle from t7.

With the control described above, upon access request from the master 200, when the access starting address is not in the boundary of the connected total bus width, and the requested transfer size exceeds the total data bus width (in the first embodiment, the data bus width: 8 bytes, the access starting address: 24 byte, and the requested transfer size: 16 bytes), simultaneous and independent access to the memory device 0 and the memory device 1 is possible with different addresses. Thus, it is possible to enhance the access efficiency compared to the conventional system described below.

Figure 5:
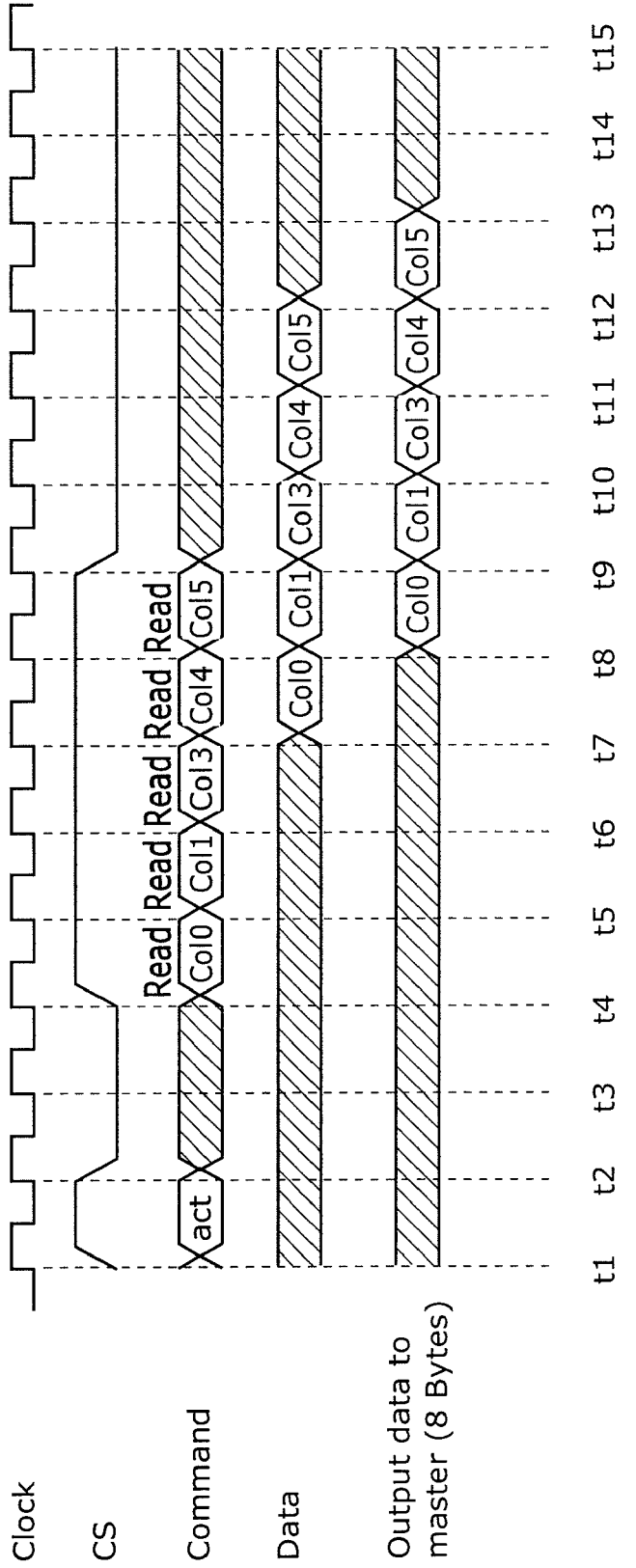
FIG. 5 is a timing diagram showing the operation in a conventional example.
Figure 32:
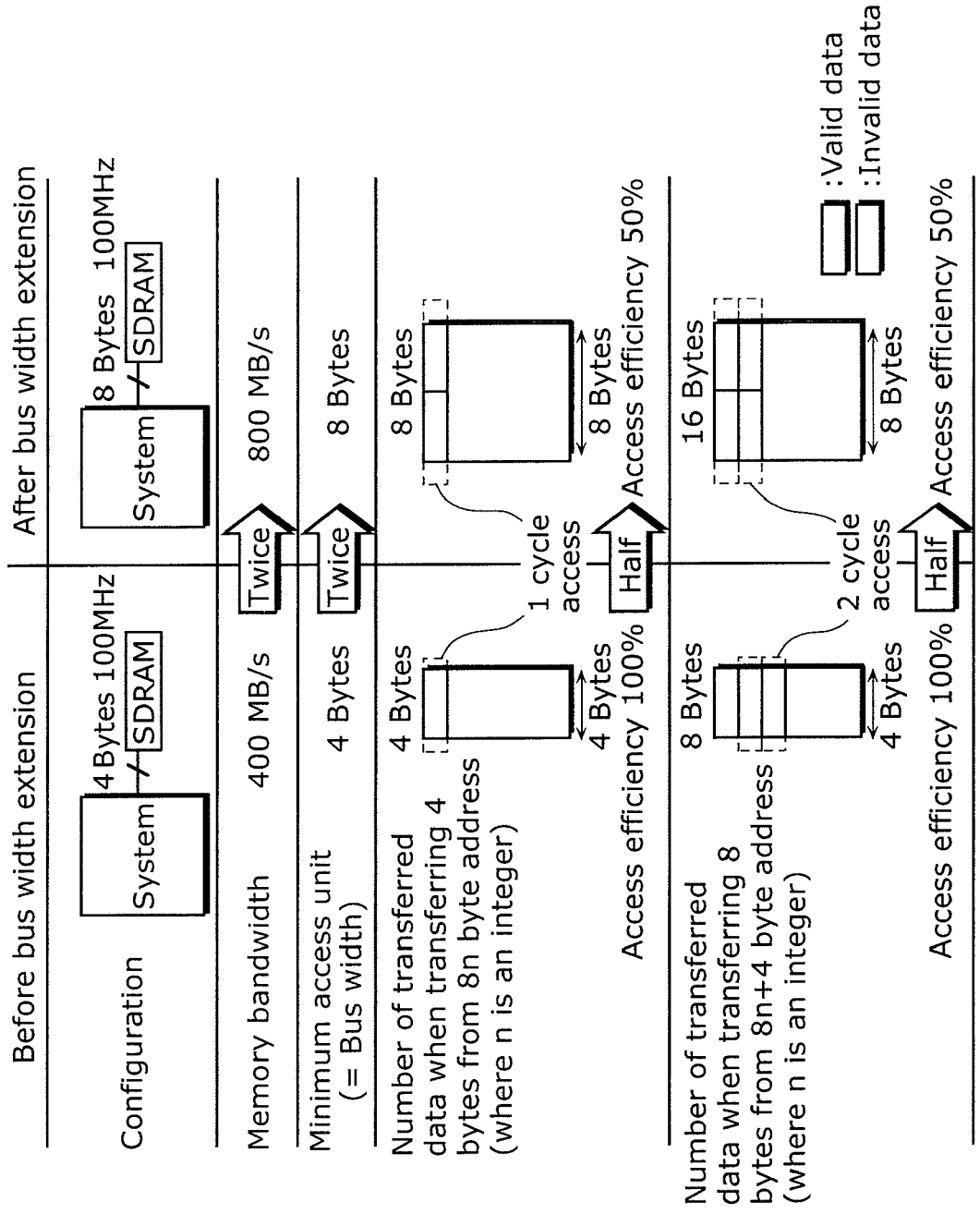
FIG. 32 is a comparative diagram showing a problem with the conventional memory device.

FIG. 5 is a timing chart showing the effect of the first embodiment described above clearly, and shows a case in a system where the 4-byte bus memory devices (SDRAMs) shown in FIG. 32 are simply connected in parallel as a theoretical SDRAM with 8-byte bus and similar data transfer is performed. Here, the minimum access unit to the memory device is per 8 bytes, which is equal to the bus, and thus it is possible to obtain data from the memory devices at the two cycles t7 and t8 in FIG. 5 when transferring 16 bytes from the first 8-byte boundary. However, in the subsequent transfer of 16 bytes from the address which does not point an 8-byte boundary, as shown in the 3 cycles from t9 to t12 in FIG. 5, it is necessary to transfer the total of 24 bytes from the 24 byte address to the 48 byte address, which reduces the access efficiency.

As described above, in the first embodiment, in terms of the system, it is possible to the memory bandwidth equal to the connected 8-byte SDRAM, and the data transfer can be controlled while reducing the access address boundary to the minimum access unit of one of the memory device to be used (per 4 bytes in the first embodiment). This allows more effective use of the memory bandwidth in a system with low granularity of the access starting address.

Note that the memory control device 101 according to the first embodiment may be configured as shown in FIG. 6. More specifically, the command control unit 107 shown in FIG. 6 has the same functions as the command generating unit 102, the command issuing units 104 and 105 shown in FIG. 1A altogether.

Note that in the first embodiment, the example shows a case two 4-byte bus SDRAMs are connected as the memory devices for use, however, the bus width of the memory device for use may be at any bus width, and the number of devices may also be any number. Furthermore, the type of device is not limited to SDRAM, and other DRAMs such as DDR, DDR2, Direct-Rambus™, DRAM, XDR and memories other than DRAM such as SRAM and flush memory, as long as the memory device can be used as a recording medium. Here, the minimum access unit refers to a value determined by the bus width×the minimum burst length of one memory device.

The command generating unit 102 shown in FIG. 1A and the command control unit 107 shown in FIG. 6 is capable of dividing the access command from the master 200 into the minimum access units, and sorting the result to the command issuing unit which issues the commands to the device and access the device according to the memory mapping based on the minimum access unit.

Note that, in the first embodiment, the command issue order information issued by the command issuing unit, to the data control unit 106 is used as number information which indicates what number of data the command corresponds to, among the access commands from the master 200. However, control is performed using 1-bit information showing which memory device connected to is allocated higher as the number information.

When the memory device is not DRAM, the memory device may take the configuration which may not need the command issuing unit. Furthermore, it is possible that the command generating unit 102 directly notifies the data control unit 106 of the command issue order control information.

Figure 1B:
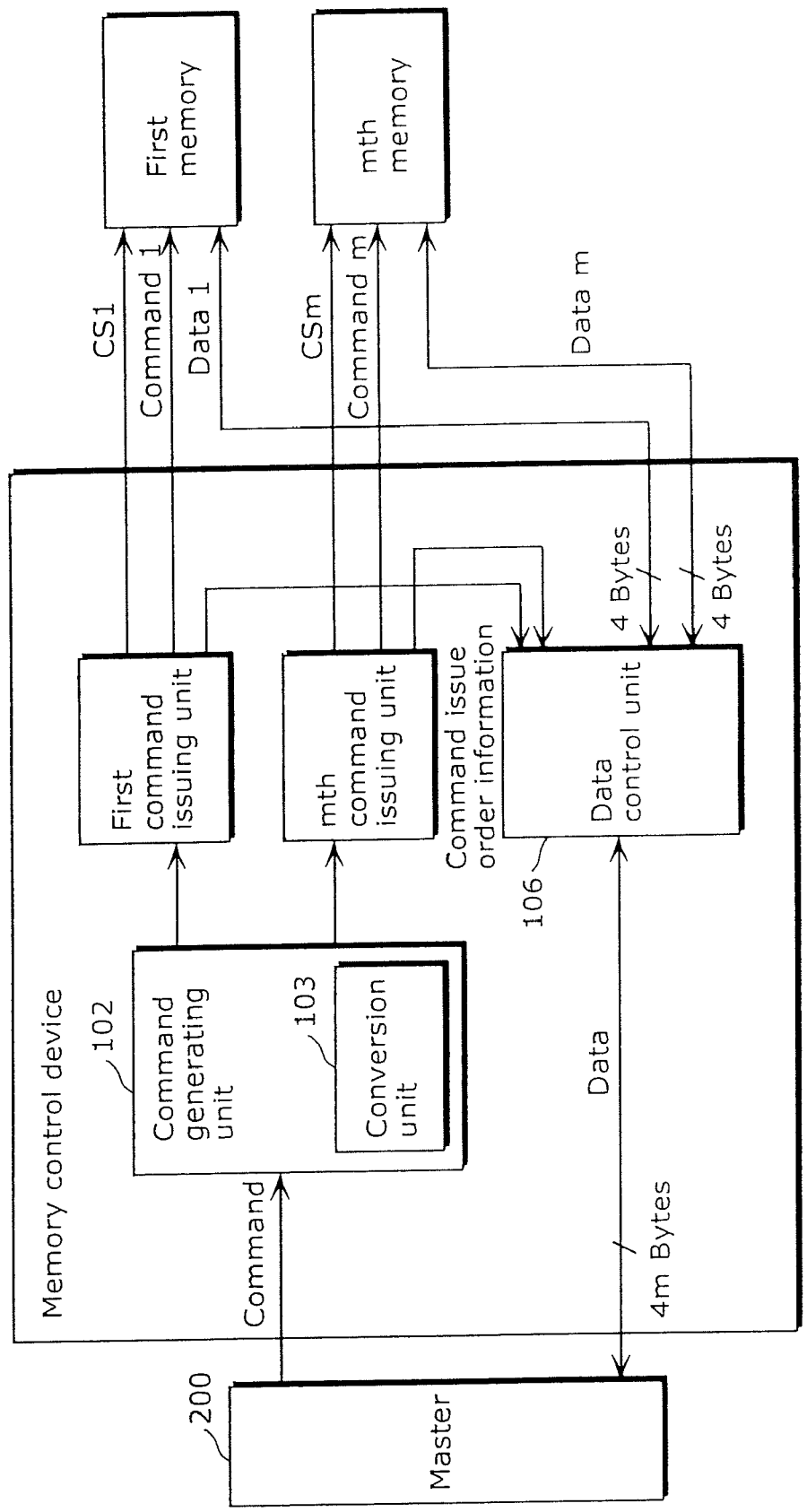
FIG. 1B is a block diagram showing a system configuration including a variation of the memory control device illustrated in FIG. 1A.

In addition, although two memory devices 0 and 1 are connected to the memory control device 101 in FIG. 1A, m memories may be connected as shown in FIG. 1B. Compared with FIG. 1A, the memory control device shown in FIG. 1B is connected to m memories from the first memory to m-th memory, instead of connecting two memories, and includes m command generating units from the first to m-th command issuing units instead of the two command generating units 104 and 105. The first to the m-th command issuing units are provided each corresponding to the first to the m-th memories.

Figure 6A:
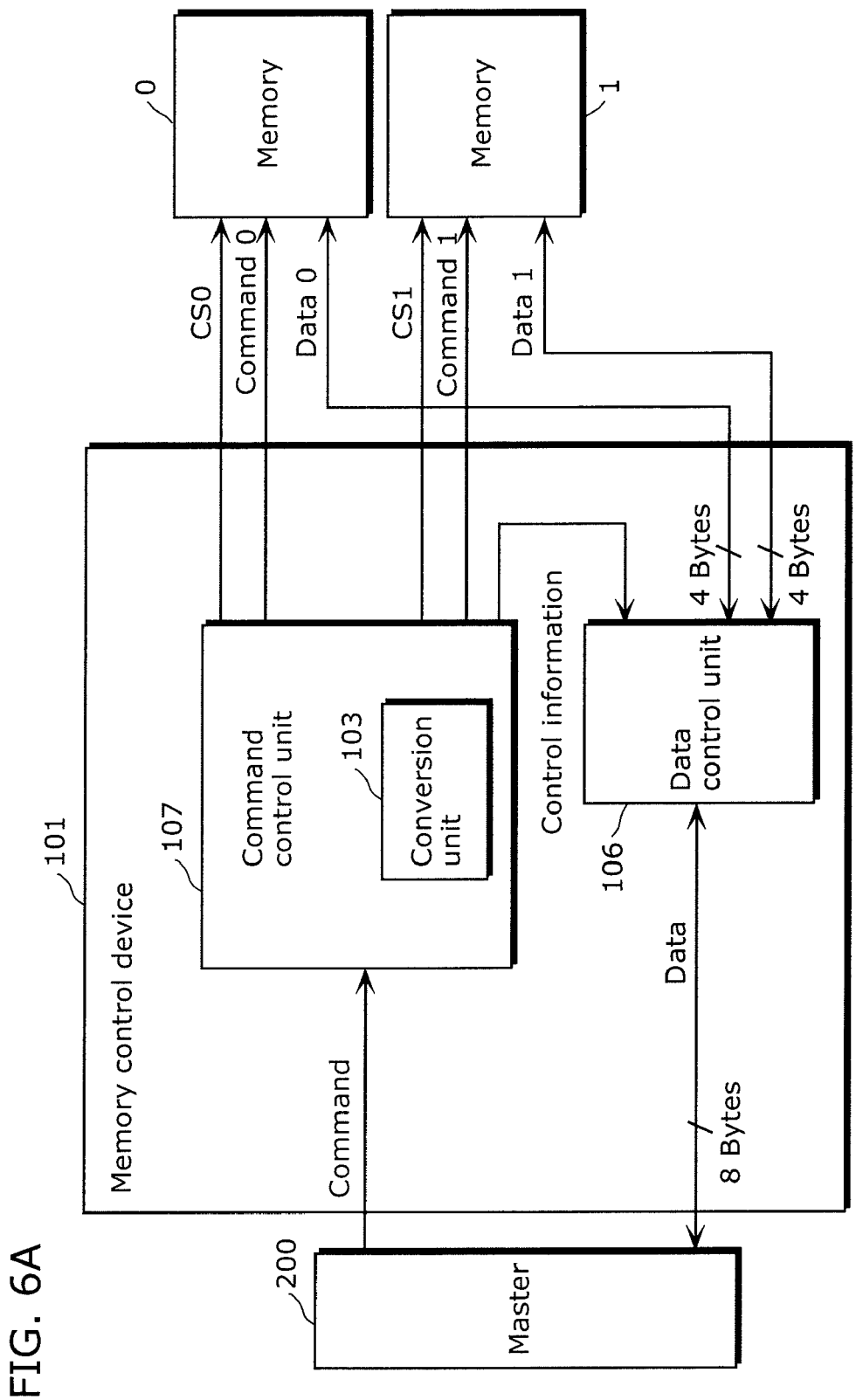
FIG. 6A is a block diagram showing a system configuration including a variation of the memory control device.
Figure 6B:
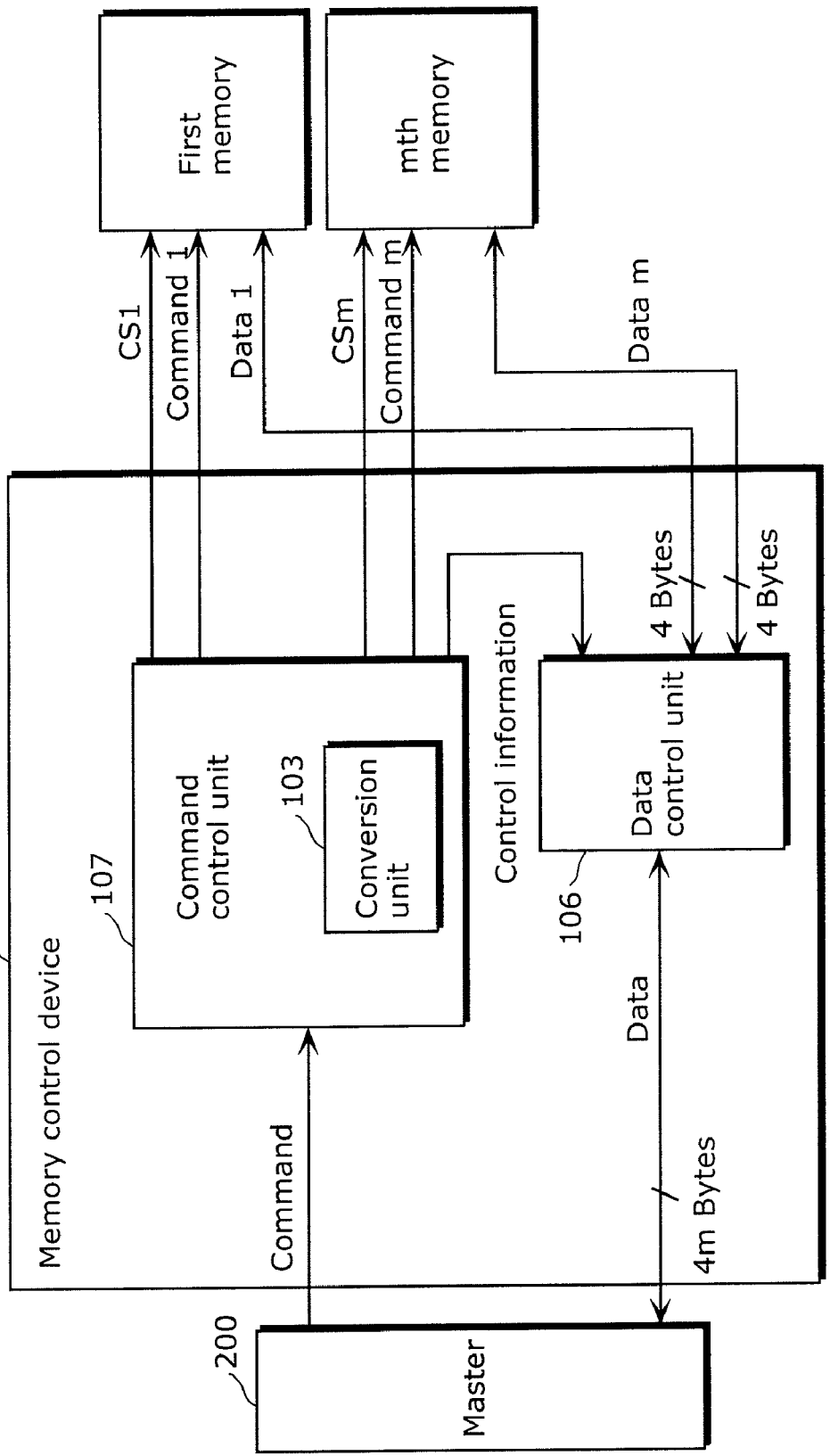
FIG. 6B is a block diagram showing a system configuration including a variation of the memory control device illustrated in FIG. 6A.

Similarly, the memory control device shown in FIG. 6A may be connected to m memories as shown in FIG. 6B.

Second Embodiment

In the second embodiment, a configuration of a memory control device which allows miniaturization of the circuit by significantly reducing the wiring area of the address bus compared to the first embodiment, while the performance is not significantly deteriorated.

The command control unit in the second embodiment is connected to the memory devices via an address bus common to the memory devices and chip select signal lines individual to the memory devices. The command control unit (i) simultaneously asserts the respective chip select signals and output the identical physical address to the memory devices when the divided access commands indicate the identical physical address, and (ii) asserts the respective chip select signals at different timings and output the different physical addresses to the memory devices when the divided access commands indicate the different physical addresses. As described above, shifting the timings (for example, for 1 cycle) causes delay for one cycle, however, it is possible to significantly reduce the wiring area of the address bus since it is not necessary to wire an individual address bus.

Figure 7:
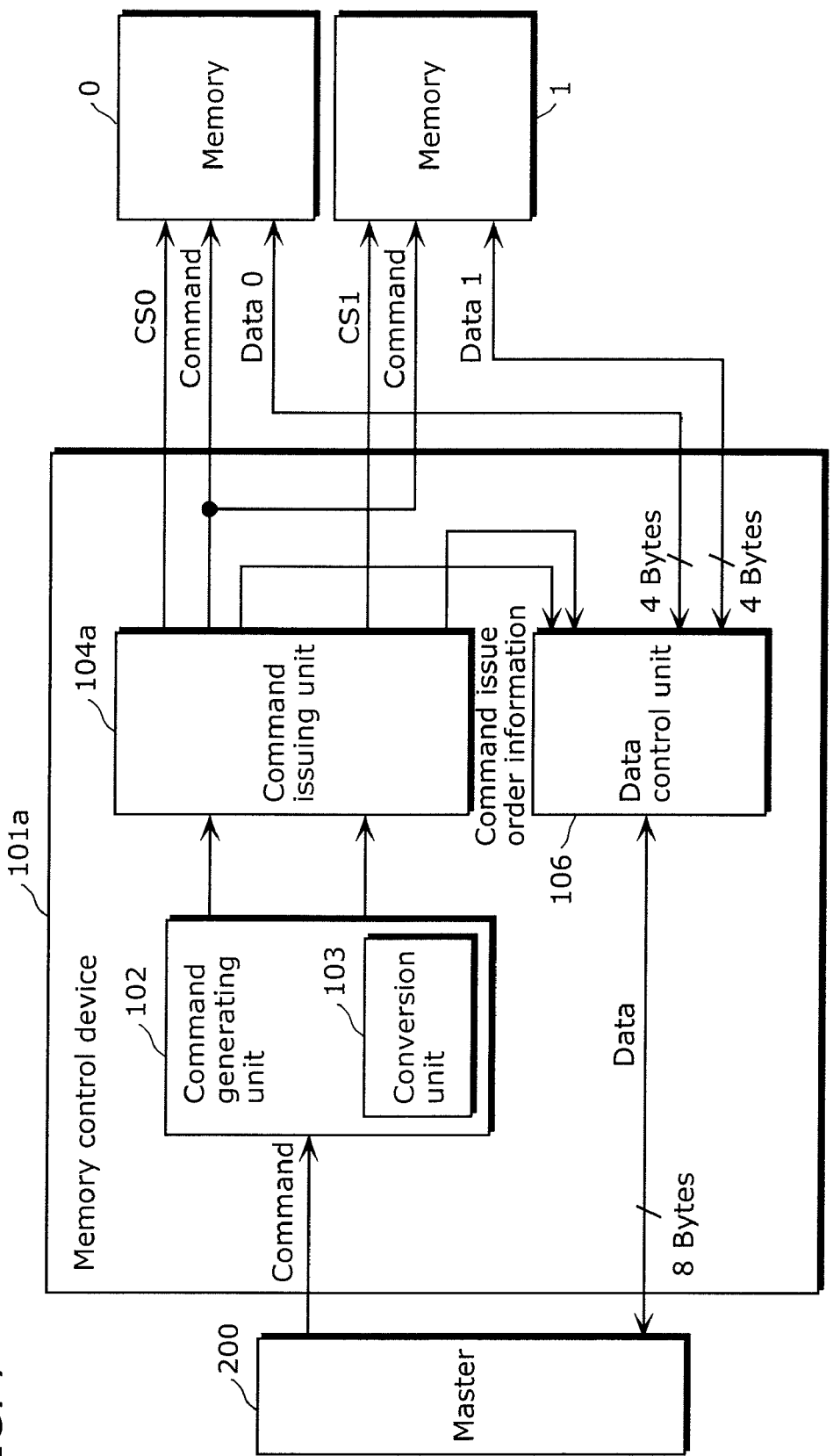
FIG. 7 is a block diagram showing a system configuration including a memory device according to a second embodiment of the present invention.

FIG. 7 is a block diagram showing an embodiment of the memory control device 101a according to the second embodiment. Here, the system configuration shows that one master 200 is connected to two 4-byte bus memory devices (SDRAMs) via the memory control device 101a. The memory control device 101a is configured of the command generating unit 102, the data control unit 106, and the command issuing unit 104a to which the CS signals from the memory devices are individually connected and the other command signals are commonly connected to the memory devices. The memory access command from the master 200 is input to the command generating unit 102 via the command bus. Here, the memory access command includes data indicating the direction of data transfer, data transfer size, and access starting address of the memory.

The command generating unit 102 which received the memory access command from the master 200 first divides the received command into commands with minimum access unit of the connected memory device (4 bytes in the second embodiment). Subsequently, device-specific access commands each corresponding to respective one of the devices are generated based on the address mapping of the memory device which will be described later, and the command generating unit 102 issues the device-specific access commands to the command issuing unit 104a.

The command issuing unit 104a and each of the memory devices are connected, on one-to-one basis, with the chip select signal lines (CS) which controls the memory devices, and are connected with the common command signal.

The command issuing unit 104a which received the device-specific access commands from the command generating unit 102 (case 1) simultaneously asserts the individually-connected chip select signals CS when the addresses of the received commands are the identical address (bank, row, col) in each memory device, and outputs commands that can be issued to the memory devices according to the timing specification of the memory device, and (case 2) asserts CS that are individually connected at different timings, and outputs commands suitable for each memory device when the received commands have different addresses (bank, row, col) for each memory device. Furthermore, the command issuing unit 104a notifies the data control unit 106 of the command issue order information indicating the issue order of the command issued to the memory device based on the timing specification.

On the other hand, the data transfer between the master 200 and the memory devices are transferred via an 8-byte data bus between the master 200 and the data control unit 106. Here, the data bus may be a bidirectional bus, or may also be two buses, respectively dedicated to written data and read data.

Dedicated 4-byte data buses are connected to the data control unit 106 and each of the memory devices. When writing data on the memory device from the master 200, the data control unit 106 divides the 8-byte data from the master 200 for the 4-byte data buses each connected to each memory device based on the command issue order information received from the command issuing unit and according to the above-described (case 1) and (2) and transfers the divided data. When reading the data from the memory device, the 4-byte output data from each of the memory devices are combined into 8-byte data based on the command issue order information received from the command issuing unit, according to the above-described (case 1) and (2) and transfers the data to the 8-byte data bus connected to the master 200. This control keeps consistency of the command issued to the memory device and the transferred data.

The address mapping for the memory devices according to the second embodiment is same as the address mapping shown in FIG. 2 described in the first embodiment, and as shown in FIG. 2, in the mapping, for the consecutive addresses designated by the master 200, devices are switched for each minimum access unit of the connected memory device (4 bytes in the second embodiment). Here, it is not necessary to determine how the consecutive addresses designated by the master 200 are mapped into the physical addresses (Bank, Row, Column) of each memory device. However, in terms of preventing frequent switching of rows in the same bank within the device which reduces access efficiency, it is preferable that the mapping is performed such that the same row in the same bank is sequentially allocated for the consecutive addresses designated by the master 200, and switched to a row in a different bank when all areas in one row are accessed within the device, as shown in FIG. 2.

Next, the operation in the command generating unit 102 is described. FIG. 3 shows a flowchart of the command generating unit 102. As shown in FIG. 3, the command generating unit 102 performs different processing whether the starting address of the command received from the master 200 points an 8-byte boundary or not. When the starting address points an 8-byte boundary (when the staring address is 8n byte (where n is an integer)), access commands to address n are respectively issued by the components controlling the memory device 0 and the memory device 1 respectively included in the command issuing unit 104a which manage the memory device 0 and the memory device 1. Subsequently, n is incremented by one, and the process is repeated until the requested transfer size from the master 200 is satisfied.

Meanwhile, when the starting address does not point an 8-byte boundary (when the starting address is 8n+4 byte (where n is an integer)), the command generating unit 102 issues an access command for an address n+1 to the part in the command issuing unit 104a which controls the memory device 0, and an access command for an address n to the part in the command issuing unit 104a which controls the memory device 1. Subsequently, n is incremented by one, and the process is repeated until the requested transfer size from the master 200 is satisfied.

Here, when specifying the memory devices as the memory device 0 and the memory device 1 for each 8-byte boundary, the command issued by the master 200 that can access, via the memory control device 101a of the present invention, the memory device using both logical address and image address is divided and converted in the command generating unit 102 according to the address map shown in FIG. 2, and the addresses are 1) identical between the memory devices when the command ranges from the memory device 0 to the memory device 1, and 2) different when the command ranges from the memory device 1 to the memory device 0 on the memory devices. According to the second embodiment, storing data in the memory device and providing readable arrangement as described above allows issuing different addresses to the memory device 0 and the memory device 1 at different timings in the case of 2), and issuing the different memory devices 0 and 1 the identical address simultaneously in the case of 1).

Figure 8:
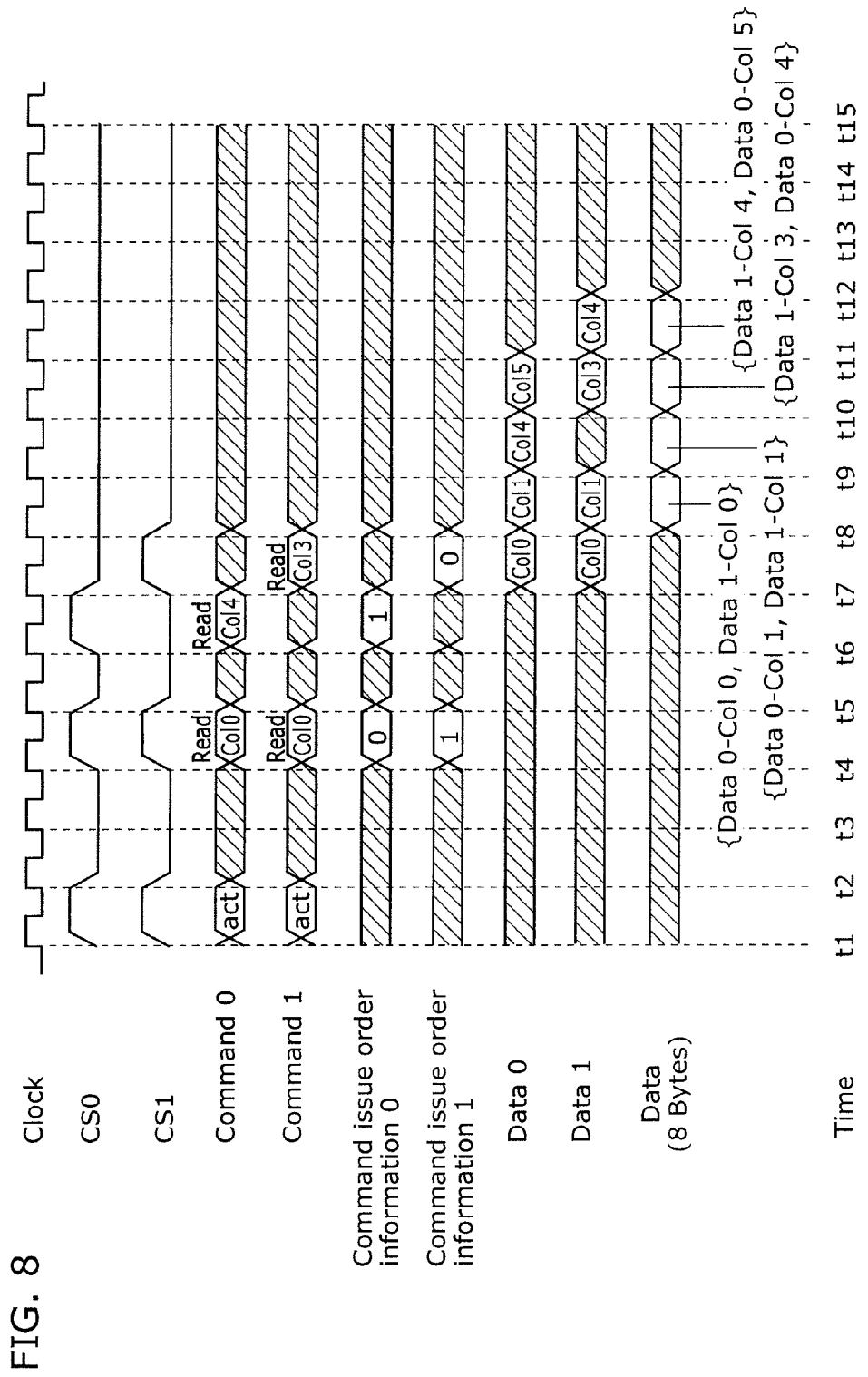
FIG. 8 is a timing diagram showing an operation of the memory control device.

FIG. 8 is a timing chart showing an example of the operational timing of the memory control device 101a according to the second embodiment. Here, an SDRAM having tRCD=3 cycles and CL=3 cycles is used with the burst length 2 (BL=2), and the control signals to the memory devices and the operational timing of the read data bus to the master 200 when [1] a 16-byte data read command from 0 byte address and [2] a 16-byte data read command from 28 byte address are successively issued from the master 200. Note that the common command bus is described as individual command buses as described in the first embodiment, in order to clearly describe the operation in the second embodiment.

Regarding the first read command for 16-byte data from the 0 byte address, the command generating unit 102 issues access commands to the address "0" to both of the command issuing units since the starting address points an 8-byte boundary (8n byte address and n=0). Since the burst length is 2, the process ends to transfer 16 bytes with the command. As shown in FIG. 8, the command issuing unit 104a which received the command issues, at t1, an activate command for the bank 0/Row 0 for accessing the designated address. Subsequently, simultaneous with issue of the read command for Column 0, the command issuing unit 104a issues, to the data control unit 106, command issue order information 0, 1 each of which indicates the correspondence of the issued command to what number of data in an order of the access command of the master 200 at t4, so as to satisfy tRCD. After the read command is issued, the memory devices respectively output desirable read data in the period where the burst number is 2 from t7 after CL=3. In response to the data, the data control unit 106 transfers 8-byte data to which the 4-byte output data from the memory device 0 is allocated higher and the 4-byte output data from the memory device 1 is allocated lower to the master 200 at the cycle from t8 based on the command issue order information received at the cycle from t4. Reading the first 16 bytes is completed by performing the same process for the latter half of the burst in t9 as well.

On the other hand, regarding the subsequent 16-byte data read command from the 28 byte address, the command generating unit 102 issues an access command for the address "4" and burst length=2 to the part in the command issuing unit 104a which controls the memory device 0, and an access command for the address "3" and the burst length of 2 to the part in the command issuing unit 104a which controls the memory device 1, since the starting address does not point an 8-byte boundary (8n+4 byte address and n=3), and ends the process for the subsequent command. The command issuing unit 104a which received the command, since the activation command for the bank 0/Row 0 has already been issued at t1, issues a read command for column 4 with the burst length of 2 in the part in the command issuing unit 104a which controls the memory device 0 at t6, which is a next cycle after the cycle where the issue of the first command is completed. The part in the command issuing unit 104a which controls the memory device 1 does not issue a command at t6, and issues a read command at t7 to column 3 with the burst length of 2. Simultaneously with the issue of commands by the command issuing unit 104a at t6 and t7, the command issuing unit 104a outputs the command issue order information 0 and 1 each of which indicate the correspondence of the issued command to what number of data in an order the access command of the master 200, respectively to the data control unit 106. After the read command is issued (t6), the memory device 0 outputs read data with the burst length of 2 from t9 after CL=3. After the read command is issued (t7), the memory device 1 outputs read data with the burst length of 2 from t10 after CL=3. In response to the data, the data control unit 106 transfers 8-byte data to which the 4-byte output data from the memory device 0 at the cycle from t10 is allocated higher and the 4-byte output data from the memory device 1 is allocated lower at the cycle from t11 to the master 200, based on the command issue order information received at the cycle from t6. Reading subsequent 16 bytes is completed by performing the same process on the data in the latter half of burst.

With the control described above, upon access request from the master 200, when the access starting address is not in the boundary of the connected total bus width, and the requested transfer size exceeds the total data bus width (in the first embodiment, the data bus width: 8 bytes, the access starting address: 24 byte, and the requested transfer size: 16 bytes), independent access to the memory device 0 and the memory device 1 is possible with different addresses by shifting the timing of CS. Thus, it is possible to enhance the access efficiency compared to the conventional system described below without increasing the number of pins in the system LSI.

Figure 9:
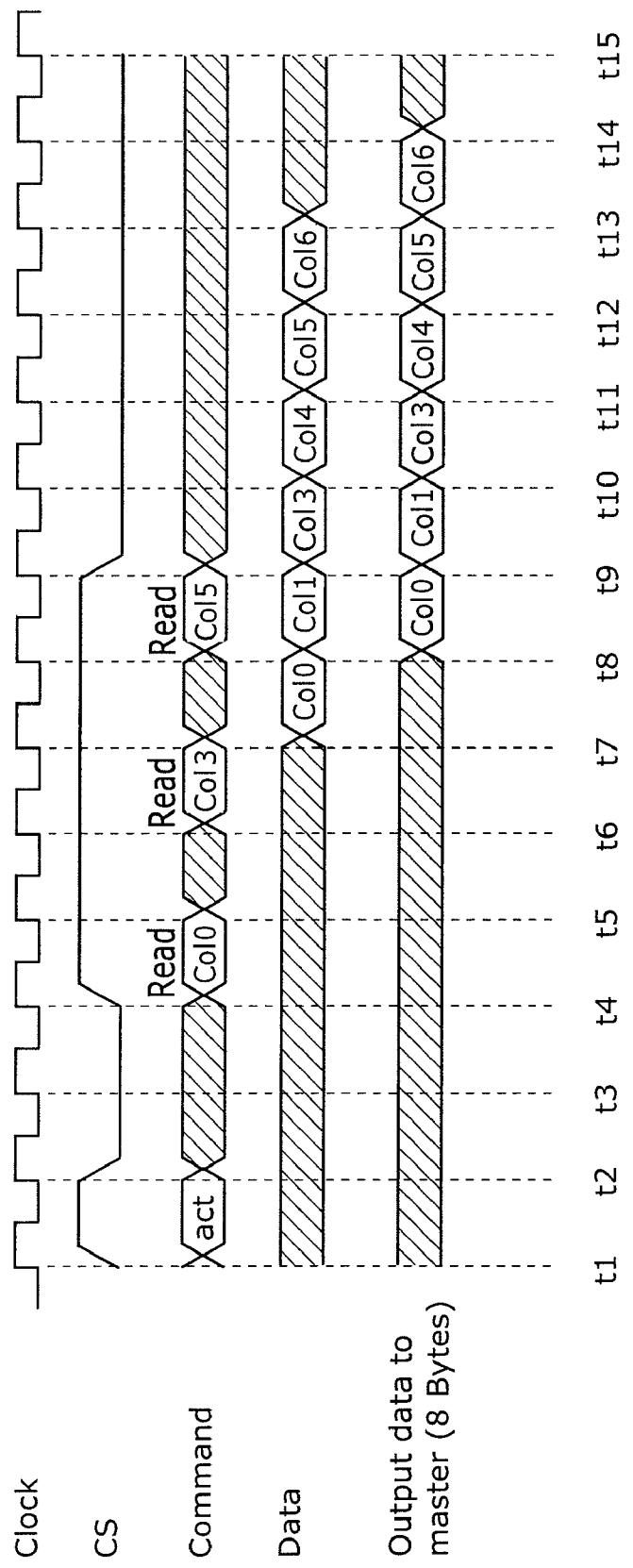
FIG. 9 is a timing diagram showing the operation in a conventional example.
Figure 33:
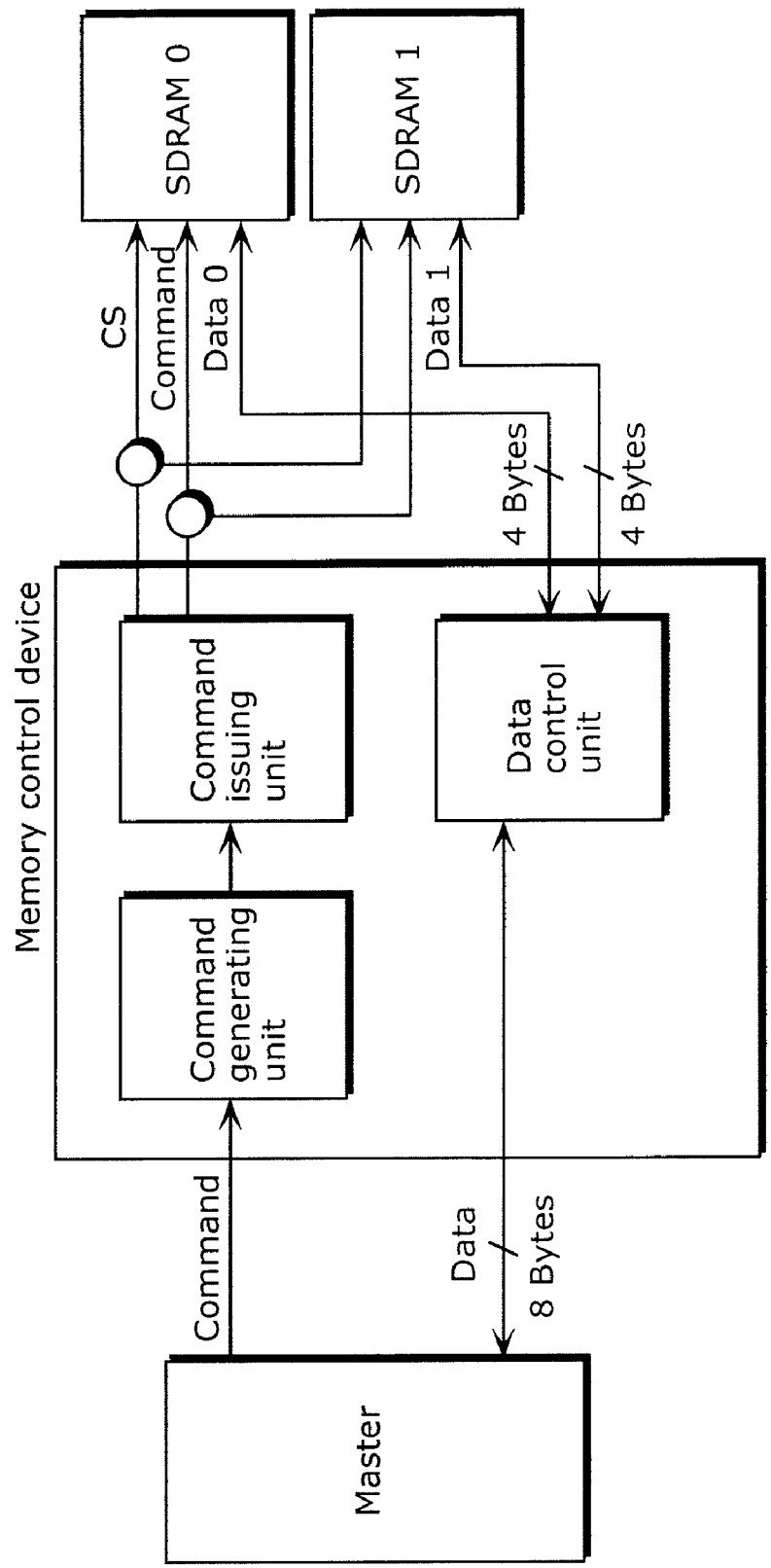
FIG. 33 is an example of a conventional memory device which allows high-speed and large-capacity transfer.

FIG. 9 is a timing chart showing the effect of the second embodiment described above clearly, and shows a case in a system where the 4-byte bus memory devices (SDRAMs) shown in FIG. 33 are simply connected in parallel as a theoretical SDRAM with an 8-byte bus, and similar data transfer is performed with the burst length of 2. Here, since the minimum access unit for the memory devices is per 8 bytes, which is equivalent to the bus, the 16 bytes transfer from the first 8-byte boundary can be obtained from a memory device at 2 cycles, at t7 and t8 in FIG. 9. Meanwhile, the 16 bytes transfer from the subsequent address which does not point the 8-byte boundary requires a transfer of 32 bytes in total from the 24 byte address to the 56 byte address for 4 cycles from t9 to t13 in FIG. 9 to transfer the data with two bursts per command (16 bytes), and thus the access efficiency is significantly reduced.

As described above, in the second embodiment, in a system where an 8-byte SDRAM with the burst length of 2 or more is connected, command signal (address line, row, col, we, and others) is commonly input to each memory device, and only CS signals are individually input to each of the memory devices. Thus, it is possible to use a memory bandwidth equivalent to an 8-byte bus without significantly increasing the external terminals of system LSI, and to control data transfer by reducing the access address boundary to a minimum access units of a memory device to be used (per 8 bytes in the second embodiment). This allows more effective use of memory bandwidth in a system where the granularity of access starting address is small.

As described above, in a memory control device in the second embodiment, the command control unit is connected to the memory devices via an address bus common to the memory devices and chip select signal lines individual to the memory device. The command control unit (i) simultaneously asserts the respective chip select signals and output the identical physical address to the memory devices when the divided access commands indicate the identical physical address, and (ii) asserts the respective chip select signals at different timings and output the different physical addresses to the memory devices when the divided access commands indicate the different physical addresses. When the memory access request is a write request, the data control unit divides the write data from the master to the data for each of the memory devices, and outputs the data to each memory device according to the timing of the access command, and when the memory access request is a read request, combine the data read from the memory device according to the access command according to the timing of the access command, and outputs the data to the master.

In addition, the command control unit includes a command generating unit and command issuing units each provided in each memory device. The command generating unit converts the logical address included in the memory access request to a physical address for each memory device, and divides the physical address into access commands for each of the memory devices. Each of the command issuing units issues an access command from the command generating unit to the corresponding memory device. Here, the command generating unit outputs the access commands to the command issuing units at the same timing when the physical addresses of the memory devices each corresponds to one of the divided access commands are identical, and outputs the access commands to the command issuing units at different timings when the physical addresses of the memory devices each corresponds to one of the divided access commands are different.

Here, when the memory devices are two memory devices, the first and the second memory devices, the command control unit converts the access request to the first access command and the second access command. The first memory device and the second memory device store data such that: (i) the physical address corresponding to the first access command and the physical address corresponding to the second access command are identical when the access request starts with data in the first memory device, and a start of the data matches an alignment of a data bus corresponding to the first memory device and the second memory device; and (ii) the physical address corresponding to the first access command and the physical address corresponding to the second access command are different when the access request starts with data in the second memory device, and the start of the data does not match the alignment of the data bus corresponding to the first memory device and the second memory device.

Here, the command control unit switches the identical address and the different addresses by delaying the timing for outputting an address and a chip select signal for each of the memory devices when the physical addresses of the memory devices are different, each of the memory devices corresponding to one of the access commands.

With this, it is possible to extend the memory bandwidth without increasing the minimum access unit, and suppress the increase of invalid data transfer.

Figure 10:
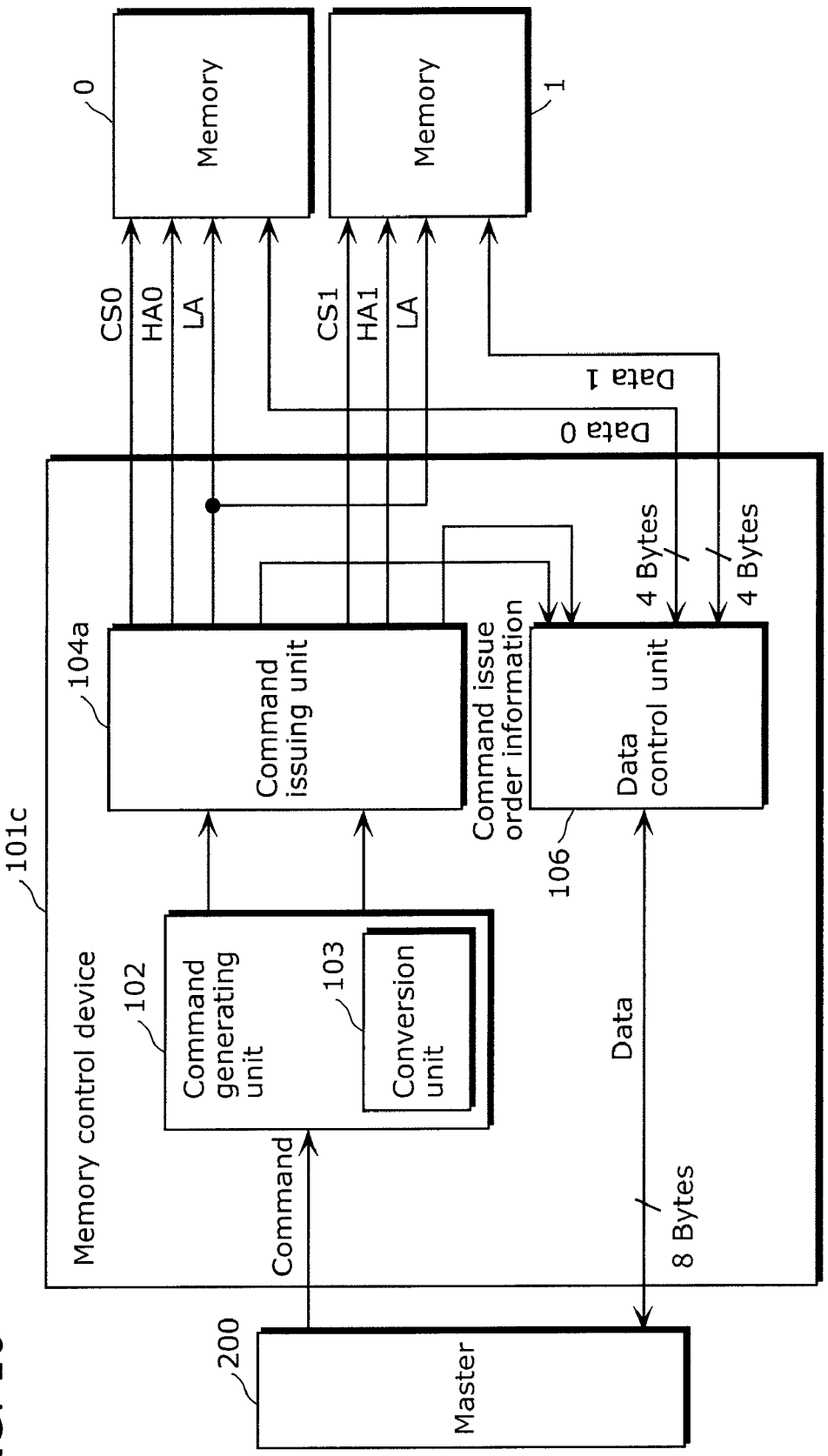
FIG. 10 is a block diagram showing a system configuration including a variation of the memory control device.

Note that FIG. 10 shows a variation of a memory control device according to the second embodiment. In the memory control device 101c in FIG. 10, the command control unit is connected to the memory devices via the first address bus common to the memory devices, the second address bus individual to the memory devices and the chip select signal lines individual to the memory devices. The first address bus and the second address bus are respectively a part of the address signal line and the other part of the address signal line configuring the address bus.

With this, since the address bus includes a common part and an individual part, it is possible to significantly reduce the wired area of the address bus compared to the case where all of the address buses are individually wired.

Figure 34A:
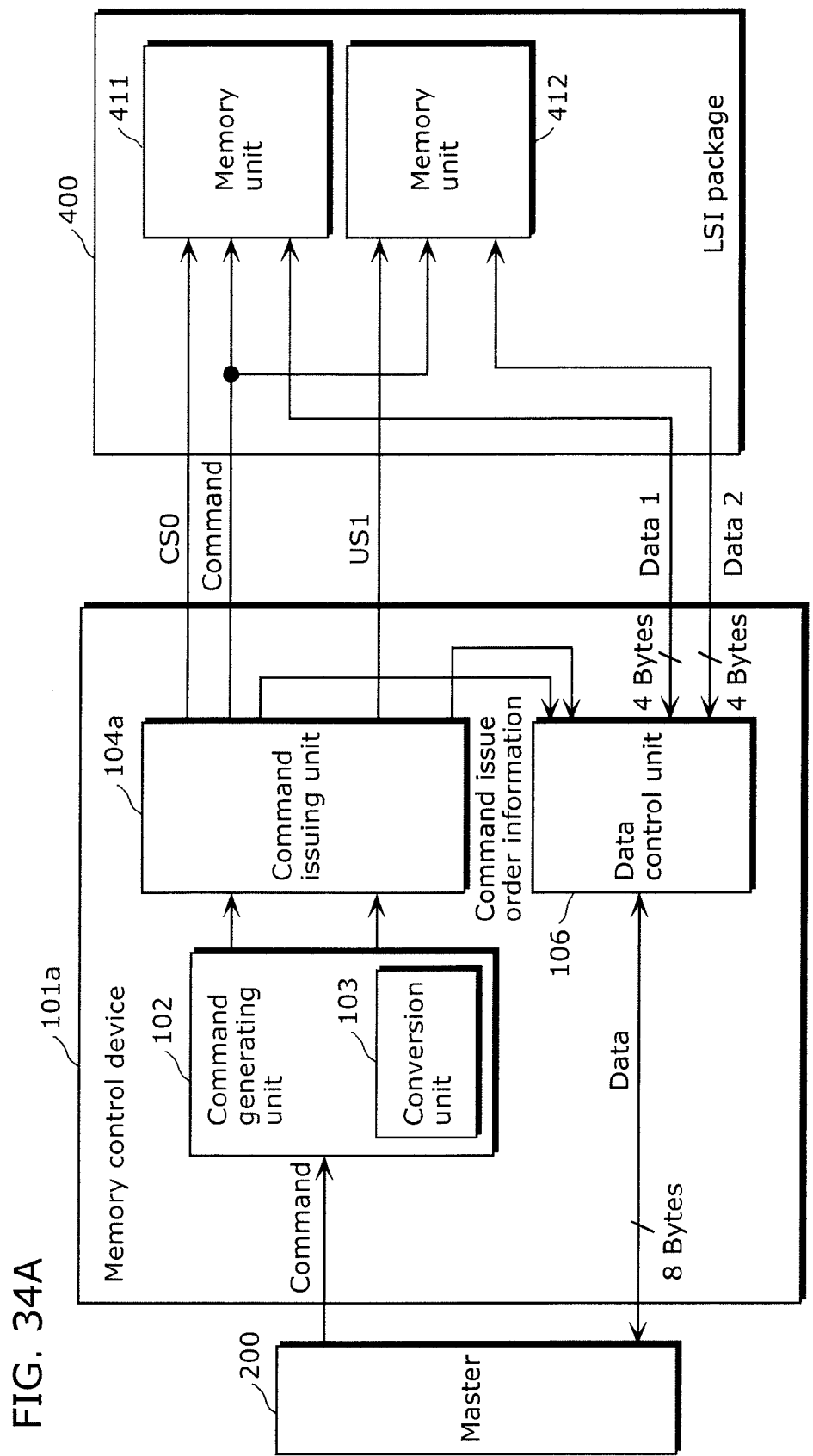
FIG. 34A shows a variation of the memory device according to a second embodiment.

FIG. 34A shows a variation of the memory device according to the second embodiment. FIG. 34A is different from FIG. 7 in that the memory device 400 is provided instead of the memory device 0 and the memory device 1. The memory device 400 is packaged into one-chip LSI.

Figure 34B:
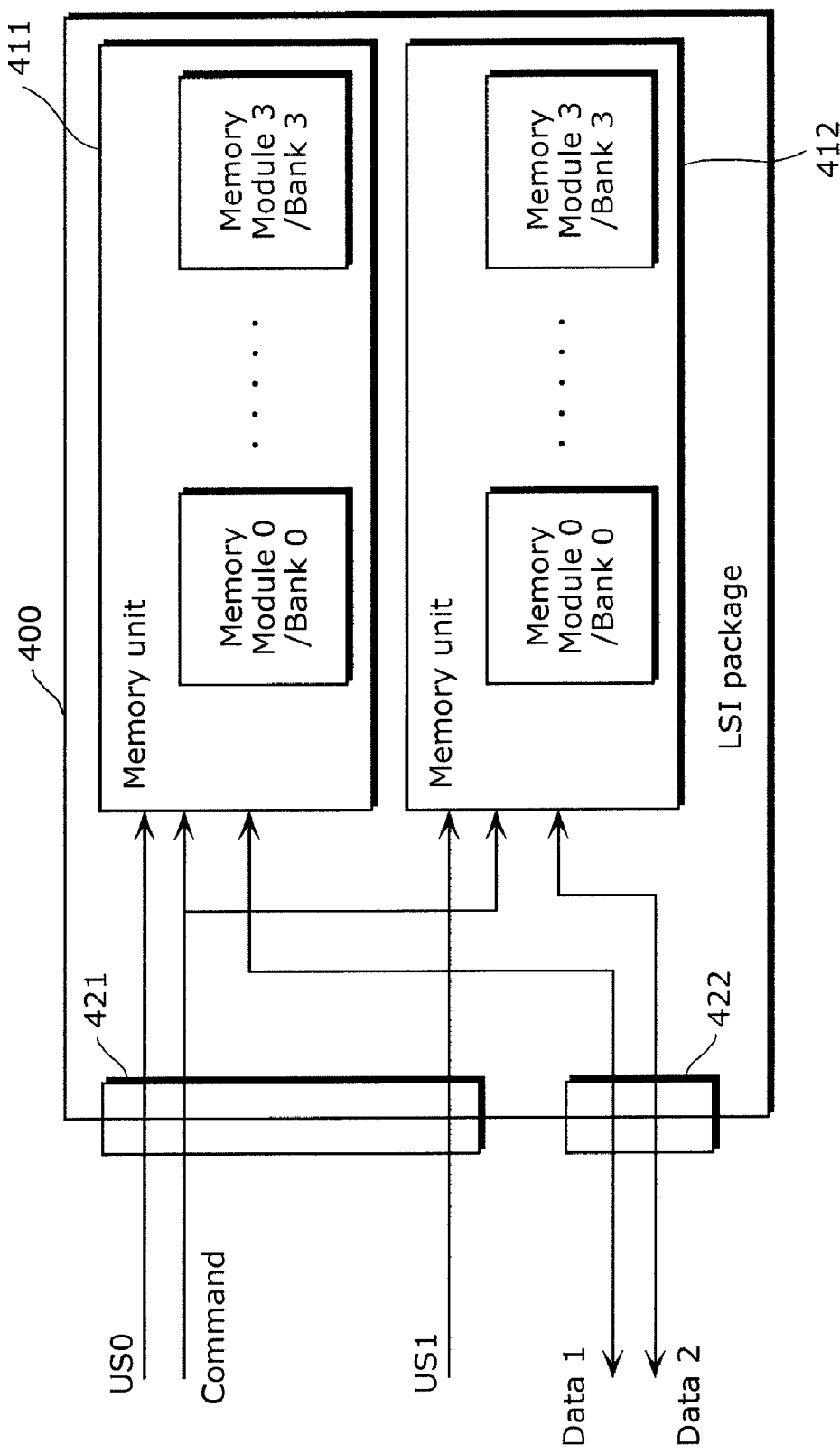
FIG. 34B shows a more specific configuration of the memory device.

FIG. 34B shows a more specific configuration of the memory device 400. Them memory device 400 includes memory units 411 and 412, a command interface 421, and a data interface 422.

The memory unit 411 shows a memory unit access-controlled as a regular DRAM addressed by row address and column address including memory modules 0 to 3, for example. The memory modules 0 to 3 are, for example, 0 to 3 of regular banks, or a group of pages 0 to 3. The memory unit 412 is configured in the same manner.

The command interface 421 receives an access command from an external memory control device 101a, and supplies the access command to the memory units 411 and 412.

The data bus is bit-divided into partial buses as many as the two memory units 411 and 412.

The data interface 422 inputs and outputs data individually via data bus between the outside and each of the memory units 411 and 412 according to the synchronization signal supplied from outside.

In the second embodiment, access to memory devices is performed by switching the control by the identical physical address and different physical addresses, in order to reduce the minimum access unit. Meanwhile, in FIG. 34A, the single-packaged memory device 400 is included instead of multiple memory devices. The memory device 400 in FIG. 34A may include controllable memory unit such as a regular DRAM (including DDR, DDR2 and others) as base unit, include multiple (2 in FIG. 34A) base units, and packaged into one or more packages (one in FIG. 34A). Furthermore, the memory device 400 may include multiple memory units as described above, and may include CS signals (US signals in FIG. 34B) and data buses as many as the number of the memory units, and one common command bus as input and output.

FIG. 35A shows another variation of the memory device according to the second embodiment. In the same manner as in FIG. 34A, the memory device 400a includes multiple memory units (2 in FIG. 35A), a command interface and a data interface, and packaged into one or more packages (1 in FIG. 35A). Furthermore, the memory device 400 includes a command conversion unit 401 which outputs a signal for selecting each corresponding memory unit (in FIG. 34B, US0 and 1) when the unit information indicating whether the input command is valid or invalid for each memory unit (hereinafter referred to as unit numbers) is input. More specifically, the command conversion unit 401 converts the unit information into select signals specific to each of the memory units, and supplies the converted select signal to each of the memory units. Adopting this configuration has an advantage that the number of signal line necessary for input/output of the memory device shown in FIG. 34A is reduced further by using signals indicating the unit numbers instead of the US signals which require the number of signal lines to be as many as the memory units, and thus the wiring area where the memory control device 101a and the memory device 400a are connected is further reduced. This allows miniaturization of a circuit.

Note that the unit number may be substituted by a signal such as the conventional DRAM bank addresses.

The memory device 400a as described above includes multiple memory units and one command conversion unit, and has data buses as many as the number of the memory units and one common unit number designation bus, and a command bus as input and output.

Advantages according to the method described above include the number of memory device to be used can be reduced to one, suppressing the number of wiring in actual set substrates, reducing the difficulty upon designing. Therefore the setting cost can be significantly reduced.

Figure 35B:
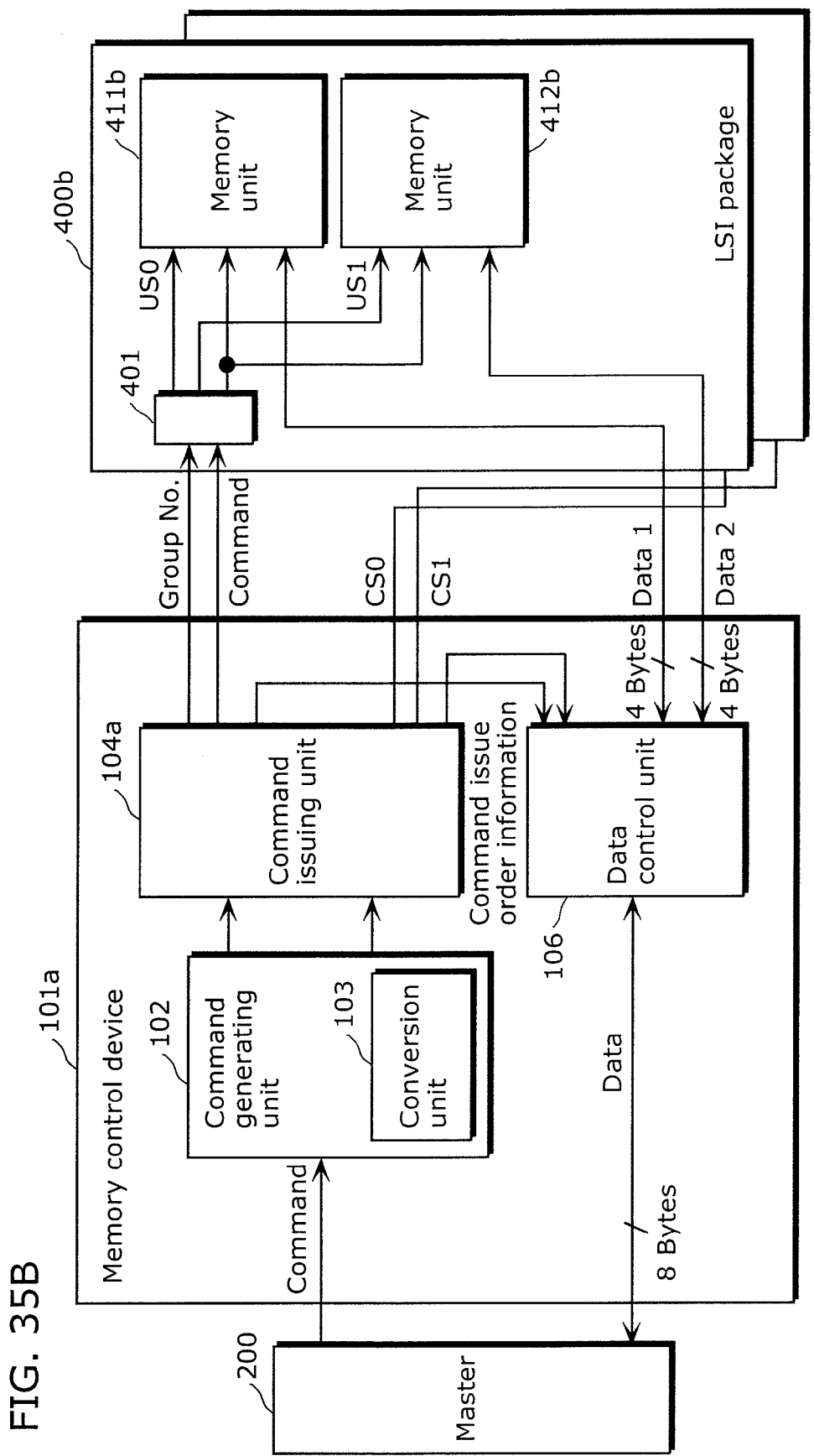
FIG. 35B shows another variation of the memory device according to the second embodiment.

FIG. 35B shows another variation of the memory device according to the second embodiment. When compared with FIG. 35A, FIG. 35B shows two packaged memory devices 400b instead of the one packaged memory device 400a. In the first example related to the memory capacity, the memory capacity of the two memory devices 400b is equivalent to one memory device 400a, and the capacity of the two memory units 411b is equivalent to one memory unit 411. Here, the one memory device 400a and the two memory devices 400b have the same memory capacity. In the second example related to the memory capacity, the memory capacity of each of the memory devices 400b is equivalent to one memory device 400a, and the capacity of each of the memory units 411b is equivalent to the capacity of one memory unit 411. In this case, the memory capacity of the two memory devices 400b is twice as much as the memory capacity of one memory device 400a. As described above, the memory control device 101a may be connected to multiple memory devices 400b packaged in multiple packages.

Third Embodiment

The following describes an arrangement of logical address to maximize the effect of the memory control device according to the first and second embodiments to the fullest extent.

Figure 11A:
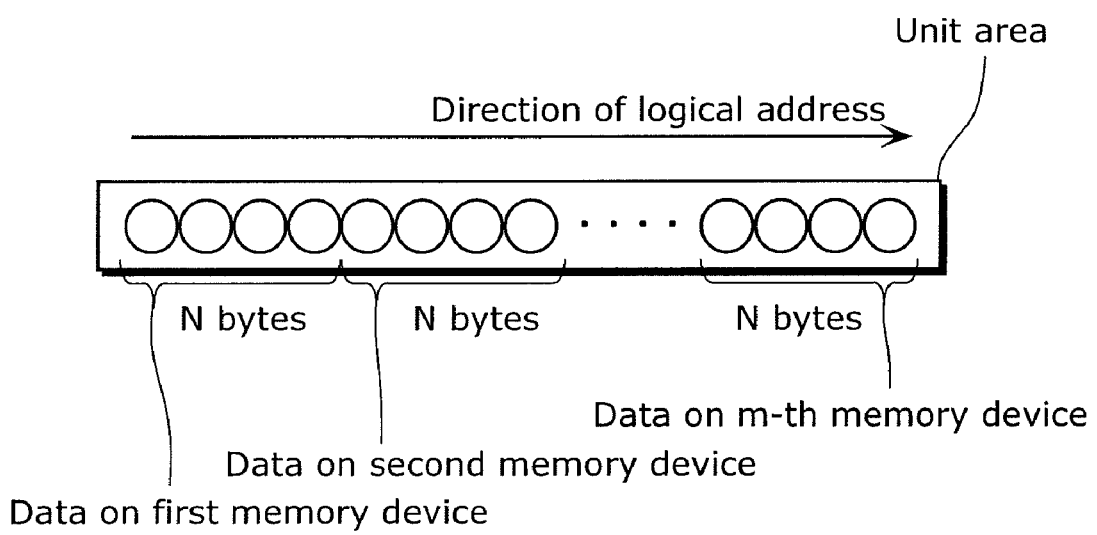
FIG. 11A shows a unit area used as base unit in a third embodiment of the present invention.

FIG. 11A shows a unit area as base unit for mapping the physical address in the logical address space. In FIG. 11A, it is assumed that the memory control device accessing m memory devices (here, DRAMs) for example, as shown in FIG. 1B and FIG. 6B are used. FIG. 11A shows a memory address arrangement on a DRAM, and physical address area in DRAM having n-bytes minimum access unit is arranged in the direction of logical address.

In FIG. 11A, the data on the first memory device is arranged for (N×integer) bytes, and the data on the second memory device is arranged for (N×integer) bytes. After repeating this process, the data of (N×integer) bytes on the m-th memory device is adjacently arranged. As described above, the adjacent (N×integer)×m bytes of data area is considered to be one unit (unit area). Here, the integer in ( ) may be any number. FIG. 11A shows a case where (N×integer) is (N×1), and N is 4.

Figure 11B:
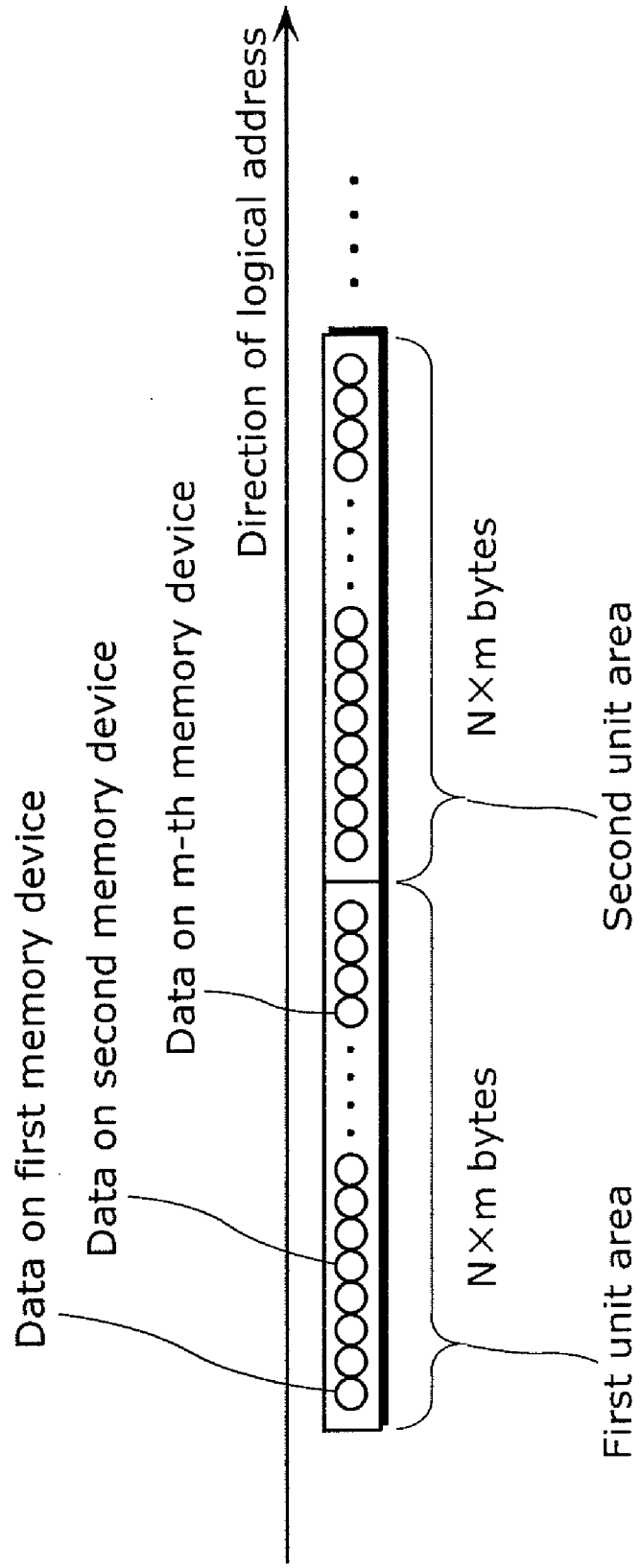
FIG. 11B is a schematic diagram showing the unit areas.

FIG. 11B shows the unit areas arranged in the direction of logical address. M (N×integer)-byte areas respectively corresponding to the first to m-th memory device are sequentially arranged in each unit area.

This arrangement allows access with the N-byte address arrangement in response to a data request in the logical address direction, which results in efficient access.

Figure 12:
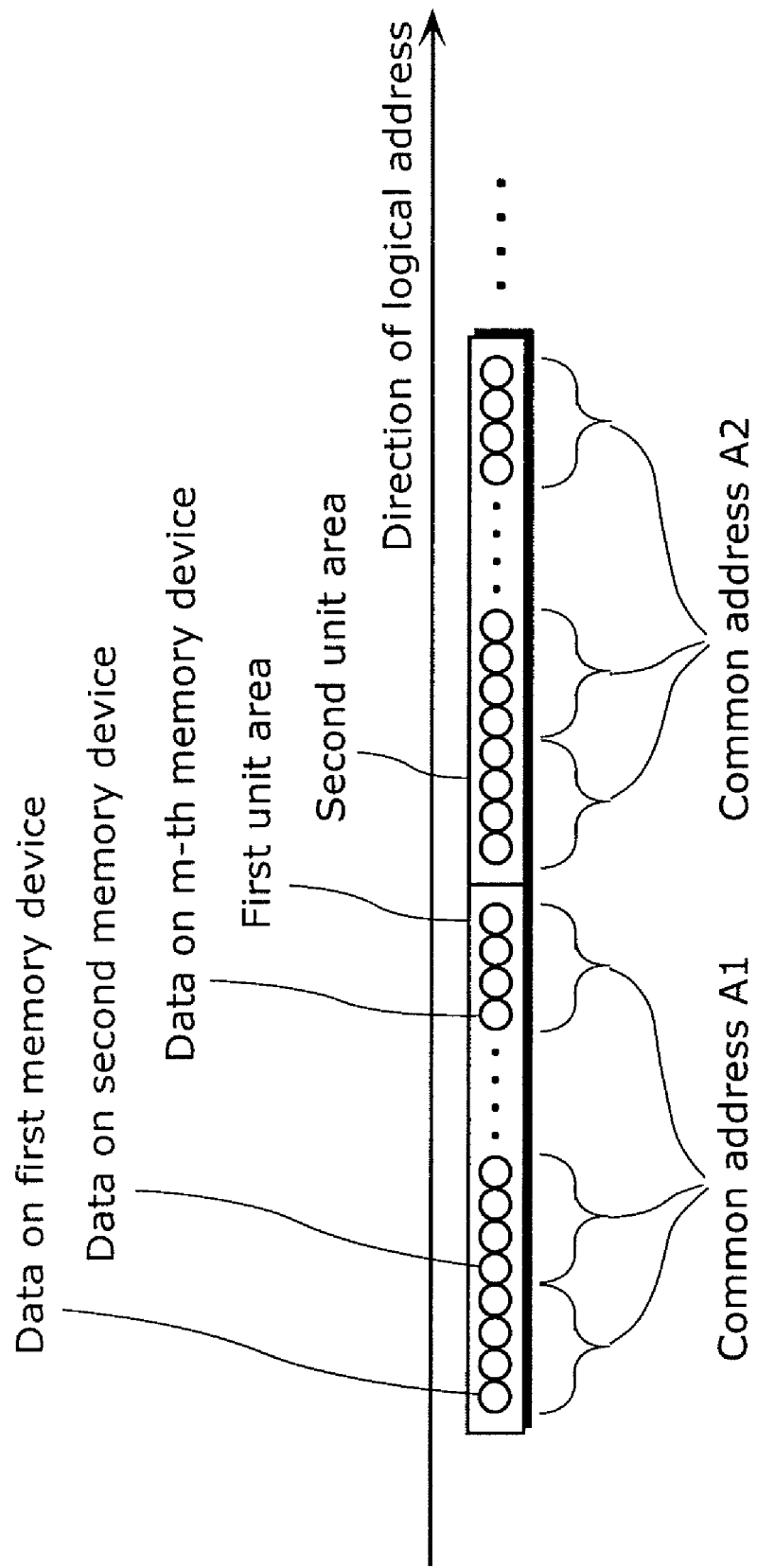
FIG. 12 is a schematic diagram showing the unit areas.

In FIG. 12, each of the memory devices in the unit area ((N×integer) byte area) has the identical bank address, an identical row address, and an identical column address.

Here, each of the memory devices has a minimum access unit of N bytes, a logical address space has logical addresses which are consecutive along unit areas that are repeatedly arranged, and in each of the unit areas, m (N×integer)-byte areas each corresponding to one of the first to m-th memory devices are sequentially arranged. Furthermore, the physical address of the first to m-th memory devices may be identical in each unit area.

The command control unit issues access commands simultaneously to a memory device corresponding to the access request among the first to m-th memory devices when the access request is for data having a size which does not exceed the unit area.

With this, the unit area can be accessed using the identical physical address within the unit area, and particularly, it is possible to access within the same cycle in the second embodiment, which further improves the transfer efficiency.

Figure 13A:
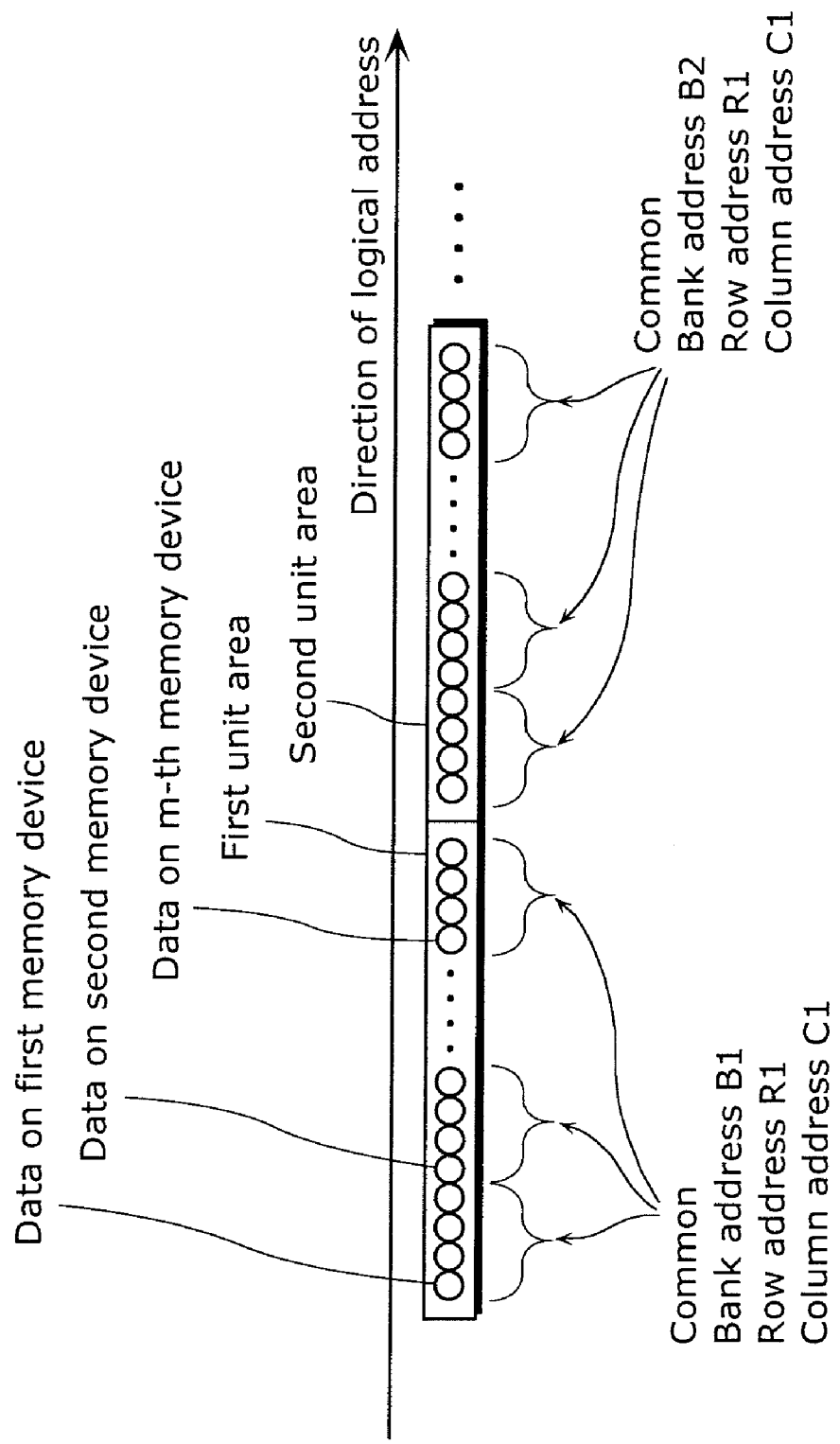
FIG. 13A shows a relationship between memory devices (DRAM) and the unit areas.

In FIG. 13A, bank addresses to be used in adjacent unit areas are arranged differently. In FIG. 13B, as in the same manner in FIG. 13A, i bank addresses are arranged such that the bank addresses of the adjacent unit areas are to be different from each other, and a column address different from the unit areas are allocated from (i+1)th bank address and i unit areas are arranged. The process described above is repeated once or more, and the logical address space with the identical row address structure is configured. As described above, the finite logical address space configured with the single row address is referred to as the single row area, and the logical address space is developed by repeatedly arranging the single row area with the row addresses changed.

In this case, each of the first to m-th memory devices includes i banks. P first to p-th unit areas are repeatedly arranged in the logical address space. The first to p-th unit areas have the identical row address, and have different column addresses. In each of the first to p-th unit areas, the m (N×integer)-byte areas have the identical bank address, and the unit area from the first to p-th unit areas respectively have different bank addresses.

In the logical address space where the first to p-th unit areas are repeatedly arranged, the adjacent unit areas include different bank addresses. The command control unit issues the access command in order to access the adjacent unit areas by bank interleaving.

With this, when successively accessing the adjacent unit areas, bank interleaving is possible upon access to the memory device.

As described above, in the first and second embodiments, arranging the unit area on the logical address direction allows access in alignment of n bytes which is the minimum access unit of one memory device, and access in the same cycle in the access within the unit area since the physical address is identical, and transfer efficiency is improved upon continuous access to the adjacent unit areas. In addition, in the case of memory control device according to the second embodiment, the address for the memory device 0 and the memory device 1 can be shared.

More specifically, the effect is explained with reference to the case with two memory devices.

Figure 14:
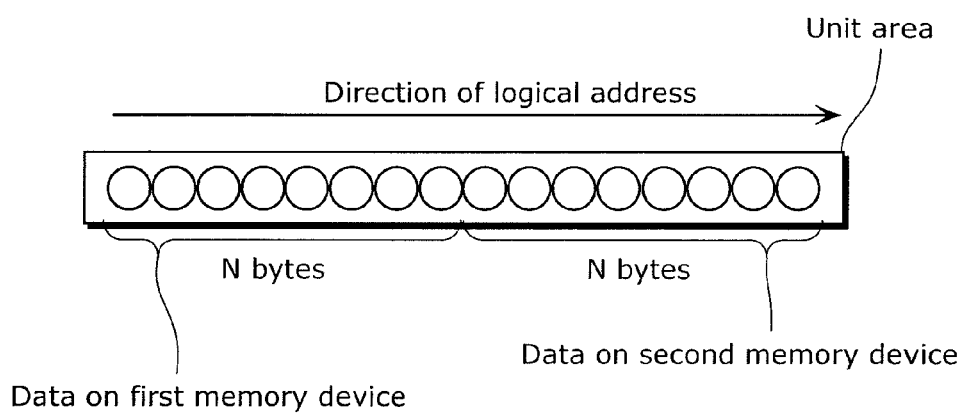
FIG. 14 shows unit areas in which physical address memory ((N×integer)-byte areas) of DRAM is arranged in the logical address direction.

In FIG. 14, physical address memory ((N×integer)-byte areas) of DRAM in the memory control device of the first and second embodiments is arranged in the logical address direction.

Here, data on the first memory device is arranged for (N×integer) bytes, and data on the second memory device is adjacently arranged for (N×integer) bytes.

As described above, the data areas of the adjacent (N+N)× integer-byte of data is considered to be one unit (unit area).

Figure 15:
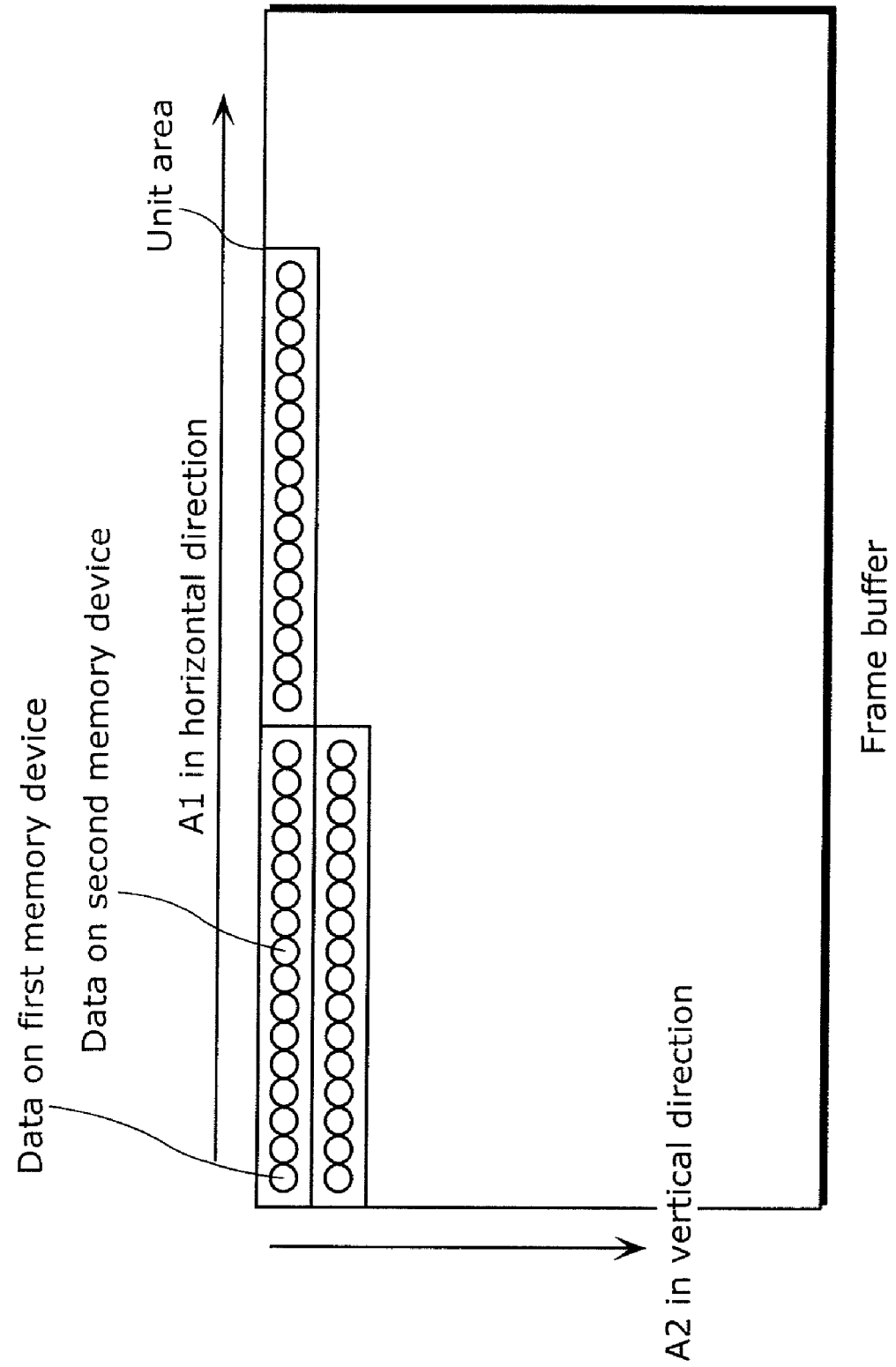
FIG. 15 shows an example of arranging the unit areas as a frame buffer.

In FIG. 15, when frame buffer area is provided on a DRAM, A1 unit areas are adjacently arranged in the horizontal direction, and A2 unit areas are adjacently arranged in the vertical direction.

Here, each of the memory devices includes a minimum access unit of N bytes, and the logical address space includes logical addresses continuous along the unit area that are repeatedly arranged.

Each unit area, corresponding (N×integer)-byte areas in the memory devices are sequentially arranged. A (A1 in FIG. 15) unit areas corresponding to the horizontal addresses of the image are adjacently arranged, and B (A2 in FIG. 15) unit areas are arranged corresponding to the vertical addresses.

Figure 16:
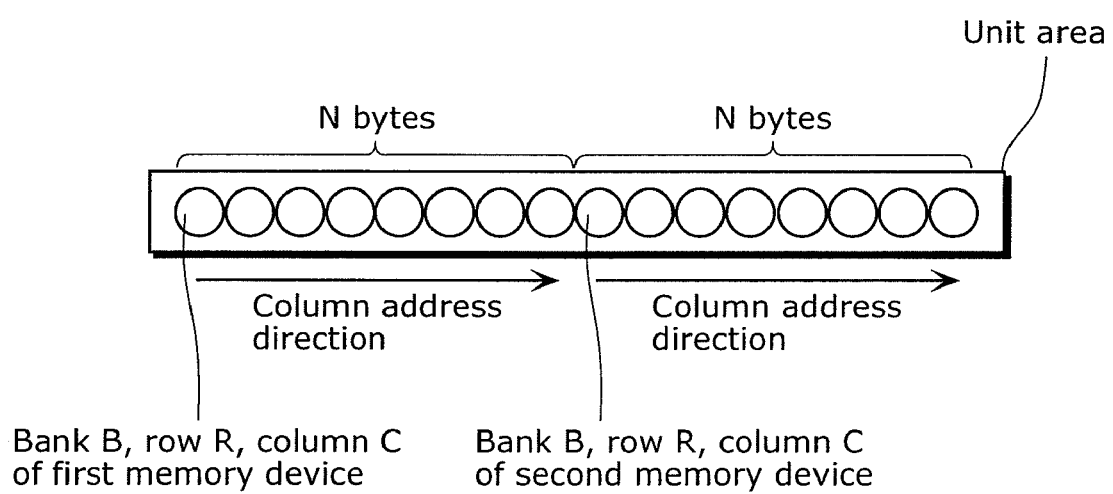
FIG. 16 shows an example of arranging (N×integer)-byte areas in a unit area.

In FIG. 16, different memory devices in the unit areas have the identical bank address, the identical row address, and the identical column address.

Figure 17:
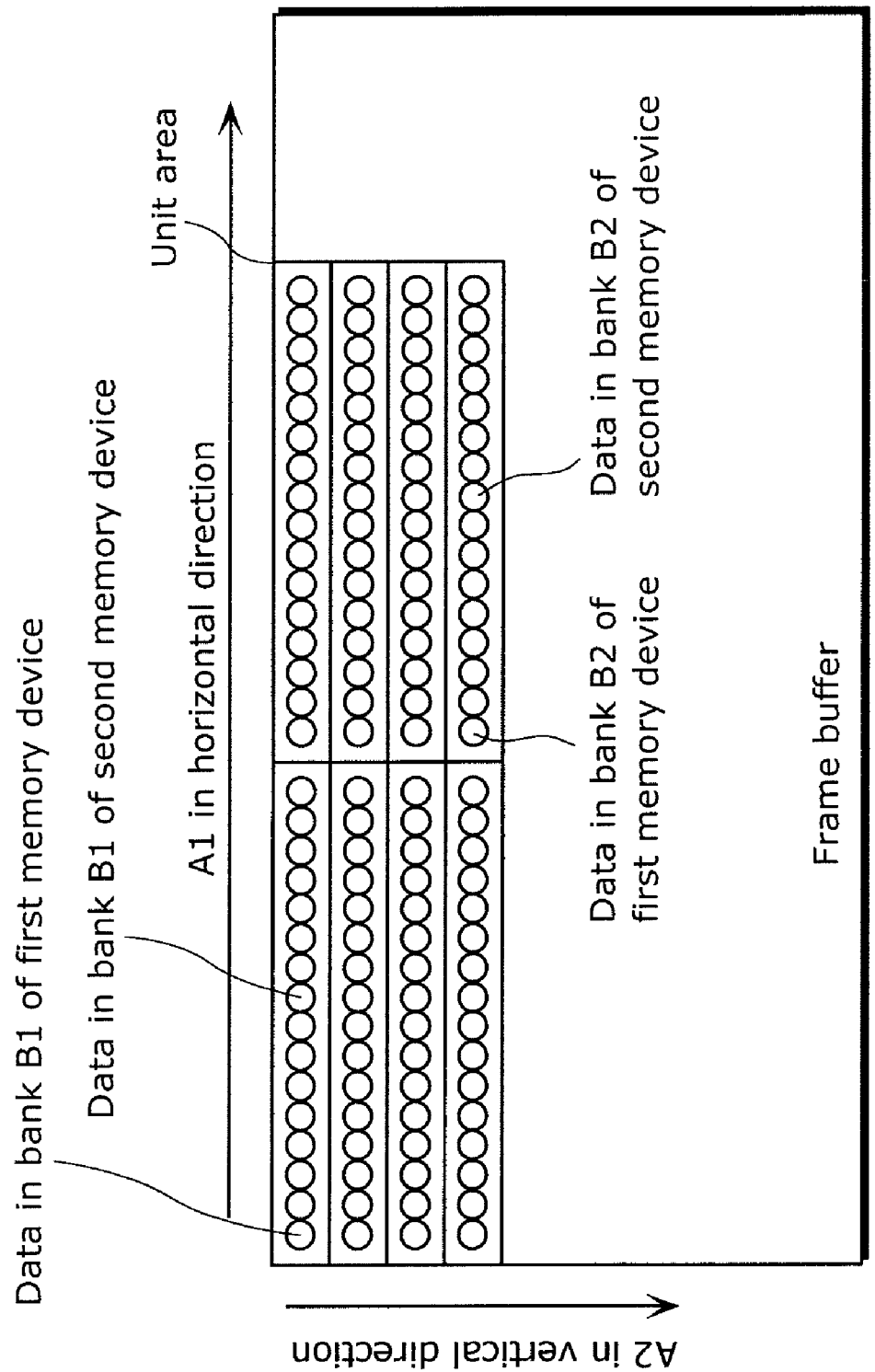
FIG. 17 is an example of arranging (N×integer)-byte areas in a frame buffer.

In FIG. 17, the (N×integer)-byte areas are arranged to have the identical bank address B, identical row address R, and identical column address C in the unit area. More specifically, the (N×integer)-byte areas in unit areas have a common bank address, a common row address, and a common column address.

In FIG. 17, the banks used between the unit areas adjacent in the horizontal direction of the frame buffer are arranged as the bank address B1 and B2 that are different from each other. More specifically, adjacent unit areas in the horizontal direction or the vertical direction of the frame buffer have different bank addresses. The command control unit issues the access command in order to access the adjacent unit area by bank interleaving.

As described above, arranging the unit areas in the horizontal direction and the vertical direction in the frame buffer allows access in arrangement of n bytes which is the minimum access unit of one memory device in the first and second embodiments, and the unit area is accessed in the same cycle, since the physical address is identical, and transfer efficiency is improved upon continuous access to the adjacent unit area. In addition, in the case of memory control device according to the second embodiment, the address for the memory device 0 and the memory device 1 can be shared.

For example, when accessing the first memory device and accessing the second memory device, when the data in the same unit area is necessary, it is possible to access the data with the identical bank address, the identical row address, and the identical column address. Furthermore, even when accessing the data in a different unit areas, it is possible access the data having different bank address when the bank address B1 and the bank address B2 are different, while having the identical row address and the identical column address. In this case, in the memory control device according to the first embodiment, it is possible to access the data in a single cycle, and in the memory control device according to the second embodiment, it is possible to improve the transfer efficiency by accessing the data with delayed commands among memory devices.

Adopting the logical address arrangement described above to the memory control devices according to the first embodiment and the second embodiment can improve effective transfer efficiency, while improving access overhead unique to a memory device (especially DRAM), and thus the total bandwidth used in the memory system can be reduced.

Fourth Embodiment

In the fourth embodiment, a method for accessing rectangular data in an image when the memory control devices 101 and 101*a* described in the first embodiment and the second embodiment uses the two memory devices, the memory device 0 and the memory device 1 as a frame buffer is described.

The conversion unit 103 in the memory control devices 101 and 101*a* according to the fourth embodiment may convert the two-dimensional address (X, Y) showing the pixel position of the image into physical addresses of the memory device 0 and the memory device 1. The data requested to the conversion unit 103 may be a rectangular access having a two-dimensional data size (V bytes, W bytes).

An example of 2×N-byte access is described as follows.

Figure 18:
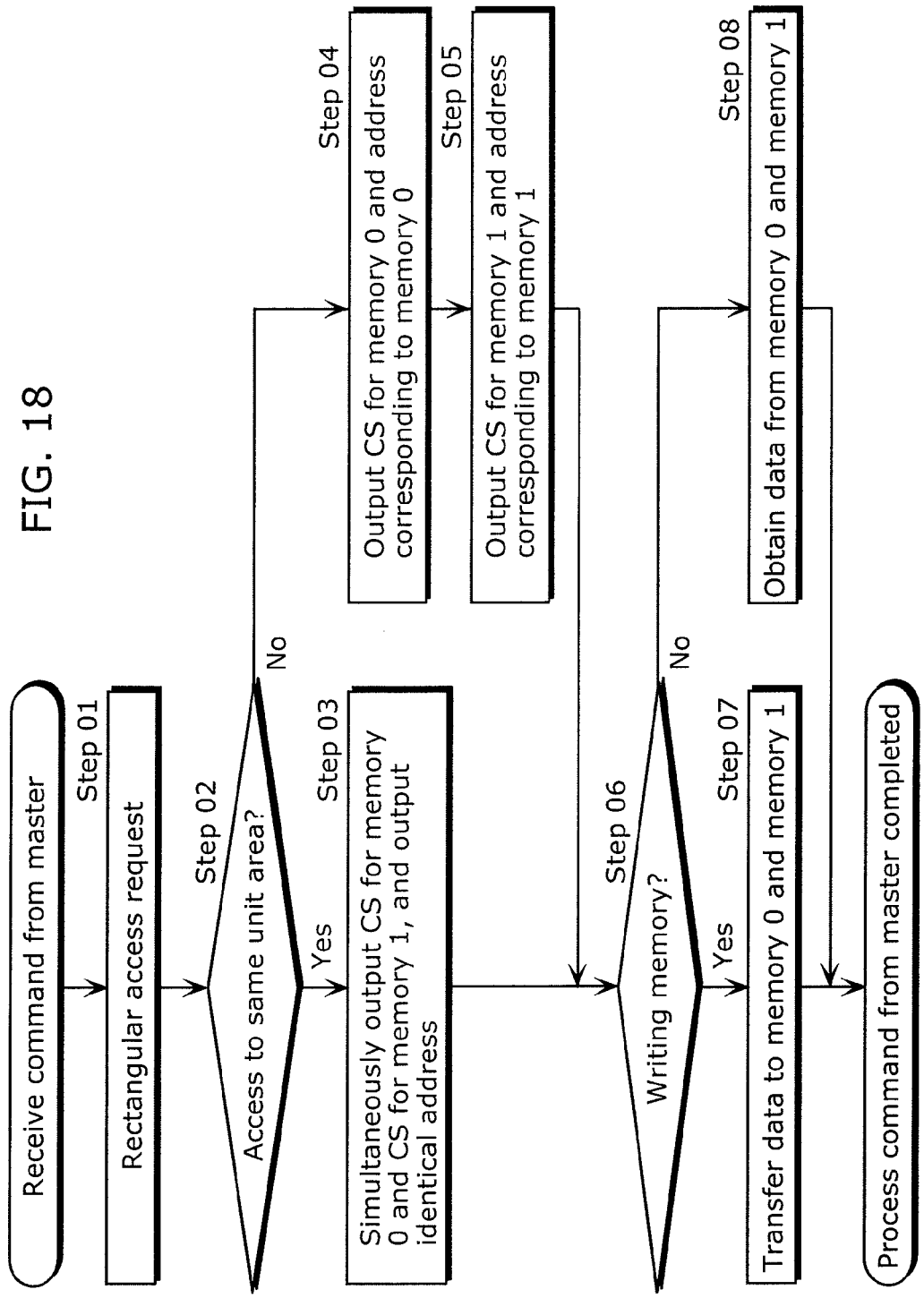
FIG. 18 is a flowchart showing the memory control method according to a fourth embodiment.

FIG. 18 shows a flowchart of the memory control method according to the fourth embodiment. In the memory control device 101 and 101*a* shown in FIG. 1A, FIG. 1B, FIG. 6 and FIG. 7, in the first step 01, the memory control devices 101 and 101*a* receives a rectangular access request on a frame buffer arranged on the memory for the memory control devices 101 and 101*a*. In the second step 02, it is identified whether the rectangular access request is for an access within the unit area, and in the third step 03, CS for memory device 0, CS for memory device 1, and addresses to access are simultaneously output from the command issuing units 104, 105 or 107 and 104*a* when the rectangular access is an access within the same unit area. Meanwhile, when the access ranges different unit areas, the process proceeds to the fourth step 04, and the address corresponding to the command issuing units 104 or 107, and 104*a* outputs the CS for the memory device 0 and the address corresponding to the memory device 0, and in the fifth step 05, CS for the memory device 1 and the address corresponding to the memory device 1 are output from the command issuing units 105 or 107, and 104*a*. In the sixth step 06, it is identified whether the writing and reading is on the memory, and in the seventh step 07, data is transferred to the memory device 0 and the memory device 1 when writing on the memory, and in the eighth step 08, data is obtained from the memory device 0 and the memory device 1 when reading from the memory.

Figure 19:
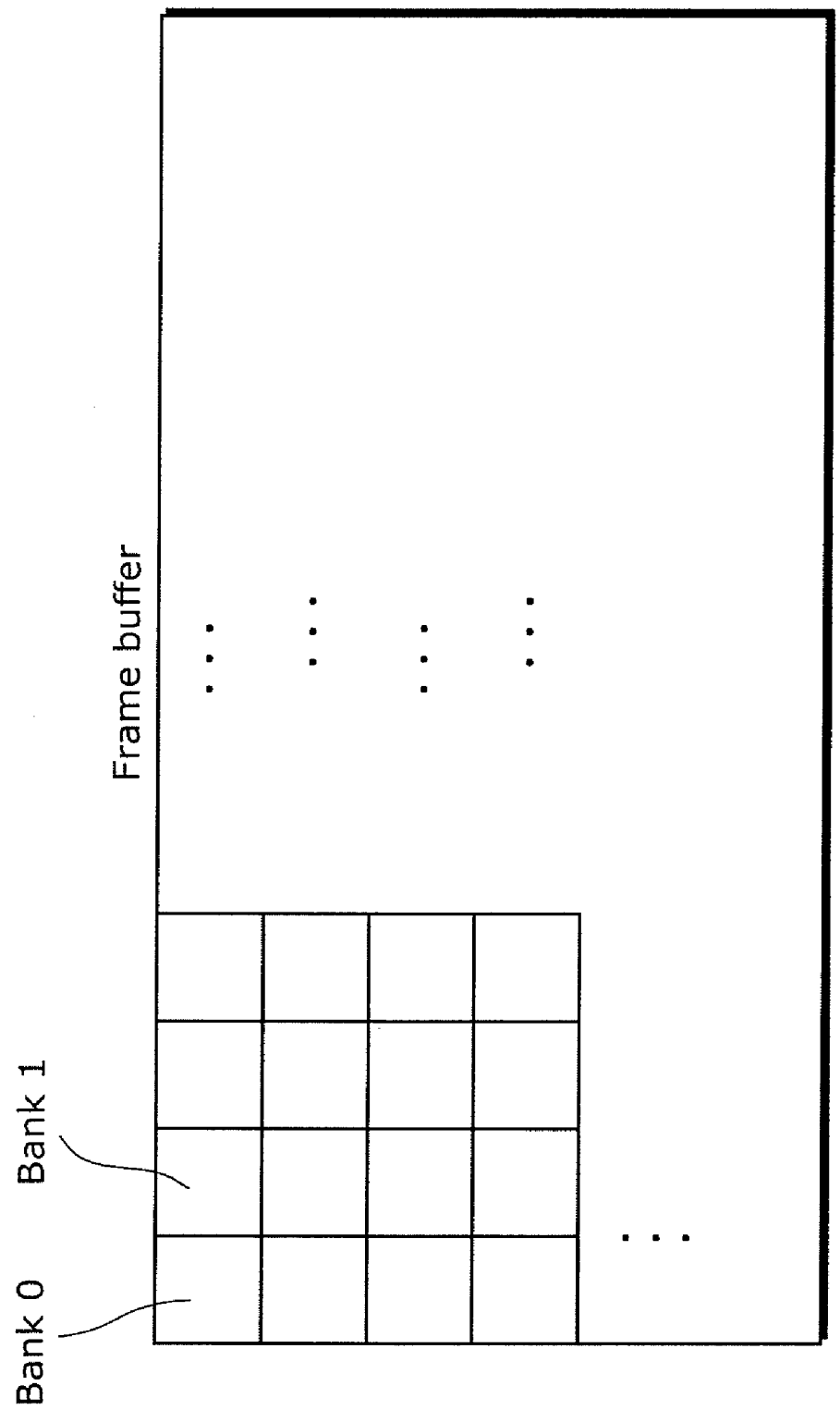
FIG. 19 is an example of logical address arrangement in a memory bank in the frame buffer.

FIG. 19 shows an example of logical address arrangement in a memory bank when a frame buffer is arranged on a memory. In general, the frame buffer is configured as an assembly of the rectangular areas (blocks). Each block has the identical bank address and the identical row address. Vertically and horizontally adjacent blocks are arranged with the block having different bank addresses. With this, when performing continuous access in the horizontal direction and the vertical direction, bank interleave control is performed, allowing the access overhead to be masked.

Figure 20:
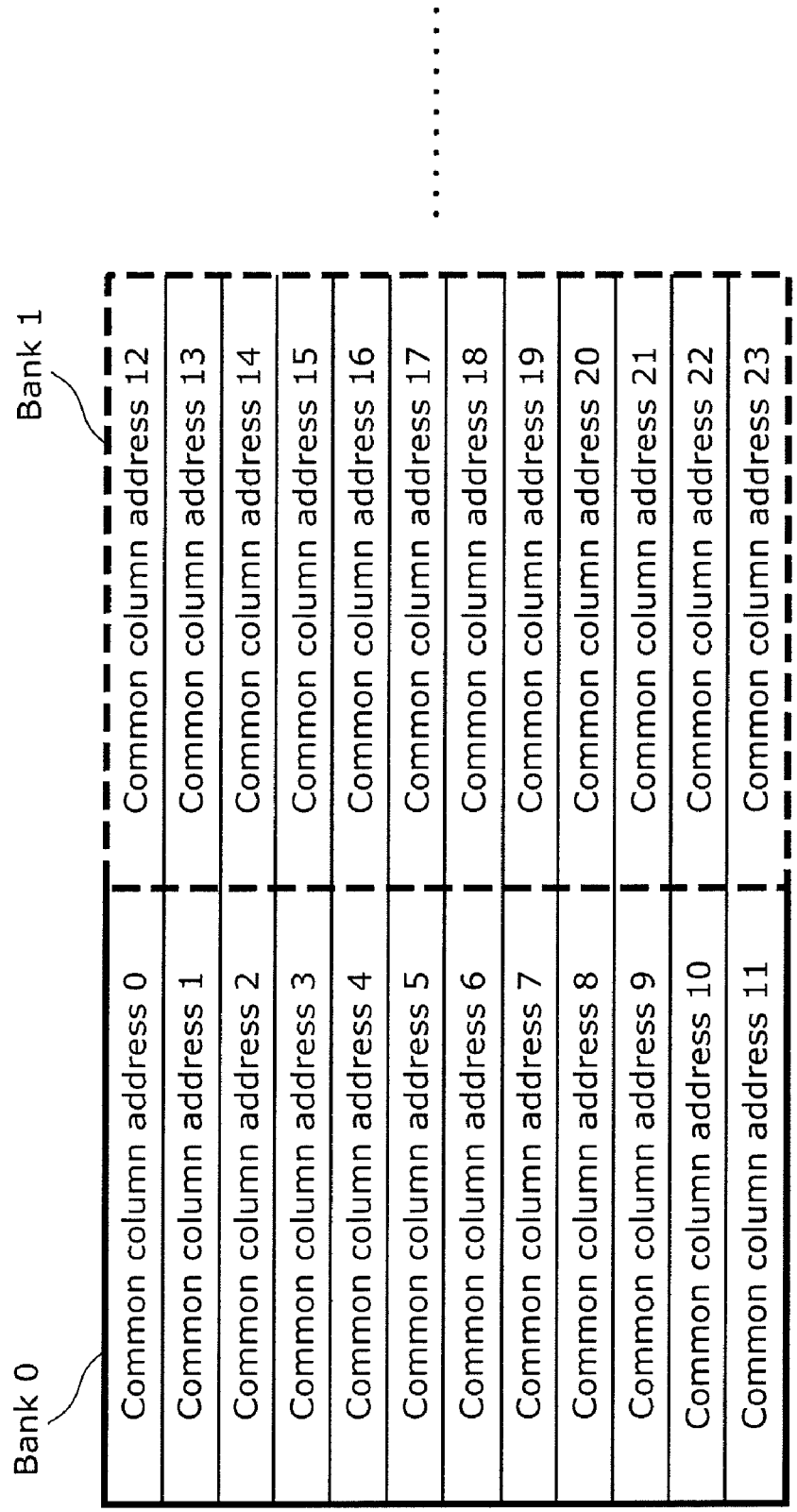
FIG. 20 shows an example of column address arrangement in the memory within the block shown in FIG. 19.

FIG. 20 shows an example of column address arrangement in the memory within the block shown in FIG. 19, and shows a block including one unit area in the horizontal direction, and 12 unit areas in the vertical direction.

FIG. 21 shows blocks arranged such that the (N×integer)-byte areas are arranged in addition to the structure shown in FIG. 20. The arrangement is realized with the following structure. More specifically, the memory devices are used as a frame buffer for storing the image, and each of the memory devices include the minimum access unit of N bytes. The logical address space in the memory devices includes consecutive logical addresses along the unit areas that are repeatedly arranged. In each unit area, the corresponding (N×integer)-byte areas in the memory devices are sequentially arranged.

Furthermore, the frame buffer includes multiple rectangular areas. In the rectangular area, E (2 in FIG. 21) unit areas are adjacently arranged corresponding to the horizontal address, and F (12 in FIG. 12) unit areas are arranged corresponding to the vertical address.

Here, the unit areas within each rectangular area include a common bank address and a common row address, and two horizontally adjacent rectangular areas have different bank addresses.

Furthermore, the two vertically adjacent rectangular areas may include any bank address and different row addresses. In each unit area, the corresponding (N×integer)-byte areas in the corresponding memory devices are sequentially arranged in an order corresponding to the order of the memory devices.

With this configuration, as shown in FIG. 21, the (N×integer)-byte areas in the same memory devices are arranged in the vertical direction.

Figure 22:
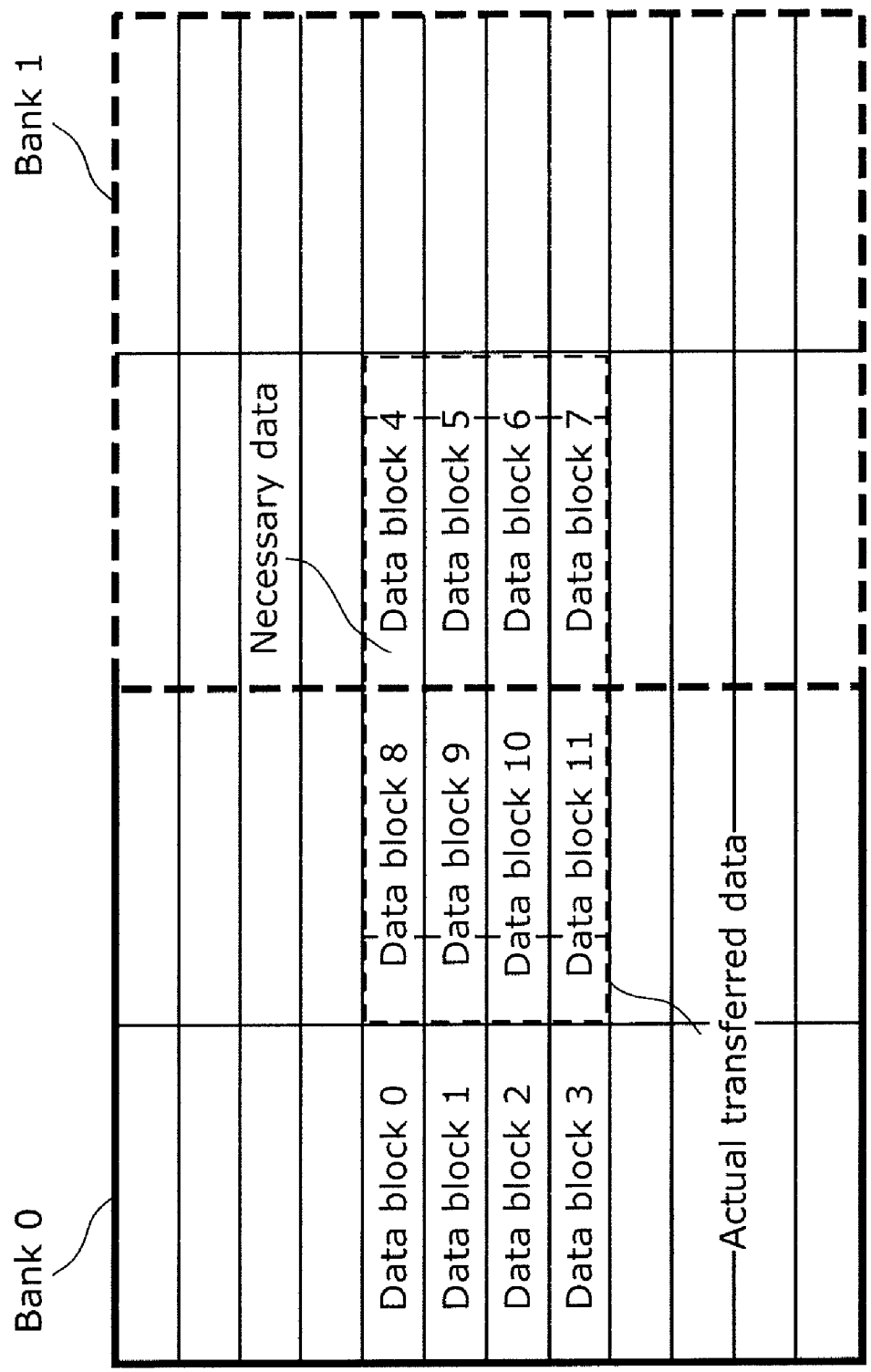
FIG. 22 shows an example of arrangement of rectangular data transferred from the frame buffer shown in FIG. 22.

FIG. 22 shows an example of rectangular data corresponding to the rectangular request to the frame buffer configured in FIG. 21.

Figure 23:
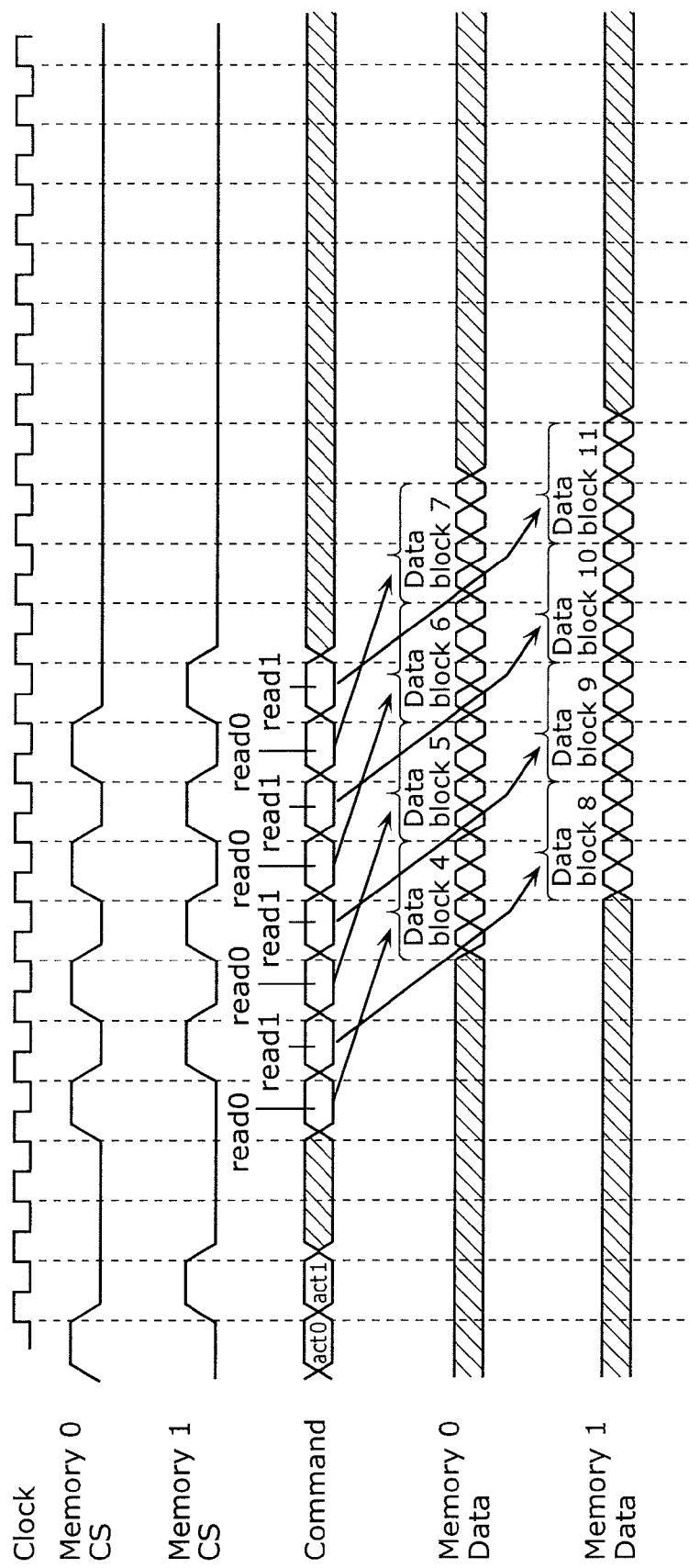
FIG. 23 is a timing chart showing signals corresponding to FIG. 22.

FIG. 23 shows a timing chart showing the operation in response to the rectangular access request shown in FIG. 22 in the case of memory control device according to the second embodiment.

in the rectangular data in FIG. 22, the physical address to the memory device 0 and the physical address to the memory device 1 are different (bank addresses are different), and thus the timings of individual chip-select signals are shifted as shown in FIG. 23. Different physical addresses are output to the memory devices. Thus, the memory device 0 and the memory device 1 are to be accessed with a shift in one cycle.

Figure 24:
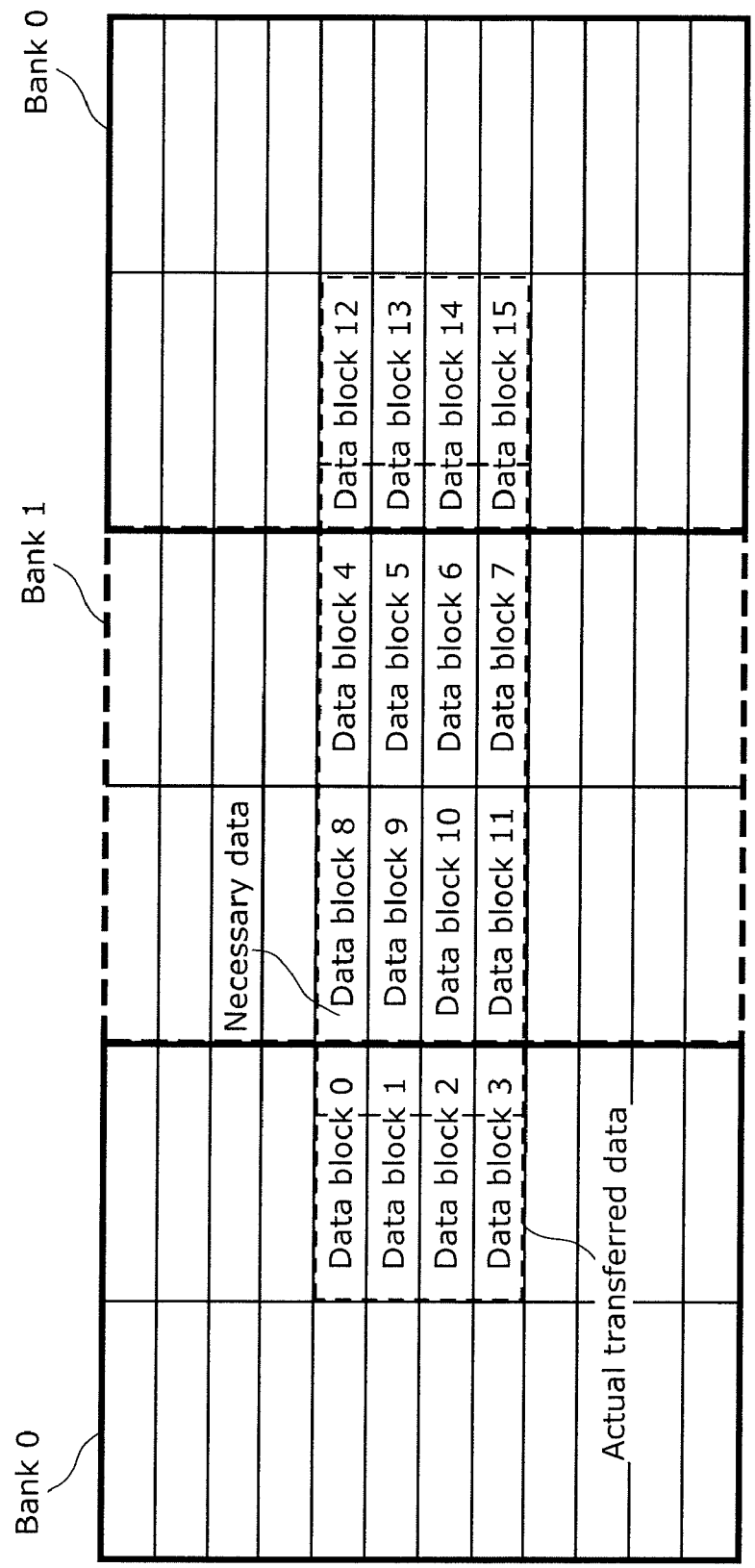
FIG. 24 shows an example of arrangement of rectangular data transferred from the frame buffer shown in FIG. 21.

FIG. 24 shows an example of rectangular data corresponding to other rectangular access request to the frame buffer configured in FIG. 21.

Figure 25:
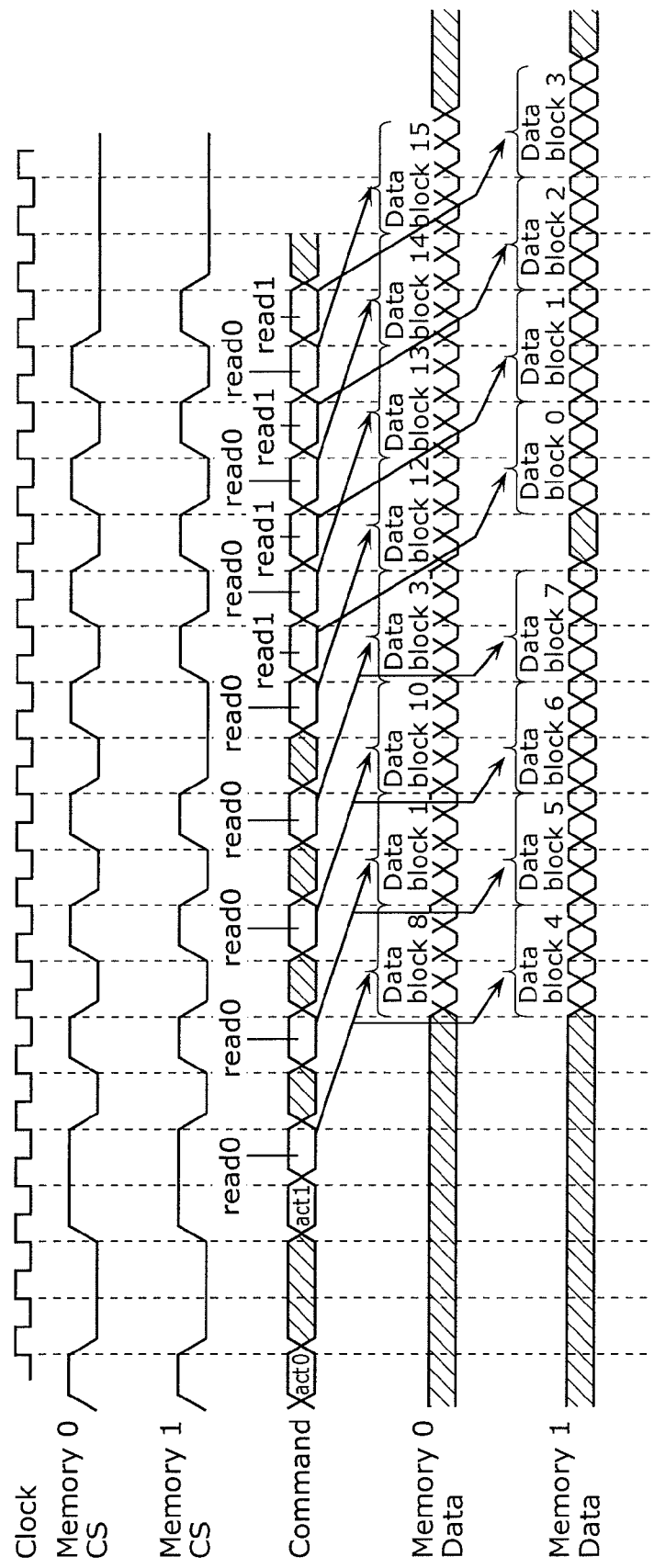
FIG. 25 is a timing chart corresponding to the rectangular address shown in FIG. 24.

FIG. 25 shows a timing chart showing the operation in response to the rectangular access request shown in FIG. 24 in the case of memory control device according to the second embodiment.

In FIG. 24, the command control unit judges the rectangular access request using the unit areas and a boundary between the memory devices, and determines a transfer method. In this case, the block 8 to the block 11 and the block 4 to the block 7 are transferred first, and the part where the rectangular data crossed the bank boundary (the block 0 to the block 3, the block 12 to the block 15) is transferred subsequently. This allows more efficient transfer compared to the conventional technology where the rectangular data is transferred per unit area.

Note that, although FIG. 21 shows an arrangement where the consecutive column addresses within the identical bank address in the block are arranged vertically, continuity of the column addresses within the identical bank addresses is not required. Note that arranging the vertically consecutive column addresses within the block, or arranging consecutive column addresses in a block within the same bank in a horizontal direction in the frame area produces an advantage for facilitating a calculation of the access address.

Next, an example where (N×integer)-byte areas of the memory device 0 and the memory device 1 are arranged in a checkerboard pattern is described as another arrangement of logical addresses. In this case, the configuration may be as follows. More specifically, the (N×integer)-byte areas are sequentially arranged in each of the unit areas in a first small rectangular area having G rows which is consecutive to one or more rows in an order corresponding to an order of the memory units. Furthermore, the (N×integer)-byte areas are sequentially arranged in each of the unit areas in a second small rectangular area having H rows which is consecutive to one or more rows in an order different from the order in the first small rectangular area.

The relationship of the first small rectangular area and the second small rectangular area may be repeated in the rectangular area.

In the present invention, since connecting different chip select signal lines CS to two memories allows individual address control, the data in the memory device 0 and the data in the memory device 1 are arranged such that they are individually obtained when accessing the unit area as shown in FIG. 26. By sorting the arrangement of the memory device 0 and the memory device 1 alternately, it is possible to achieve an arrangement that allows the data in the memory device 0 and the memory device 1 are individually obtained even when an access vertically crossing the unit areas is made.

Figure 27:
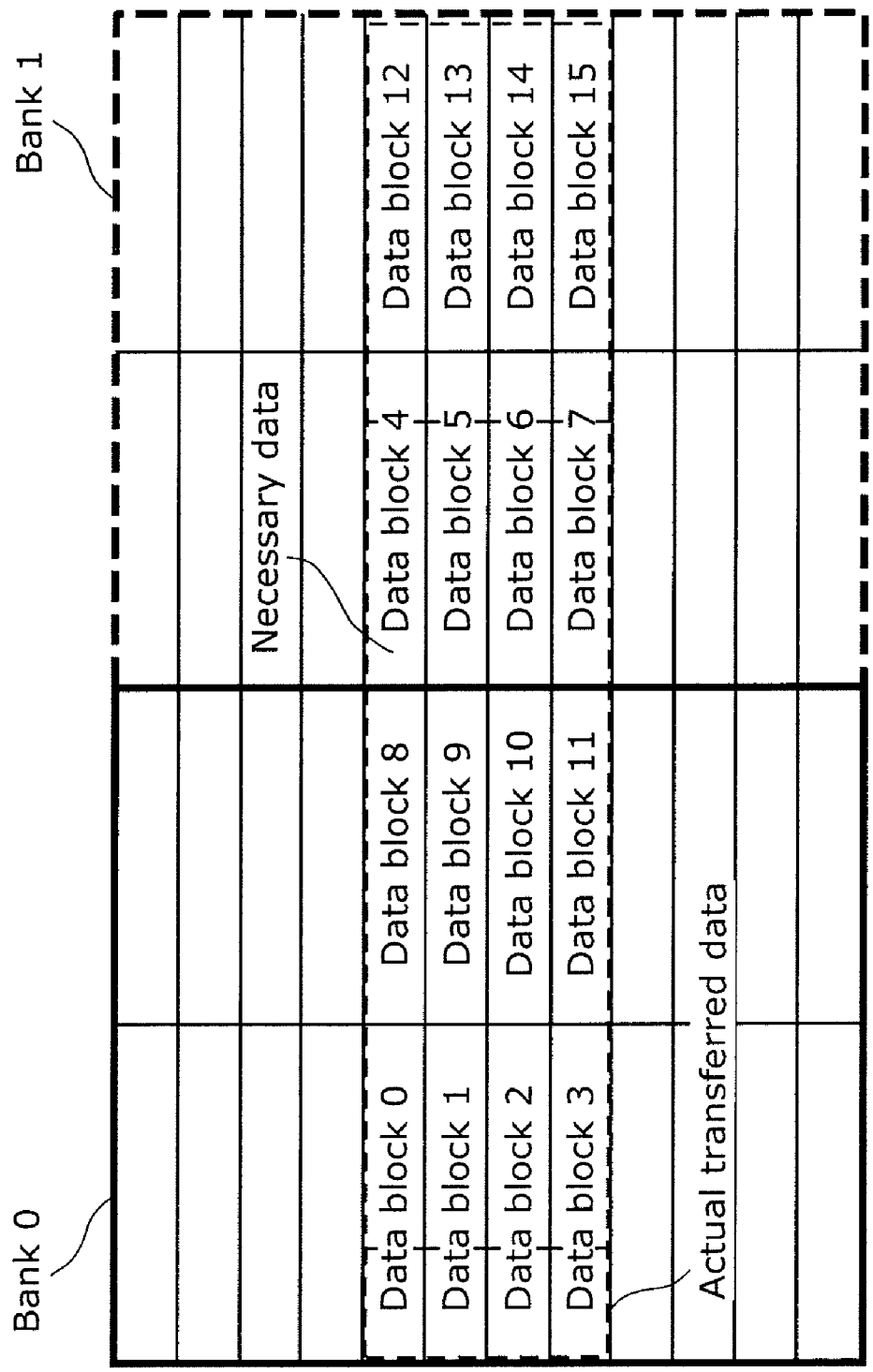
FIG. 27 shows necessary data and data actually transferred in response to the rectangular access request in the logic memory arrangement in the example of FIG. 21.

FIG. 27 shows the part showing necessary data and the data that is actually transferred to the memory when obtaining rectangular data ranging two banks in the horizontal direction and four lines in the vertical direction in the logical address arrangement in the example shown in FIG. 21. In this case, the data that is actually transferred includes unnecessary transfer in addition to the necessary data, thereby reducing the transfer efficiency. Thus, in the present invention, it is possible to reduce the data that is actually transferred, compared to the necessary data as shown in FIG. 28.

Figure 29:
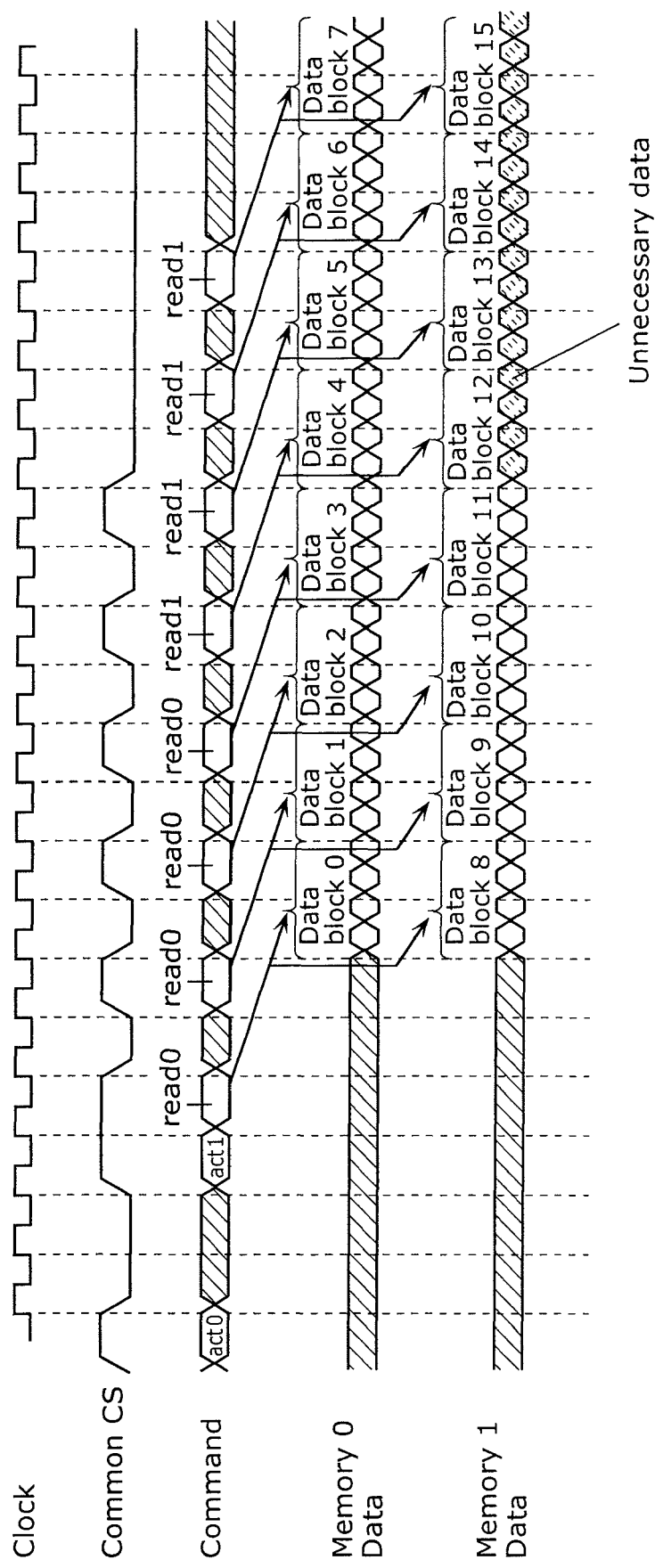
FIG. 29 is a timing chart showing an operation for retrieving the rectangular data shown in FIG. 27 in the logical address arrangement shown in FIG. 21.

FIG. 29 is a timing chart when the rectangular data in FIG. 27 is obtained in the logical address arrangement in the example of FIG. 21.

Figure 28:
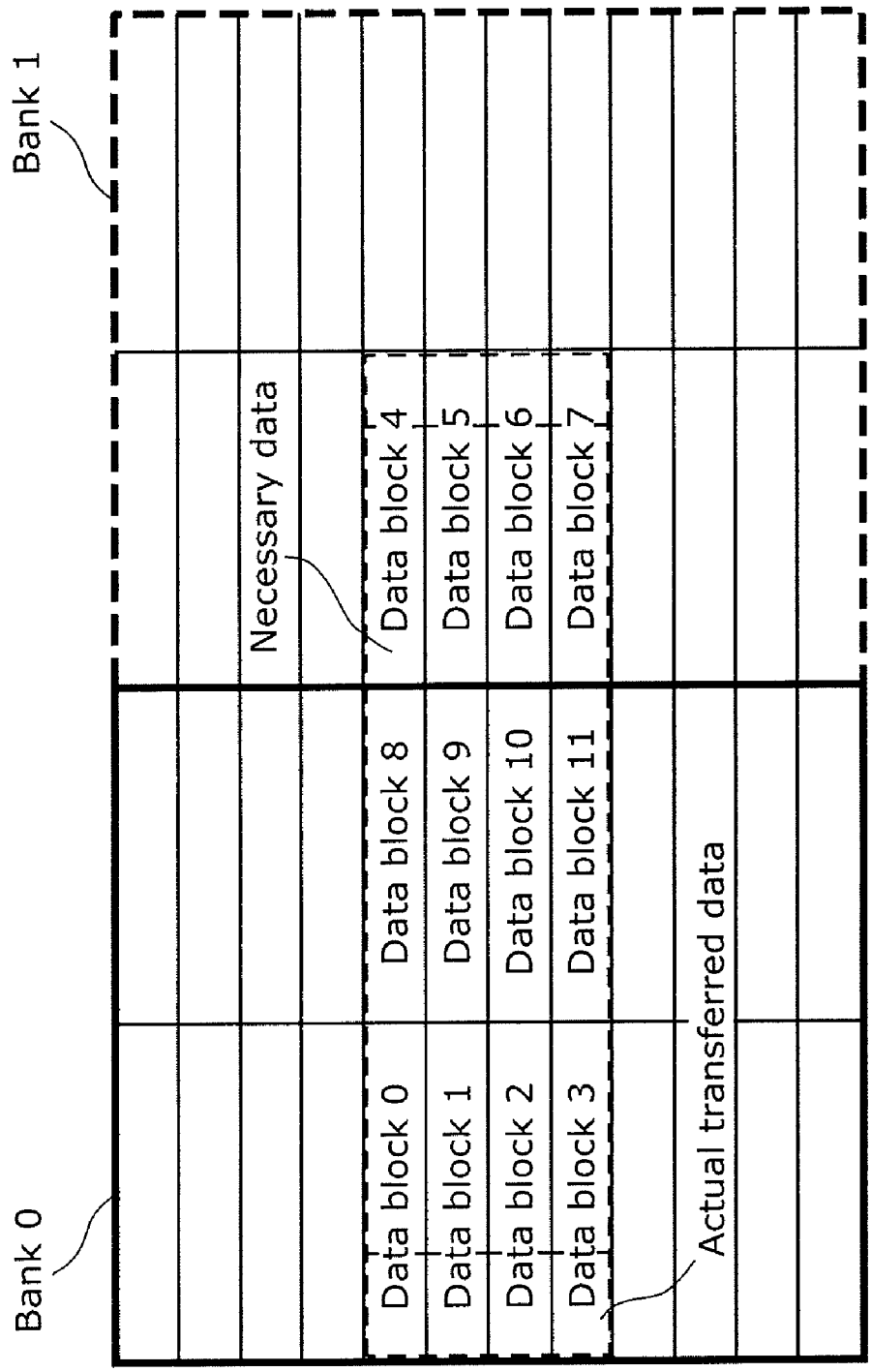
FIG. 28 shows the data that is actually transferred upon accessing the rectangular data.
Figure 30:
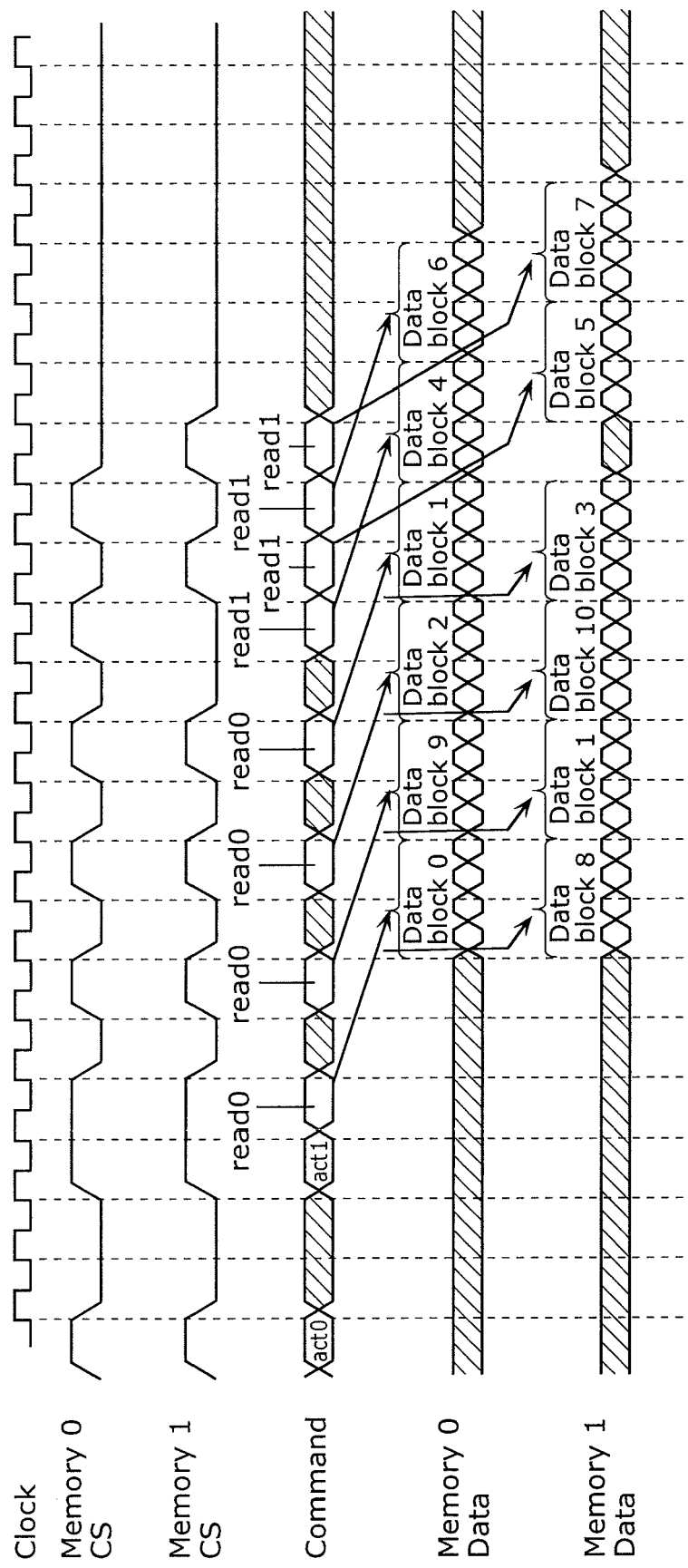
FIG. 30 is a timing chart showing an operation for retrieving the rectangular data shown in FIG. 28 in the logical address arrangement shown in FIG. 26.
Figure 31:
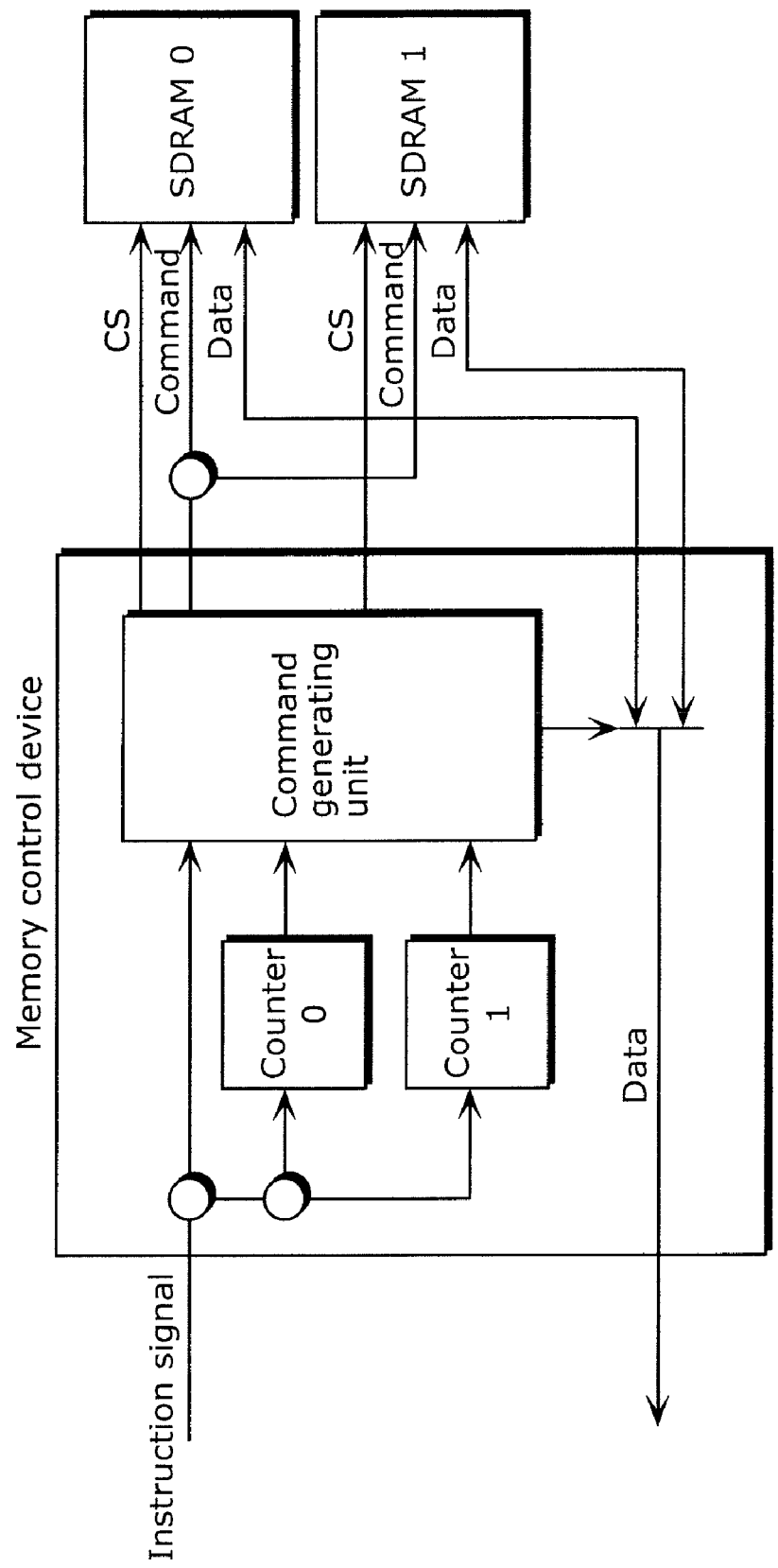
FIG. 31 shows a configuration of a conventional memory control device.

FIG. 30 is a timing chart when the rectangular data in FIG. 28 is obtained in the logical address arrangement in the example of FIG. 26.

In FIG. 28, the command control unit judges the rectangular access request using the unit areas and a boundary between the memory devices, and determines the transfer method. Here, the block 0 to the block 3, the block 8 to the block 11 are transferred first, and the part where the rectangular data crossed the bank boundary (the block 4 to the block 7) is transferred subsequently. This allows more efficient transfer compared to the conventional technology where the rectangular data was transferred per unit area.

Note that, when accessing the frame buffer, the access can be made in access arrangement per memory device in the horizontal direction of the frame buffer, and the access can be made in access arrangement per line in the vertical direction of the frame buffer.

Note that, in the present invention, since the memory devices, the memory device 0 and the memory device 1 are alternately arranged on the frame buffer, it is possible to switch the arrangement in the data control unit. Furthermore, when the access is individually made using CS, the data transfer timings are different on the memory device 0 and the memory device 1. Thus, it is possible to adjust the shift in the timings in the memory device 0 and the memory device 1 by the data control unit, and align the data to a data arrangement requested by the master, for example, to a data arrangement at the same timing, or to serialized data. With this, it is possible to achieve data access in the same manner as the conventional technology, in response to the master requesting rectangular access to the memory devices.

In the fourth embodiment, the case where two memories are used is described, however, the same control may be performed in the case where two or more memories are used. Furthermore, although a common address bus is used, it is not necessary to share all bits but only a part of the address bus, and control signals other than address signal may also be commonly used.

Note that, a single row rectangular area is configured and arranged with a combination of the blocks having different bank addresses and the identical row address may be arranged. In the access ranging the rectangular areas having the identical bank address in the single row rectangular area, and the burst access may also be performed. Such access can improve transfer efficiency.

Note that, with this configuration, when accessing the frame buffer, the access can be made in access arrangement per memory device in the horizontal direction of the frame buffer, and the access can be made in access arrangement per line in the vertical direction of the frame buffer.

Note that, the two banks are arranged in the memory bank in FIG. 19; however, the configuration may be the same when two or more banks are used. Furthermore, in FIG. 26, the column addresses are consecutive from top to bottom, however, the addresses may not necessarily be consecutive addresses, and may be sequential from bottom to top, may be periodic addresses at a predetermined cycle, or may take a random address order. Furthermore, although the data arrangement in each memory is alternated each line, the data may be alternated every two lines or more. Furthermore, although the identical column address is arranged in the horizontal direction, the identical column address may be arranged in the vertical direction. Furthermore, the necessary data in FIG. 28 is merely an example, and it is possible to access the data of any size from any location by a request. Thus, the data may be rectangular data in the same bank, or rectangular data ranging two or more banks.

Furthermore, although the access order is illustrated in FIG. 30, the order is not limited, and may be any order. For example, the access may start from the bank 1, and the data may be obtained from the bottom side of the rectangular data.

Note that in FIG. 21, an example showing the arrangement of the (N×integer)-byte areas in the same memory device are arranged in the vertical direction, however, the byte areas may be arranged in the horizontal direction. In this case, the configuration is as follows. More specifically, the unit areas in each rectangular area are configured of any one of the memory devices, and have a common bank address. Here, the two horizontally adjacent rectangular areas have different column addresses. The two vertically adjacent rectangular areas are configured of unit areas of different memory devices, and have any bank address and different column addresses.

In each unit area, the corresponding (N×integer)-byte areas in the corresponding memory devices are sequentially arranged in an order corresponding to the order of the memory devices.

As described above, in the fourth embodiment, when controlling the memories with a common bus, the chip select signal CS is individually controlled, and the data arrangement on the frame buffer is allocated on each memory, and the data in the horizontal direction is arranged in different memories on the identical address, and the data in the vertical direction is arranged on different memory. This allows reducing the amount of data to be actually transferred in an access of a small rectangular data, and the transfer efficiency can be improved.

Fifth Embodiment

Figure 36:
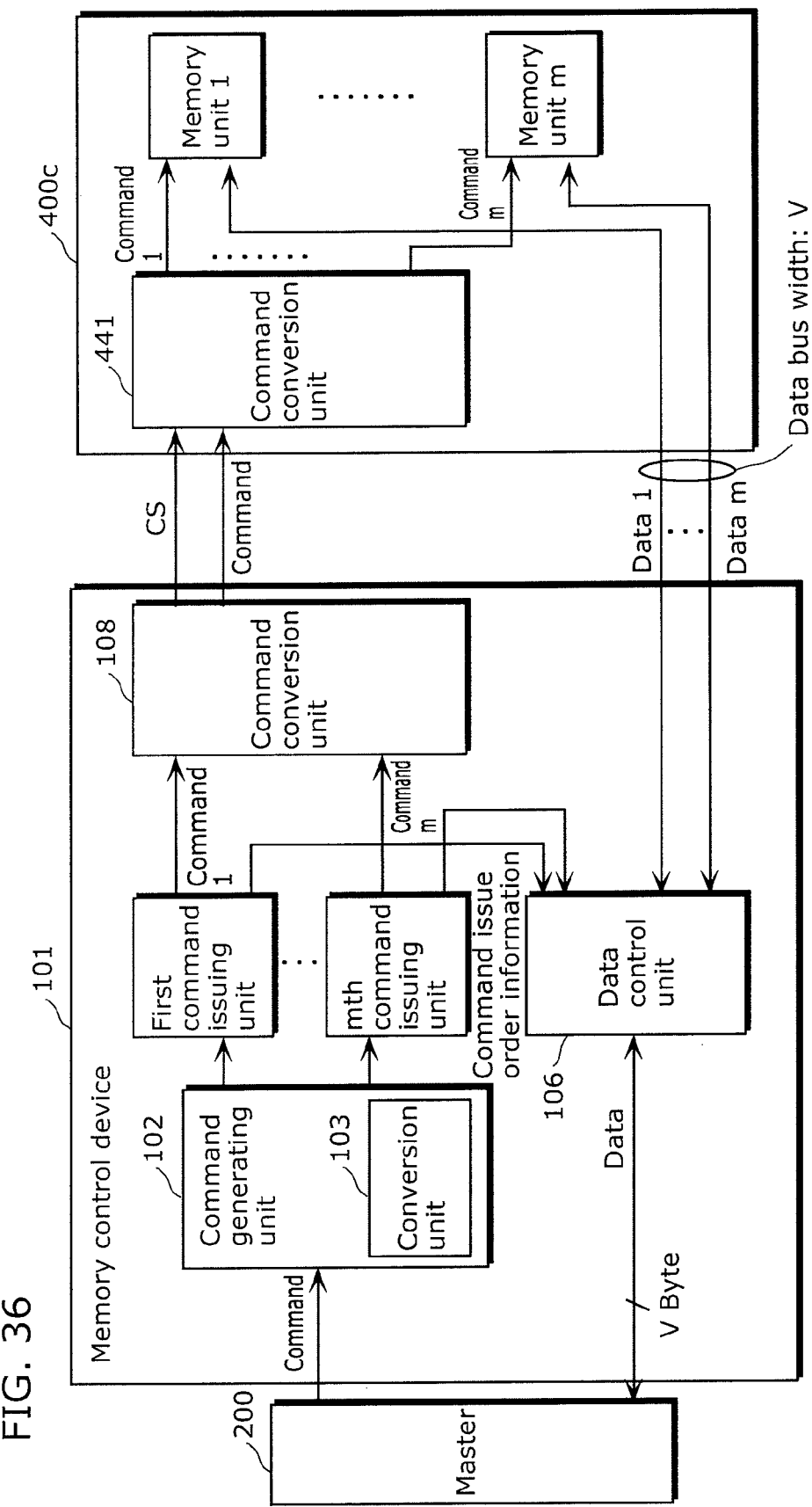
FIG. 36 is a block diagram showing the configuration of the memory control device according to a fifth embodiment.

FIG. 36 is a block diagram showing the configuration of the memory control device and the memory device according to the fifth embodiment. The memory control device in FIG. 36 is different from the memory control device in FIG. 1 in that the number of the command issuing units is extended from two to m, and a command conversion unit 108 is added. The memory device 400c in FIG. 36 is different from the memory device 400 in FIG. 34A in that a command conversion unit 441 is added.

The command conversion unit 108 functions as a multiplexing unit. More specifically, the command conversion unit 108 multiplexes, by time-division multiplexing, m access commands from a command 1 to a command m issued by m command issuing units within one cycle in the synchronization signal supplied to the memory device 400c, and the command conversion unit 108 outputs the time-division-multiplexed command to the memory device 400c. Here, the access commands (the command 1 to the command m) to be multiplexed are, more specifically, m activation commands including row addresses, ad m read or write commands including column addresses.

The command conversion unit 441 functions as a demultiplexing unit. More specifically, the multiplexed access command received from the command interface is demultiplexed (in other words, divided) into m access commands, and the command conversion unit 441 outputs the respective access commands 1 to m to corresponding memory units 1 to m.

Here, FIG. 36 shows a system configuration where the master 200 is connected to a memory device having a data bus of the V-byte width via the memory control device 101. Although only one master 200 is shown in FIG. 36, multiple masters may also be connected. Here, the memory device 400c having a data bus of the V-byte width includes m modules referred to as memory units, and a command conversion unit 441 having a function for simultaneously outputting the commands adjusted to the specification of the interface to each memory units. The command conversion unit 441 also includes command conversion function for receiving m commands within the predetermined cycle of external clock supplied to the memory device 400c, and simultaneously issuing the commands to the m memory units. This accelerates supply of access commands to a packaged memory device, and as a result, it is possible to reduce the number of pins in the package and the number of wires to the package. The data buses of m memory units are respectively connected to a part of data bus having V-byte width. Note that the memory unit may be group of one or more banks of a regular DRAM, and may be any type of memory device, regardless of the type of memory.

The memory control device according to the fifth embodiment includes: the command control unit (the command generating unit and the first to m-th command issuing units) which divides the memory access request issued by the master into access commands each of which is for one of the memory units which is to be described later, and issues each of the access commands to a corresponding one of the memory units; and a data control unit which (i) divides data written by the master into pieces of data each of which is for one of the memory units and outputs each piece of the divided data to the corresponding one of the memory units, when the memory access request is a write request, and (ii) combines pieces of data read from the memory units and output the combined read data to the master, when the memory access request is a read request. Here, the command control unit switches between control for outputting an identical physical address to the memory units and control for outputting different physical addresses to the memory units, depending on when the physical addresses of the memory units are identical and when the physical addresses of the memory units are different, each of the memory units corresponds to one of the divided access commands.

With this, it is possible to extend the memory bandwidth, and suppress increase in unnecessary data transfer without increasing the minimum access units. More specifically, the memory bandwidth is extended to (bus width of one memory unit)×(the number of memory units), and the minimum access units accessible from the master may be the minimum access unit of one memory unit. Here, the minimum access unit denotes a value calculated by bus width×minimum burst length of one memory device. In FIG. 36, the bus width of one memory device is V bytes, and the minimum burst length is 1.

In FIG. 36, the memory control device 101 includes a command generating unit 102, a data control unit 106, a command conversion unit 108, and m command issuing units connected to the memory device 400c via the command conversion unit 441. Here, the m command issuing units and the command conversion unit 108 may be incorporated into one unit. The command generating unit 102 includes a conversion unit 103 which converts a logical address included in the memory access command (memory access request) from the master 200 into physical addresses of each of the memory unit 1 to m. The command generating unit 102, m command issuing units and the command conversion unit 108 function as the command control unit.

The memory access command from the master 200 is input to the command generating unit 102 via the command bus. Here, the memory access command includes data indicating the direction of data transfer, data transfer size, and access starting address (logical address) of the memory.

The command generating unit 102 which received the memory access command from the master 200 first converts the received command from logical address into physical addresses of each of the memory units 0 to m at the conversion unit 103. Furthermore, the command generating unit 102 divides the physical address into commands of minimum access unit of the connected memory unit. Subsequently, unit-unique access commands each corresponding to a memory unit is generated, and the unit-specific access commands are issued to the respective command issuing units.

Each of the command issuing unit and each of the memory units correspond to the chip select signals (CS) for controlling memory and the command signals on one to one basis. Here, time division multiplexing is performed in the command conversion unit 108 in the memory control device, and the command issuing unit outputs a command that can be issued according to the timing specification of the memory control device 400c within the predetermined cycle (Here, one external clock cycle) to the memory device. The multiplexed command is demultiplexed in the command conversion unit 441 in the memory device 400c, and the corresponding commands are output to the respective memory units. In addition, the command issuing unit notifies the data control unit 106 of the command issue order information indicating the issue order of the command issued to the memory device based on the timing specification.

On the other hand, the data transfer between the master 200 and the memory device 400c is transferred via the V-byte data bus between the master 200 and the data control unit 106. Here, the data bus may be a bidirectional bus, or may also be two buses, respectively dedicated to written data and read data.

The V-byte data bus connects to the data control unit 106 and each of the memory devices. When writing data on the memory device from the master 200, the data control unit 106 divides the V-byte data from the master 200 for the V/m-byte data bus connected to each memory device based on the command issue order information received from the command issuing unit and transfers the divided data. Furthermore, when reading the data from the memory device, the V/m-byte output data from each of the memory units are combined into V-byte data based on the command issue order information received from the command issuing unit, and the data is transferred to the V-byte data bus connected to the master 200. This control keeps consistency of the command issued to the memory device and the transferred data.

Here, the width of the data bus connecting the master 200 and the data control unit is not limited to V bytes, but may be a width determined by the requirement of the system.

The master 200 and the command generating unit 102 connected to the memory control device 101 described above have the same function as in the first embodiment. In addition, when the command generating unit 102 divides and converts the command received from the master 200, the command generating unit 102 can issue for the command issuing unit in each memory device so that different addresses are simultaneously issued to access the memory devices when the memory devices and addresses are different. In addition, the command generating unit 102 can issue for the command issuing unit in each memory device so that different addresses are simultaneously issued to access the memory devices when the memory devices are different but the addresses are the identical.

Next, the operation in the command generating unit 102 is described. FIG. 3 shows a flowchart in the command generating unit 102. As shown in FIG. 3, the command generating unit 102 performs different processing whether the starting address of the command received from the master 200 points an 8-byte boundary or not. When the starting address points an 8-byte boundary (when the staring address is 8n byte (where n is an integer)), access commands to address n are respectively issued to the command generating units 0 and 1. Subsequently, n is incremented by one, and the process is repeated until the requested transfer size from the master 200 is satisfied.

Meanwhile, when the staring address does not point an 8-byte boundary (the staring address is 8n+4 byte (where n is an integer)), the command generating unit 102 generates an access command for an address n+1 to the command issuing unit 0, and an access command for an address n to the command generating unit 1. Subsequently, n is incremented by one, and the process is repeated until the requested transfer size from the master 200 is satisfied.

Here, when specifying the memory devices as the memory unit 1 and the memory unit 2 for each 4-byte boundary, the command issued by the master 200 that can access, via the memory control device 101 of the present invention using both logical address and image address, is divided and converted in the command generating unit 102 according to the address map shown in FIG. 2, and the addresses are 1) identical between the memory devices when the command ranges from the memory unit 0 to the memory unit 1, and 2) different when the command ranges from the memory unit 1 to the memory unit 0 on the memory devices. The invention in the fifth embodiment can simultaneously issue different addresses to the different memory units 1 and 2 in the case of (2), and can simultaneously issue the identical address to different memory units 1 and 2 in the case of (1) by storing data in the memory units and having readable arrangement.

FIG. 37 is a timing chart showing an example of the operation timing of the memory control device 101 and the memory device 400c according to the fifth embodiment. Here, FIG. 37 shows the operation timing of the read command for reading V×4-byte data, and operation timing of the bus and the read data to the master 200 and the control signals to the memory devices using m memory units which operates equivalent to an SDRAM having tRCD=3 cycles and CL=3 cycles.

The access commands generated in the command generating unit 102 is divided into m commands each for one of the memory units in each of m command issuing units, and the commands are multiplexed by time-division multiplexing in the command conversion unit 108 in the memory control device 101, and issued as m commands within one clock cycle to the memory device 400c. The multiplexed m commands are divided into commands for respective memory units and CS signals in the command conversion unit 441 in the memory device 400c, and is issued to each memory unit. FIG. 37 shows the command transfer at the interface of the memory control device 101 and the memory device 400c. First, the individual activate commands from the memory units 1 to m are multiplexed by time-division multiplexing and issued to the memory device 400c in one cycle. Subsequently, individual read commands from the unit memory 1 to m are multiplexed by time division multiplexing and are issued in three clock cycles so that tRCD can be satisfied. Each of the memory units 1 to m in the memory device 400c outputs, after the Read command is received, the desirable read data to its own data bus after CL=3.

With the control described above, upon access request from the master 200, when the access starting address does not point the boundary of the connected total bus width, and the requested transfer size exceeds the total data bus width, simultaneous and independent access to each memory unit is possible with different addresses. Thus, it is possible to enhance the access efficiency compared to the conventional system.

As described above, in the fifth embodiment, in terms of the system, it is possible to use the memory bandwidth equivalent to the connected V-byte SDRAM, and the data transfer can be controlled while reducing the access address boundary to the minimum access unit of one of the memory device to be used (per 4 bytes in the fifth embodiment). This allows more effective use of the memory bandwidth in a system with low granularity of access starting address.

Furthermore, since m commands are multiplexed by time division multiplexing and transferred to one memory device, CS signal line and command (including address) bus only for one memory unit are necessary. Thus, it is possible to significantly reduce the wired area of the command bus compared to the case where the components are individually wired.

Note that, in the fifth embodiment, a case where m memory units which operates equivalent to an SDRAM having a V-byte bus is used as a memory device, however, the type of device is not limited to SDRAM. Other DRAM such as DDR, DDR2, Direct-Rumbus DRAM, XDR, or a non-DRAM memory such as SRAM, flash memory may also be used, as long as the device is a memory device that can be used as a recording medium. Here, the minimum access unit refers to a value determined by a bus width×minimum burst length of a memory device.

Furthermore, the command generating unit 102 and the command control unit 107 divides the access command from the master 200 into minimum access unit according to the memory mapping based on the minimum access unit, issues the commands to the devices, and sorts the result to the command issuing unit to be accessed.

Note that, in the fifth embodiment, the command issue order information issued by the command issuing unit to the data control unit 106 is used as number information which indicates what number of data the command is for among the access commands from the master 200. However, control is performed using 1-bit information showing which memory device connected to is allocated higher as the number information.

When the memory device is not DRAM, the memory device may take the configuration which barely needs the command issuing unit. Furthermore, it is possible that the command generating unit 102 directly notifies the data control unit 106 of the command issue order information.

Note that, in FIG. 36, the memory control device and the memory device may be configured to multiplex, not only commands but also data. In this case, the memory control device may include a data multiplexing unit which multiplexes data 1 to data m to be transmitted to the memory device by time division multiplexing in one cycle, and a data demultiplexing unit which demultiplexes the multiplexed data received from the memory device to the data 1 to the data m. In addition, the memory device may include a data multiplexing unit which multiplexes data 1 to data m to be transmitted to the memory control device by time division multiplexing in one cycle, a data demultiplexing unit which demultiplexes the multiplexed data received from the memory control device to the data 1 to the data m.

Furthermore, the multiplexing unit multiplexes m access commands supplied to the memory unit in one cycle of the synchronization signal by time division multiplexing. Instead of this, m access commands may be multiplexed in the multiple cycles by multiplexing at least two access commands in one cycle by time division multiplexing. The same process may be performed when the data is multiplexed.

Note that, each of the functional blocks and each of the modules in the flowcharts shown in the embodiments are typically implemented in LSI, integrated circuit device. The LSI may be integrated into a single chip, or into multiple chips. For example, the functional blocks other than the memory may be integrated into one chip. Although it is referred as an LSI here, the LSI here can be referred to as an IC, a system LSI, a super LSI, or an ultra LSI, depending on their degrees of integration.

An integrated circuit used for such an embodiment is not limited to an LSI, and it may be embodied as a dedicated circuit or a general-purpose processor. It is also possible to use a field programmable gate array (FPGA) which can be programmed in the field after manufacturing an LSI, or a reconfigurable processor in which connection and setting of circuit cells inside an LSI can be reconfigured.

Furthermore, when a technology for the integrated circuit replacing LSI is developed with the advance of semiconductor technology or relevant technology, functional blocks can be integrated using the technology. Possible field of technology to be applicable include, for example, bio technology and others.

Furthermore, among all of the functional blocks, the unit for storing data may be separately put together as a recording medium or DRAM.

INDUSTRIAL APPLICABILITY

The memory control device and the memory control method for improving the effective transfer efficiency according to the present invention can be used for the memory control device 101 which intermediates data transfer between a master device such as codec represented by image codec and audio codec and CPU, and a memory such as DRAM. More specifically, the memory control device is useful as a memory control circuit in a system where image processing control is performed. Furthermore, the memory control device and the memory control method are suitable for an image processing system such as VCR, recorder, and camera, and an image processing system such as computer.

The invention claimed is:

1. A memory control device connected to a master and to a first memory device and a second memory device, and which receives a memory access request from the master and accesses the first memory device and the second memory device, said memory control device comprising:
   a command controller connected to the first memory device and the second memory device via a first command bus, the first memory device being connected through a first select signal line, and the second memory device being connected through a second select signal line,
   wherein said command controller is configured to switch, according to a logical address output by the master, between a first operation and a second operation,
   the first operation accesses the first memory device and the second memory device by simultaneously outputting a first select signal and a second select signal to the first select signal line and the second select signal line, respectively, and outputting a first physical address to the first command bus,
   the second operation accesses the first memory device and the second memory device by outputting the second select signal to the second select signal line and outputting a third physical address, different from a second physical address, to the first command bus, after outputting the first select signal to the first select signal line and outputting the second physical address to the first command bus,
   the memory control device is connected to m memory devices including the first memory device and the second memory device,
   each of the m memory units has a minimum access unit of N bytes,
   a logical address space has logical addresses which are consecutive along unit areas that are repeatedly arranged, and
   in each of the unit areas, m (N×integer)-byte areas each corresponding to one of the m memory devices are sequentially arranged.

2. The memory control device according to claim 1, wherein said command controller is configured:
   to convert a logical address included in the memory access request issued by the master into a fourth physical address in the first memory device and a fifth physical address in the second memory device;
   to perform the first operation when the fourth physical address and the fifth physical address are identical;
   to perform the second operation when the fourth physical address and the fifth physical address are different;
   to output the fourth physical address or fifth physical address as the first physical address in the first operation; and
   to output the fourth physical address as the second physical address and the fifth physical address as the third physical address in the second operation,
   said memory control device further comprises
   a data controller that is configured to divide data written by the master into first data and second data and output the first data to the first memory device and the second data to the second memory device, when the memory access request is a write request, and combine data read from the first memory device and data read from the second memory device and output the combined read data to the master, when the memory access request is a read request.

3. The memory control device according to claim 2, wherein
   the first memory device and the second memory device are configured to store data such that:
   the fourth physical address and the fifth physical address are identical when the memory access request starts with data in the first memory device, and a start of the data matches an alignment of a data bus corresponding to the first memory device and the second memory device; and
   the fourth physical address and the fifth physical address are different when the memory access request starts with data in the second memory device, and the start of the data does not match the alignment of the data bus corresponding to the first memory device and the second memory device.

4. The memory control device according to claim 1, wherein physical addresses of the m memory devices are common in each unit area, and said command controller is configured to perform the first operation on one of the m memory devices corresponding to the memory access request when the memory access request is for data having a size which does not exceed the unit area.

5. The memory control device according to claim 4, wherein each of the m memory devices includes i banks, p unit areas are repeatedly arranged in the logical address space,
   the p unit areas have a common row address and different column addresses,
   the m (N×integer)-byte areas in each of the p unit areas have a common bank address, and
   the p unit areas respectively have different bank addresses.

6. The memory control device according to claim 5, wherein the unit areas arranged adjacently have different bank addresses in the logical address space where the p unit areas are repeatedly arranged, and
   said command controller is configured to access the adjacent unit areas by bank interleaving.

7. The memory control device according to claim 1, wherein the first memory device and the second memory device comprise a frame buffer which stores an image, each of the first memory device and the second memory device has a minimum access unit of N bytes,
   a logical address space has logical addresses which are consecutive along unit areas that are repeatedly arranged,
   (N×integer)-byte areas each corresponding to one of the first memory device and the second memory device are sequentially arranged in each of the unit areas,
   A number of unit areas are adjacently arranged corresponding to a horizontal address of the image, and
   B number of unit areas are adjacently arranged corresponding to a vertical address of the image.

8. The memory control device according to claim 7, wherein the (N×integer)-byte areas in each of the unit areas have a common bank address, a common row address, and a common column address.

9. The memory control device according to claim 6,
wherein the unit areas adjacent in one of a horizontal direction and a vertical direction of the frame buffer have different bank addresses, and
said command controller is configured to access adjacent unit areas by bank interleaving.

10. The memory control device according to claim 1, wherein m equals to 2.

11. The memory control device according to claim 1,
wherein m equals to 2,
two of the m memory devices comprise a frame buffer which stores an image,
each of the two memory devices has a minimum access unit of N bytes,
in each of the unit areas, two of the (N×integer)-byte areas each corresponding to one of the two memory devices are alternately arranged,
A number of unit areas are adjacently arranged corresponding to a horizontal address of the image,
B number of unit areas are arranged corresponding to a vertical address of the image, and
the memory access request from the master includes a horizontal address and a vertical address per row.

12. The memory control device according to claim 1,
wherein said command controller is further connected to the first memory device via a second command bus and connected to the second memory device via a third command bus, and
the first command bus includes a part of an address signal line configuring a command bus, and the second command bus and the third command bus include an other part of the address signal line configuring the command bus.

13. The memory control device according to claim 12,
wherein said command control unit controller is configured: to convert a logical address included in the memory access request issued by the master into a fourth physical address in the first memory device and a fifth physical address in the second memory device;
to perform the first operation when a sixth physical address which is a part of the fourth physical address and a seventh physical address which is a part of the fifth physical address are identical;
to perform the second operation when the sixth physical address and the seventh physical address are different;
to output the sixth physical address or the seventh physical address as the first physical address in the first operation;
to output the sixth physical address as the second physical address and the seventh physical address as the third physical address in the second operation; and
to output an eighth physical address which is an other part of the fourth physical address to the second command bus, and a ninth physical address which is an other part of the fifth physical address to the third command bus, in the first operation and the second operation.

14. The memory control device according to claim 1,
wherein the first memory device and the second memory device comprise a frame buffer which stores an image,
each of the first memory device and the second memory device has a minimum access unit of N bytes,
a logical address space has logical addresses which are consecutive along unit areas that are repeatedly arranged,
(N×integer)-byte areas each corresponding to one of the first memory device and the second memory device are arranged in each of the unit areas,
the frame buffer includes rectangular areas,
E number of unit areas are adjacently arranged corresponding to a horizontal address, and
F number of unit areas are adjacently arranged corresponding to a vertical address of each of the rectangular areas.

15. The memory control device according to claim 14,
wherein the unit areas in each of the rectangular areas have a common bank address and a common row address,
two of the rectangular areas that are horizontally adjacent have different bank addresses, and
two of the rectangular areas that are vertically adjacent have an arbitrary bank address and different row addresses.

16. The memory control device according to claim 15,
wherein the (N×integer)-byte areas each corresponding to one of the first memory device and the second memory device are sequentially arranged in each of the unit areas in an order corresponding to an order of the first memory device and the second memory device.

17. The memory control device according to claim 14,
wherein each of the unit areas in each of the rectangular areas is composed of arbitrary one of the first memory device and the second memory device and has a common bank address,
two of the rectangular areas that are horizontally adjacent have different bank addresses, and
two of the rectangular areas that are vertically adjacent are composed of at least one of the unit areas from each of the first memory device and the second memory device, and have an arbitrary bank address and different column addresses.

18. The memory control device according to claim 17,
wherein the (N×integer)-byte areas each corresponding to one of the first memory device and the second memory device are sequentially arranged in each of the unit areas in an order corresponding to an order of the first memory device and the second memory device.

19. The memory control device according to claim 15,
wherein the (N×integer)-byte areas are sequentially arranged in each of the unit areas in a first small rectangular area having G rows which is consecutive to one or more rows in an order corresponding to an order of the first memory device and the second memory device, and
the (N×integer)-byte areas are sequentially arranged in each of the unit areas in a second small rectangular area having H rows which is consecutive to one or more rows in an order different from the order in the first small rectangular area, and
the relationship of the first small rectangular area and the second small rectangular area is repeated in the rectangular area.

20. A memory control method in a memory control device for receiving a memory access request from a master and controlling access to a first memory device and a second memory device, the memory controller connected to the master and to the first memory device and the second memory device, said memory control method comprising:
switching, by a command controller connected to the first memory device and the second memory device via a first command bus, between a first operation and a second operation, according to a logical address output by the master,
wherein the first memory device is connected through a first select signal line, and the second memory device being connected through a second select signal line,
the first operation accesses the first memory device and the second memory device by simultaneously outputting a first select signal and a second select signal to the first select signal line and the second select signal line, respectively, and outputting a first physical address to the first command bus, and the second operation accesses the first memory device and the second memory device by outputting the second select signal to the second select signal line and outputting a third physical address, different from a second physical address, to the first command bus, after outputting the first select signal to the first select signal line and outputting the second physical address to the first command bus, wherein the memory control device is connected to m memory devices including the first memory device and the second memory device, each of the m memory units has a minimum access unit of N bytes, a logical address space has logical addresses which are consecutive along unit areas that are repeatedly arranged, and in each of the unit areas, m (N×integer)-byte areas each corresponding to one of the m memory devices are sequentially arranged.

21. A semiconductor device comprising the memory control device according to claim 1.

* * * * *